US008793155B2

(12) United States Patent
Flake et al.

(10) Patent No.: US 8,793,155 B2
(45) Date of Patent: Jul. 29, 2014

(54) COLLECTING INFLUENCE INFORMATION

(75) Inventors: Gary W. Flake, Bellevue, WA (US);
William H. Gates, III, Redmond, WA (US); Alexander G. Gounares, Kirkland, WA (US); W. Daniel Hillis, Encino, CA (US); Royce A. Levien, Lexington, MA (US); Robert W. Lord, Seattle, WA (US); Mark A. Malamud, Seattle, WA (US); Craig J. Mundie, Seattle, WA (US); Christopher D. Payne, Seattle, WA (US); Richard F. Rashid, Redmond, WA (US); Clarence T. Tegreene, Bellevue, WA (US); Charles Whitmer, North Bend, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1185 days.

(21) Appl. No.: 11/906,537

(22) Filed: Oct. 1, 2007

(65) Prior Publication Data
US 2008/0270426 A1      Oct. 30, 2008

Related U.S. Application Data

(63) Continuation-in-part of application No. 11/824,582, filed on Jun. 29, 2007, and a continuation-in-part of application No. 11/799,461, filed on Apr. 30, 2007, and a continuation-in-part of application No. 11/799,460, filed on Apr. 30, 2007, and a continuation-in-part of application No. 11/824,551, filed on Jun. 29, 2007, and a continuation-in-part of application No. 11/824,580, filed on Jun. 29, 2007.

(51) Int. Cl.
*G06Q 30/00*      (2012.01)
*G06Q 90/00*      (2006.01)

(52) U.S. Cl.
CPC .................................. *G06Q 90/00* (2013.01)
USPC .................................................... 705/14.1

(58) Field of Classification Search
CPC ................................................. G06Q 90/00
USPC .................................................... 705/14.1
See application file for complete search history.

(56) References Cited

U.S. PATENT DOCUMENTS 5,933,811 A * 8/1999 Angles et al. ............... 705/14.56
6,041,326 A    3/2000 Amro et al.

(Continued)

OTHER PUBLICATIONS

Carson, Mel; "Microsoft LookingGlass Helps Businesses Catch the Social Media Wave at Advertising Week 2009"; Microsoft Advertising Blog; bearing a date of Sep. 23, 2009; located at: http://community.microsoftadvertising.com/Blogs/Advertising/archive/2009/09/23/microsoft-lookingglass-helps-businesses-catch-the-social-media-wave-at-advertising-week-2009.aspx; printed on Apr. 22, 2011; 10 pages.

(Continued)

*Primary Examiner* — Daniel Lastra

(57) ABSTRACT

Embodiments include a system, a device, an apparatus, a method, and a computer program product. A method of reporting influence on a person includes collecting data indicative of the person accessing electronic content over a computer network using the user computing device. The method also includes generating a user influence report by transforming the collected data into information indicative of events associatable with the person accessing the electronic content over a computer network using the user computing device. The method further includes transmitting data indicative of the user influence report via a network, the user influence report being receivable by a site operable to facilitate delivery of a benefit to an owner of the electronic content.

28 Claims, 86 Drawing Sheets

(56) References Cited

U.S. PATENT DOCUMENTS

| | | | |
|---|---|---|---|
| 6,129,276 | A | 10/2000 | Jelen et al. |
| 6,466,918 | B1 | 10/2002 | Spiegel et al. |
| 6,873,314 | B1 | 3/2005 | Campbell |
| 7,031,952 | B1 | 4/2006 | Heumann et al. |
| 7,096,214 | B1 | 8/2006 | Bharat et al. |
| 7,143,089 | B2 | 11/2006 | Petras et al. |
| 7,437,368 | B1 | 10/2008 | Kolluri et al. |
| 7,627,660 | B2 | 12/2009 | Naitoh |
| 2001/0049620 | A1 | 12/2001 | Blasko |
| 2002/0055909 | A1 | 5/2002 | Fung et al. |
| 2002/0103789 | A1 | 8/2002 | Turnbull et al. |
| 2003/0009451 | A1 | 1/2003 | Bates et al. |
| 2003/0055723 | A1 | 3/2003 | English |
| 2003/0131100 | A1* | 7/2003 | Godon et al. ............... 709/224 |
| 2003/0182162 | A1 | 9/2003 | Stevens |
| 2003/0187739 | A1 | 10/2003 | Powers |
| 2003/0220837 | A1 | 11/2003 | Asayama |
| 2004/0059708 | A1 | 3/2004 | Dean et al. |
| 2004/0205065 | A1 | 10/2004 | Petras et al. |
| 2004/0205327 | A1 | 10/2004 | Morrison et al. |
| 2004/0254911 | A1 | 12/2004 | Grasso et al. |
| 2004/0260574 | A1 | 12/2004 | Gross |
| 2005/0071251 | A1 | 3/2005 | Linden et al. |
| 2005/0102202 | A1 | 5/2005 | Linden et al. |
| 2005/0234917 | A1 | 10/2005 | Branham et al. |
| 2005/0278297 | A1 | 12/2005 | Nelson |
| 2006/0010105 | A1 | 1/2006 | Sarukkai et al. |
| 2006/0020662 | A1 | 1/2006 | Robinson |
| 2006/0116926 | A1* | 6/2006 | Chen ............................... 705/14 |
| 2006/0161553 | A1 | 7/2006 | Woo |
| 2006/0184558 | A1 | 8/2006 | Martin et al. |
| 2006/0195362 | A1 | 8/2006 | Jacobi et al. |
| 2006/0271425 | A1 | 11/2006 | Goodman et al. |
| 2006/0277108 | A1 | 12/2006 | Altberg et al. |
| 2006/0282304 | A1 | 12/2006 | Bedard et al. |
| 2006/0282328 | A1 | 12/2006 | Gerace et al. |
| 2006/0287916 | A1 | 12/2006 | Starr et al. |
| 2007/0022079 | A1 | 1/2007 | Benson et al. |
| 2007/0027761 | A1 | 2/2007 | Collins et al. |
| 2007/0038516 | A1 | 2/2007 | Apple et al. |
| 2007/0067215 | A1* | 3/2007 | Agarwal et al. ............... 705/14 |
| 2007/0083640 | A1 | 4/2007 | Wagner et al. |
| 2007/0198339 | A1 | 8/2007 | Shen et al. |
| 2007/0244914 | A1 | 10/2007 | Kreiner |
| 2007/0265918 | A1 | 11/2007 | McMahon et al. |
| 2008/0294768 | A1 | 11/2008 | Sampson et al. |
| 2008/0306820 | A1 | 12/2008 | Passmore |
| 2009/0006218 | A1 | 1/2009 | Ku et al. |
| 2009/0282052 | A1 | 11/2009 | Evans et al. |

OTHER PUBLICATIONS

Croft, Ali et al.; "e-bay Social Media Case Study"; bearing a date of Oct. 21, 2010; located at: http://www.slideshare.net/influencepeoples/ali-croft-monitoring-social-media-ebay; printed on Apr. 22, 2011; 3 pages.

"Harkable: The Influencer Community"; bearing a date of 2011; located at: http://www.harkable.com/; printed on Apr. 22, 2011; 1 page.

"Klout identifies influencers on topics across the social web"; located at: http://klout.com/; printed on Apr. 22, 2011; 1 page.

"Meteor: Word-of-Mouth Analytics & Optimization"; located at: https://www.meteorsolutions.com/products.php?fbid=p-9xahe1KYK&wom=true; printed on Apr. 22, 2011; 2 pages.

ObjectiveMarketer; "How it works"; located at: http://objectivemarketer.com/objectivemarketer/how-it-works.html; printed on Apr. 22, 2011; 2 pages; ObjectiveMarketer.

Radian6; "Uncover Influencers"; bearing a date of 2011; located at: http://www.radian6.com/products/applications/uncover-influencers/; printed on Apr. 22, 2011; 7 pages.

Rao, Leena; "Social Influence Measurement Startup Klout Passes 2K API Partners"; bearing a date of Apr. 13, 2011; located at http://techcrunch.com/2011/04/13/social-influence-measurement-startup-klout-passes-2k-api-partners/; printed on Apr. 22, 2011; 1 page; TechCrunch.

"Salesforce for Twitter and Facebook (v4)"; bearing a date of Jul. 15, 2010; located at: http://appexchange.salesforce.com/listingDetail?listingId=a0N30000003HpEQEA0; printed on Apr. 22, 2011; 1 page; Salesforce.com, Inc.

"Service Cloud"; located at: http://www.salesforce.com/crm/customer-service-support/; printed on Apr. 22, 2011; 2 pages; Salesforce.com, Inc.

"Social Analytics for Marketers: Passionate about Influencers and High Tech Datamining"; located at: http://www.peoplebrowsr.com/; printed on Apr. 22, 2011; 2 pages; PeopleBrowsr.

"Social CRM"; located at: http://www.salesforce.com/crm/customer-service-support/social-networking/; printed on Apr. 22, 2011; 2 pages; Salesforce.com, Inc.

"Social Eyez"; bearing a date of 2010; located at: http://www.socialeyez.ae/index.htm; printed on Apr. 22, 2011; 1 page; Social Eyez.

"Social Media Monitoring and Analysis with Alterian SM2"; located at: http://socialmedia.alterian.com; printed on Apr. 22, 2011; 6 pages.

"social media reputation"; located at: http://www.mysocialmediarepulation.com/; printed on Apr. 22, 2011; 1 page; Yomego.

"socialseek: social goodness all in one place"; bearing a date of 2011; located at: http://socialseek.com/; printed on Apr. 22, 2011; 1 page; Sensidea Corp.

Viralheat; "Human intent identified: using advanced algorithms, see who is about to purchase products or services. Reach out. Create relationships. Make sales. The future of social media analytics is here"; located at: http://www.viralheat.com/; printed on Apr. 22, 2011; 2 pages.

Wauters, Robin.; "Salesforce Buys Social Media Monitoring Company Radian6 for $326 Million"; bearing a date of Mar. 30, 2011; located at: http://techcrunch.com/2011/03/30/salesforce-buys-social-media-monitoring-company-radian6-for-326-million/; printed on Apr. 22, 2011; 3 pages.

"Yomego—the social media agency"; located at: http://www.yomego.com/; printed on Apr. 22, 2011; 3 pages; Yomego.

Yomego Social; "How are global brands managing their international audience on Facebook?"; bearing a date of Apr. 21, 2011; located at: http://blog.yomego.com/2011/04/how-are-global-brands-managing-their.html; printed on Apr. 22, 2011; 3 pages; Yomego.

U.S. Appl. No. 60/870,926, filed Dec. 20, 2006, Flake et al.

U.S. Appl. No. 11/881,800, Flake et al.

"LiveSTATS.NET Technology"; Deepmetrix.com; bearing a date of 2005; pp. 1-4; printed on Mar. 1, 2007; located at http://www.deepmetrix.com/livestats/net/our_technology/index.aspx; Deepmetrix Corporation.

"MediaUnbound"; MediaUnbound.com; bearing a date of 2000-2006; 9 pages total; located at http://www.mediaunbound.com; MediaUnbound, Inc.

Nelson, Michelle; "A Penny for Your Thoughts At Epinions.com"; Smartcomputing.com; Apr. 2000; pp. 1-7; vol. 11 Issue 4; printed on Feb. 13, 2007; located at http://www.smartcomputing.com/editorial/article.asp?article=articles . . . ; Sandhills Publishing Company; USA.

Nicolai, Tom; Behrens, Nils; Thielemann, Heidi; "Be a Freeporter!: Enabling a Mobile News Publishing Community"; pp. 1-12; Center for Computing Technologies, Bremen.

O'Brien, Jeffrey M.; "The race to create a 'smart' Google"; CNNMoney.com; Nov. 20, 2006; pp. 1-5; printed on Feb. 9, 2007; located at http://money.cnn.com/magazines/fortune/fortune_archive/2006/11/2 . . . ; Cable News Network.

O'Donovan, John; Smyth, Barry; "Trust in recommender systems"; Proceedings of the 10th international conference on Intelligent user interfaces; 2005; pp. 1-4; ISBN: 1-58113-894-6; pp. 167-174; printed on Feb. 12, 2007; located at http://portal.acm.org/citation.cfm?coll=GUIDE&dl=GUIDE&id=10 . . . ; San Diego; USA.

"Operating Agreement"; Amazon.com; bearing a date of May 28, 2007; pp. 1-10; printed on Jun. 13, 2007; located at https://affiliate-program.amazon.com/gp/associates/agreement/ref; Amazon.com, Inc.

(56) References Cited

OTHER PUBLICATIONS

Parker, Pamela; "Display Ads Drive Searches in Yahoo! Case Study"; ClickZ Network; May 9, 2005; 1 page; Incisive Interactive Marketing LLC.

"Patent"; Knowledgecenter.com; bearing dates of 1999-2006; pp. 1-2; printed on Feb. 13, 2007; located at http://www.knowledgecenter.com/patent.php; Knowledge Filter, Inc.

"Products Overview"; Nielsenbuzzmetrics.com; bearing a date of 2007; pp. 1-2; printed on Mar. 1, 2007; located at http://www.nielsenbuzzmetrics.com/products.asp; BuzzMetrics.

Resnick, Paul; Varian, Hal R.; "Recommender Systems"; pp. 1-6; printed on Feb. 9, 2007; located at http://www.acm.org/pubs/cacm/MAR97/resnick.html.

Abbott, Kelly; "How to Measure Blog Influence"; iMedia Connection; Aug. 16, 2006; pp. 1-3; printed on Mar. 1, 2007; located at http://www.imediaconnection.com/global/5728.asp?ref=http://www.imediaconnection.com/content/10812.asp.

"Ad Serving & Technology"; valueclick.com; bearing a date of 2007; p. 1; printed on Jun. 14, 2007; located at http://www.valueclick.com/solutions/; ValueClick, Inc.

Adomavicius, Gediminas; Tuzhilin, Alexander; "Toward the Next Generation of Recommender Systems: A Survey of the State-of-the-Art and Possible Extensions"; IEEE Transactions on Knowledge and Data Engineering; Jun. 2005; pp. 734-749; vol. 17, No. 6; IEEE Computer Society.

"AdSense"; Wikipedia.org; bearing a date of May 31, 2007; pp. 1-5; printed on May 31, 2007; located at http://en.wikipedia.org/wiki/AdSense; Wikimedia Foundation, Inc.; USA.

"Affiliate & Search Marketing"; valueclick.com; bearing a date of 2007; p. 1; printed on Jun. 13, 2007; located at http://www.valueclick.com/solutions/affiliate_marketing.html; ValueClick, Inc.

"Archive for Practice"; Recommenders06.com; bearing dates of Oct. 2, 2006, Sep. 13, 2006, Sep. 12, 2006, and 2003-2006; pp. 1-7; printed on Feb. 12, 2007; located at http://blog.recommenders06.com/?cat=11; MediaStrands, Inc.

"Ask Search Technology"; Ask.com; bearing a date of 2007; p. 1; printed on Feb. 13, 2007; located at http://about.ask.com/en/docs/about/ask_technology.shtml.

Baker, Loren; "Google AdSense Testing Cost-Per-Action Payments"; Search Engine Journal; Jun. 21, 2006; pp. 1-8; printed on Jun. 13, 2007; located at http://www.searchenginejournal.com/google-adsense-testing-cost-per-action-payments/3561/; Search Engine Journal.

"Bibliography"; SmartMobs.com; pp. 1-15; printed on Apr. 10, 2007; located at http://www.smartmobs.com/book/book_bib_ch_6_0_30.html.

"Category Lead, Top Reviewer and Advisor FAQ"; Epinions.com; bearing a date of 1999-2007; pp. 1-9; printed on Feb. 12, 2007; located at http://www0.epinions.com/help/faq/show_~faq_recognition; Shopping.com Inc.

"Client (computing)"; Wikipedia.org; printed on Mar. 25, 2007; pp. 1-2; printed on Mar. 29, 2007; located at http://en.wikipedia.org/wiki/Client_(computing); Wikimedia Foundation, Inc.; USA.

"Collaborative filtering"; Wikipedia.org; bearing a date of Feb. 6, 2007; pp. 1-6; located at http://en.wikipedia.org/wiki/Collaborative_filtering; Wikimedia Foundation, Inc., USA.

"Dynamic web page"; Wikipedia.org; bearing a date of Feb. 19, 2007; pp. 1-3; printed on Mar. 30, 2007; located at http://en.wikipedia.org/wiki/Dynamic_web_page; Wikimedia Foundation, Inc.; USA.

"Earnings on Epinions.com"; Epinions.com; bearing a date of 1999-2007; pp. 1-3; printed on Feb. 12, 2007; located at http://www.epinions.com/help/faq/show_~faq_earnings; Shopping.com Inc.

"Foistware / Spyware—Gator, OfferCompanion, Trickier, GAIN"; pp. 1-3; http://cexx.org/gator.htm; printed on Aug. 8, 2007.

"General Review Writing Guidelines"; Amazon.com; bearing a date of 1996-2007; pp. 1-2; printed on Feb. 12, 2007; located at http://www.amazon.com/gp/customer-reviews/guidelines/review-guid . . . ; Amazon.com.

"Google AdSense Online Standard Terms and Conditions"; Google.com; bearing dates of Nov. 3, 2005 and 2007; pp. 1-5; printed on Jun. 13, 2007; located at https://www.google.com/adsense/static/en_US/Terms.html'?gsession; Google.

Guernsey, Lisa; "Making Intelligence a Bit Less Artificial"; The New York Times; nytimes.com; May 1, 2003; pp. 1-4; printed on Feb. 12, 2007; located at http://www.nytimes.com/2003/05/01/technology/circuits/01reco.html; The New York Times Company.

Guha, R.; Kumar, Ravi; Raghavan, Prabhakar; Tomkins, Andrew; "Propagation of Trust and Distrust"; bearing a date of May 17-22, 2004; pp. 1-10; New York; USA.

"Help"; Amazon.com; pp. 1-6; Seattle; USA.

Kalseth, Fredrik; "Developing a Restaurant Recommender System"; Computer Science Presentation; May 4, 2005; pp. 1-70; located at http://affirmation.mine.nu.

Sinha, Rashmi; "User Interfaces for Music Discovery"; UC Berkeley Presentation; pp. 1-4; printed on Feb. 12, 2007; located at http://www.rashmisinha.com/talks/audioiconRashmi.pdf.

"The Lean & Mean Review Challenge!"; Epinions.com; bearing a date of Feb. 2007 and 1999-2007; pp. 1-2; printed on Feb. 12, 2007; located at http://www0.epinions.com/member/?show=news&sub=sweepstakes_ . . . ; Shopping.com, Inc.

"The Present and Future of Recommender Systems"; MyStrands.com; pp. 1-3; printed on Feb. 12, 2007; located at http://www.mystrands.com/corp/summerschool06.vm.

"The Web of Trust"; Epinions.com; bearing a date of 1999-2007; pp. 1-3; printed on Feb. 12, 2007; located at http://www0.epinions.com/help/faq/show_~faq_wot; Shopping.com, Inc.

"The web's most popular and successful Affiliate"; Amazon.com; bearing dates of 1996-2007; pp. 1-2; printed on Jun. 13, 2007; located at https://affiliate-program.amazon.com/pg/associates/join; Amazon.com, Inc.

"Trend Results"; Blogpulse.com; bearing dates of 2006 and 2005; pp. 1-2; printed on Mar. 1, 2007; located at http://www.blogpulse.com/trend?query1=%28%john+g.+roberts . . . ; Nielsen BuzzMetrics, Inc.

"Web analytics"; Wikipedia.org; bearing a date of Feb. 20, 2007; pp. 1-6; printed on Feb. 26, 2007; located at http://en.wikipedia.org/wiki/Web_analytics; Wikimedia Foundation, Inc.; USA.

Zhu, Tingshao; Greiner, Russ; Haubl, Gerald; Price, Bob; Jewell, Kevin; "A Trustable Recommender System for Web Content"; pp. 1-6; located at http://www.web-ic.com/paper/beyond2005.pdf.

* cited by examiner

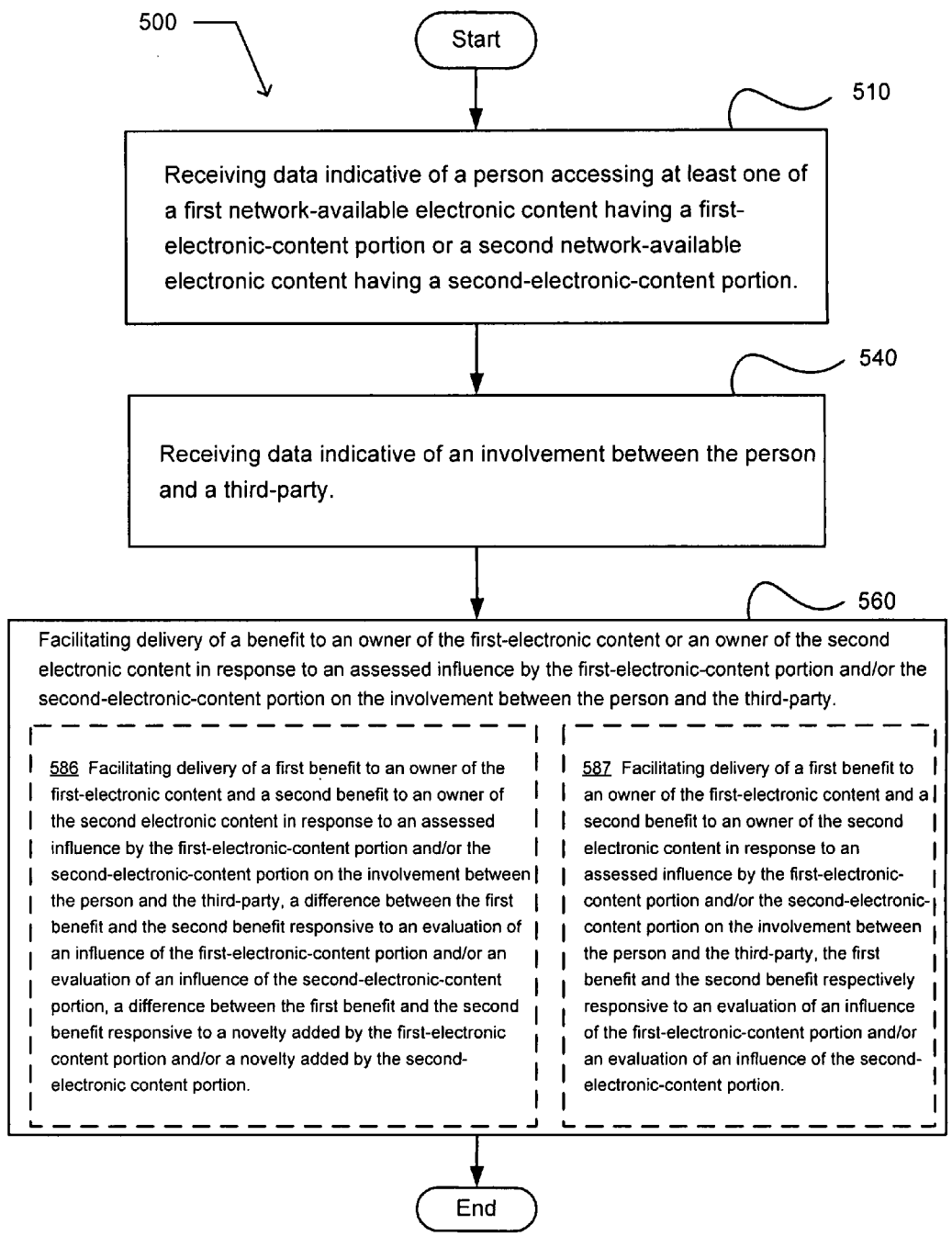

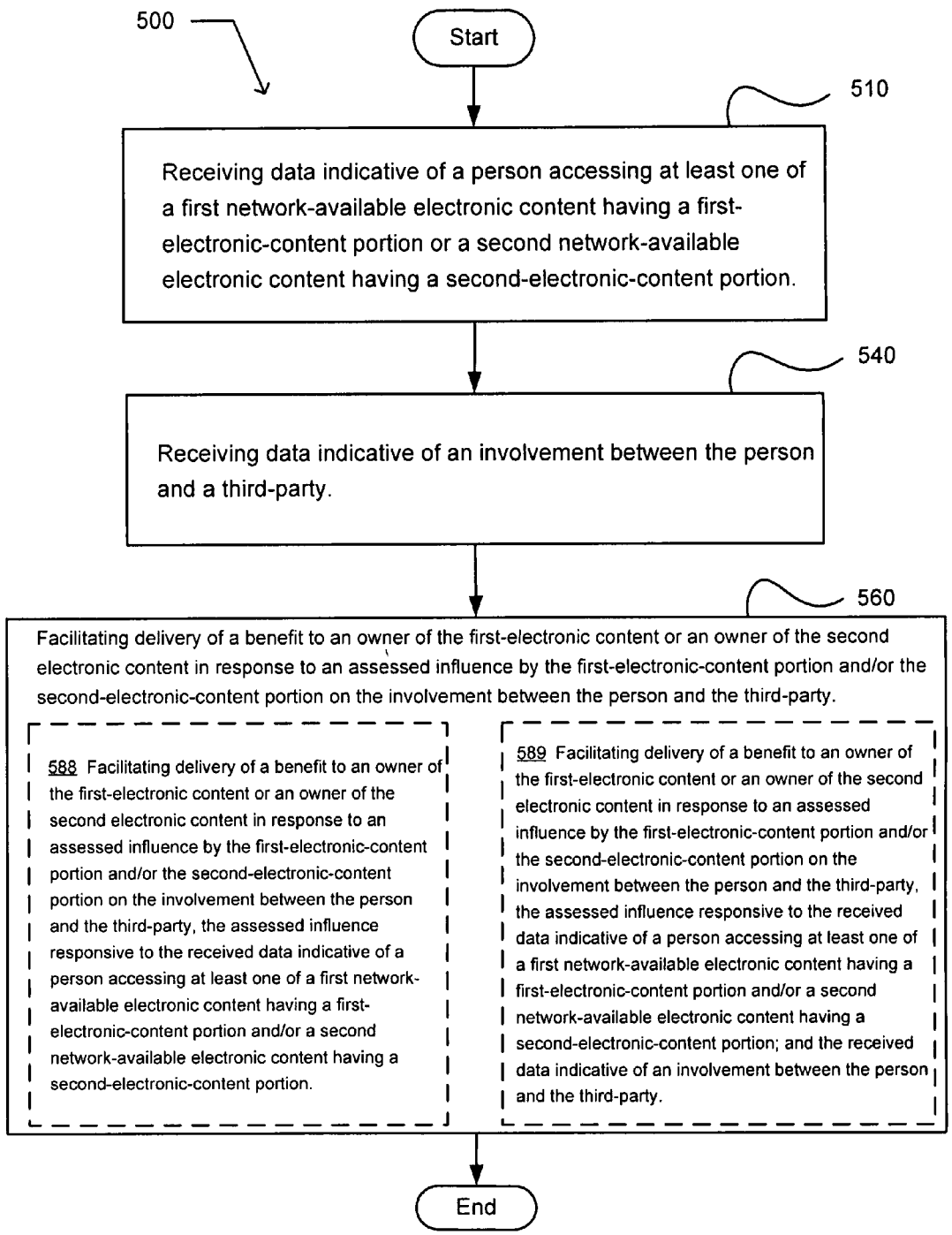

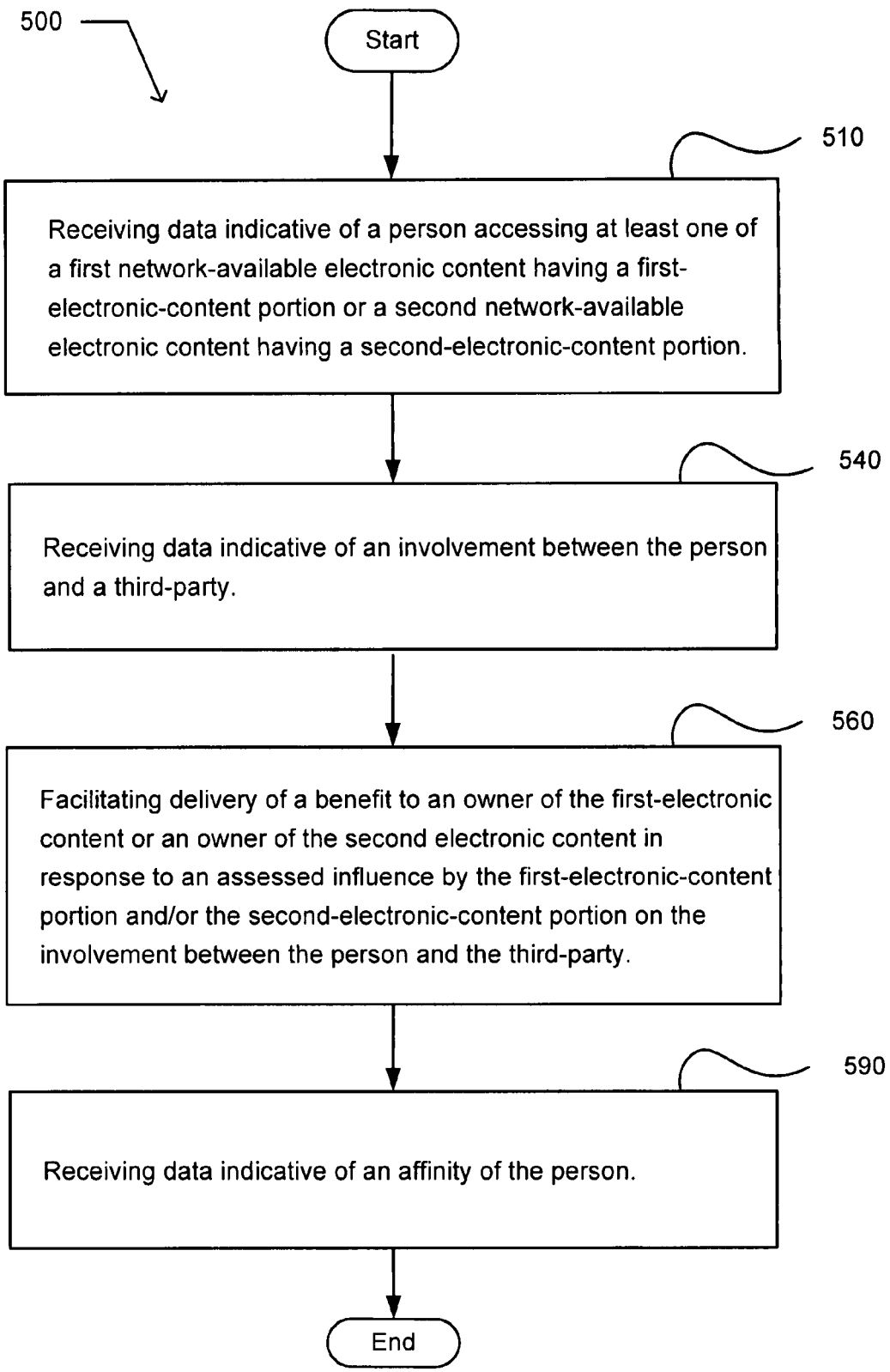

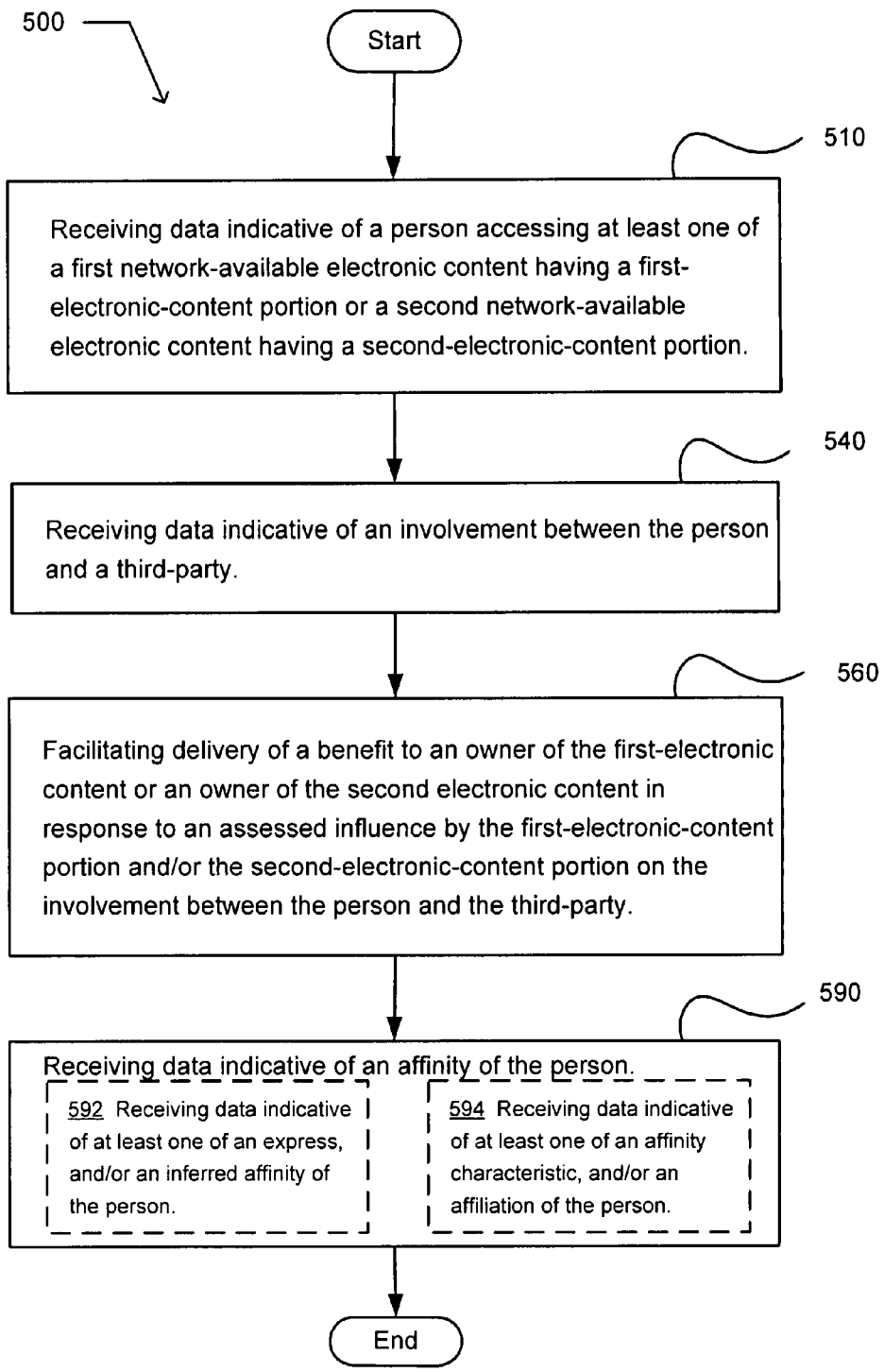

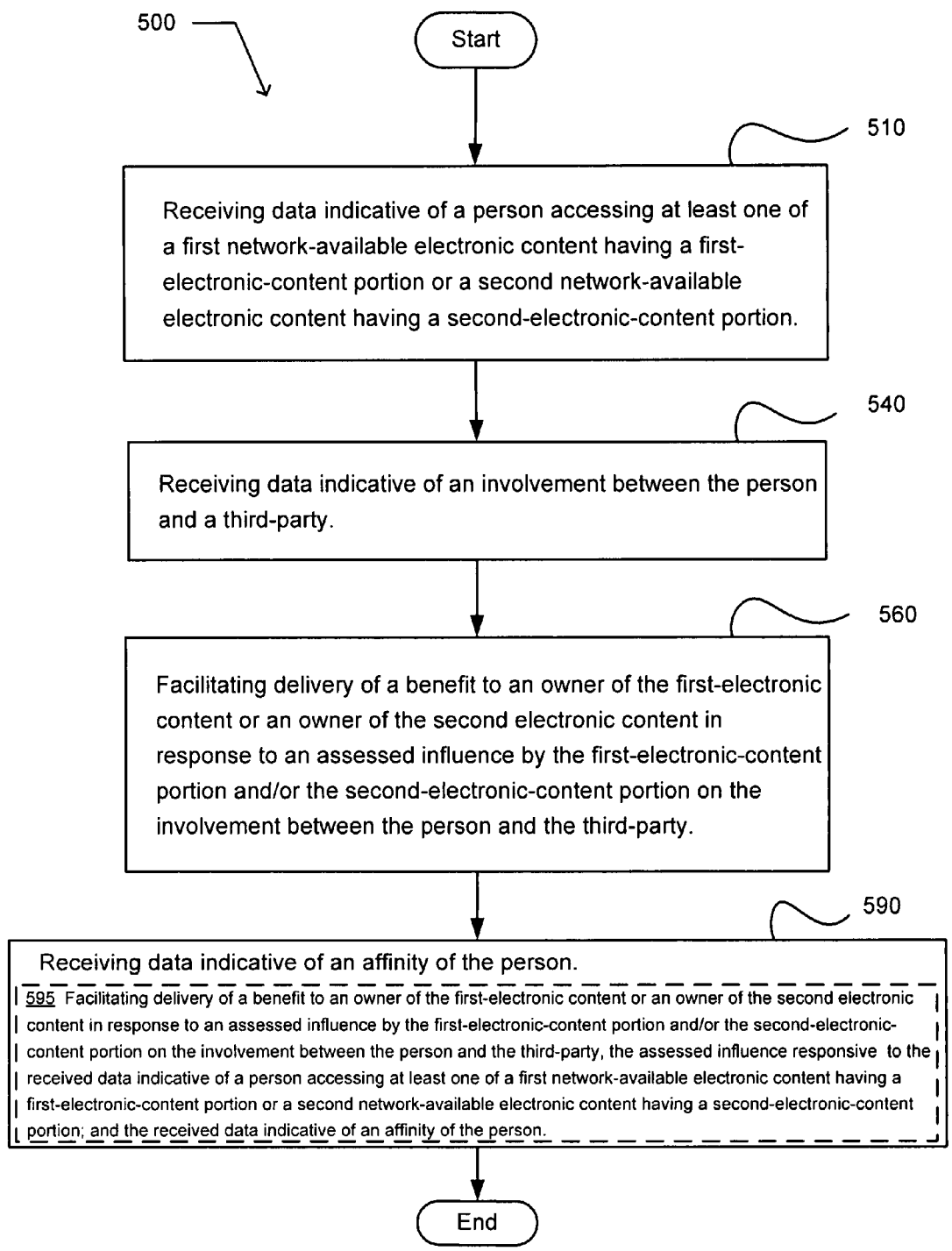

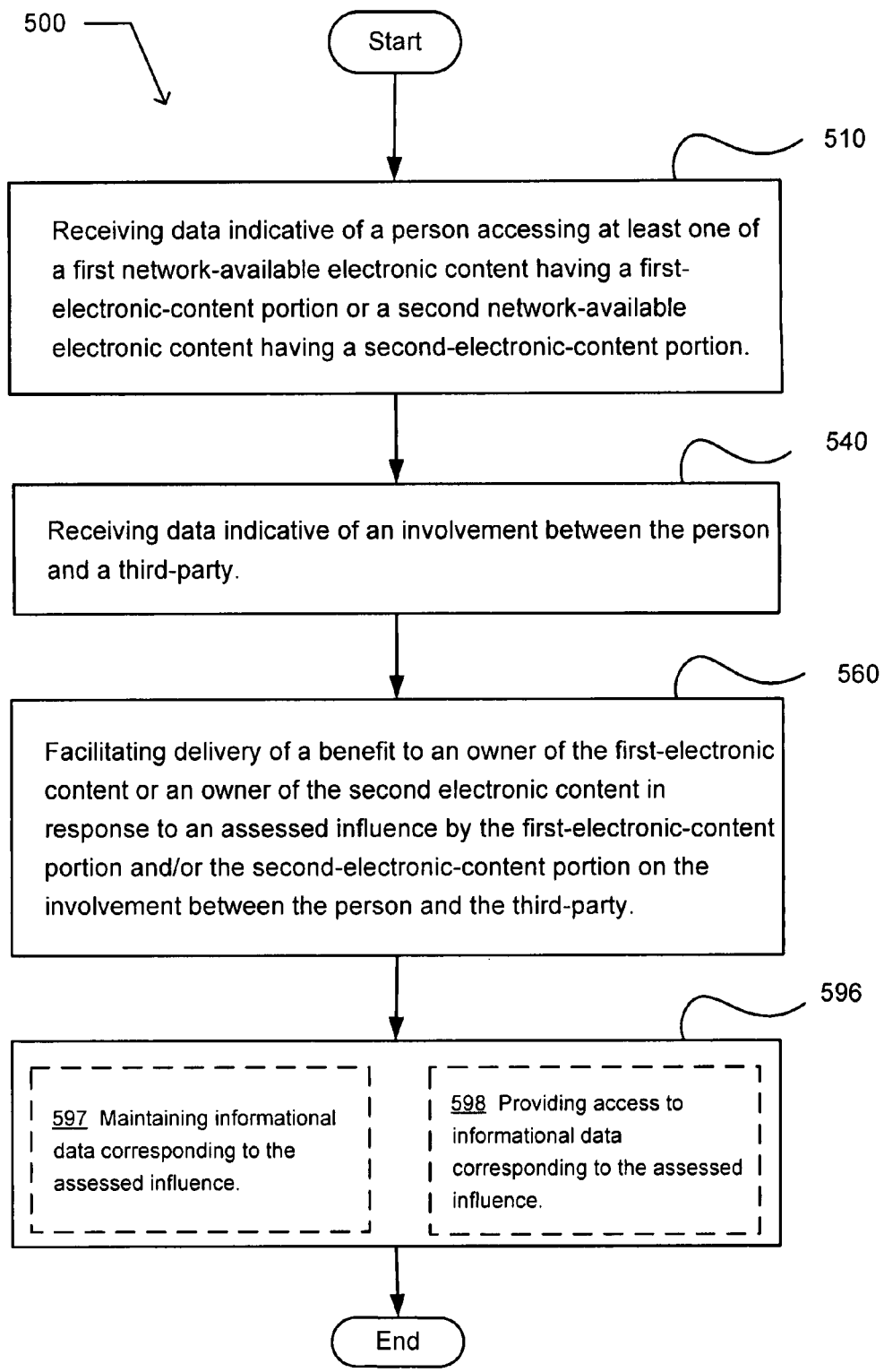

710 A computer-readable signal bearing medium.

720 Program instructions operable to perform an influence evaluation in a computing device, the process includes:

receiving data indicative of a person accessing at least one of a first network-available electronic content having a first-electronic-content portion or a second network-available electronic content having a second-electronic-content portion;

receiving data indicative of an involvement between the person and the third-party; and assessing an influence by the first-electronic-content portion and/or the second-electronic-content portion on the involvement between the person and the third-party.

| 722 Receiving data indicative of an affinity of the person. | 724 Outputting the assessed influence in a form usable by a process facilitating delivery of a benefit to an owner of the first electronic content or an owner of the second electronic content. | 726 Maintaining informational data corresponding to the assessed influence. | 728 Providing access to maintained informational data corresponding to the assessed influence. |

732 A computer storage medium.

734 A communications medium.

FIG. 28

1110 Content site data gathered using a process running on a platform of a content site, and indicative of communication between the content site and a computing device responsive to a human user input;

> 1112 Content site data gathered using a process running on a platform of a content site, and indicative of communication between the content site and a computing device responsive to a human user input, the process including a process that is at least one of bundled with, integrated into, and/or registered with the platform of the content site;

> 1114 content site data gathered using a process running on a platform of a content site, and indicative of communication between the content site and the computing device responsive to a human user input;

> 1116 Content site data gathered using a process running on a platform of a content site, and indicative of communication between the content site and a computing device responsive to a human user input, the content site operable to provide content deliverable to the person and that includes at least one of a document; review; critique; comment; rating; aggregations of reviews, comments, and/or critiques; a consumer-generated-media; blog; newsgroup; message board; and/or discussion forum;

> 1118 Content site data gathered using a process running on a platform of a content site, indicative of communication between the content site and a computing device responsive to a human user input, and related to digital work deliverable to the person;

FIG. 29

1110 Content site data gathered using a process running on a platform of a content site, and indicative of communication between the content site and a computing device responsive to a human user input;

1122 Content site data gathered using a process running on a platform of a content site, indicative of communication between the content site and a computing device responsive to a human user input, and related to at least one of a publicly available electronic content, a limited publicly available electronic content, and/or a privately available electronic content that is deliverable to the person;

1124 Content site data gathered using a process running on a platform of a content site, indicative of communication between the content site and a computing device responsive to a human user input, and related to an electronic content deliverable to the person that includes at least one of an electronic document, an electronic work, an electronically-stored information, a Web document;

1126 Content site data gathered using a process running on a platform of a content site, indicative of communication between the content site and a computing device responsive to a human user input, and related to an electronic content deliverable to the person that includes at least one of a human perceivable content, a textual content, a visual content, an audio content, a graphical content;

FIG. 30

1110 Content site data gathered using a process running on a platform of a content site, and indicative of communication between the content site and a computing device responsive to a human user input;

> 1128 Content site data gathered using a process running on a platform of a content site, indicative of communication between the content site and a computing device responsive to a human user input, and related to at least one of a transaction, history, search string, search result, and/or computing-device action associated with the computing device responsive to a human user input;

> 1132 Content site data gathered using a process running on a platform of a content site, indicative of communication between the content site and a computing device responsive to a human user input, and further indicative of at least one of a program resident on the computing device, a process registered with an operating system of the computing device, a cookie present in computing device, data indicative of an affinity of the human user, and/or an information descriptive of an aspect of the computing device;

FIG. 31

1140 Computing device data gathered using a process running on a platform of the computing device, and indicative of communication between the computing device responsive to a human user input and at least one of the content site, a search engine site, and/or a beneficiary site;

1142 Computing device data gathered using a process running on a platform of the computing device, indicative of communication between the computing device responsive to a human user input and at least one of the content site, a search engine site, and/or a beneficiary site, and further indicative of at least one of a program resident on the computing device, a process registered with an operating system of the computing device, a cookie present in computing device, data indicative of an affinity of the human user, and/or a information descriptive of an aspect of the computing device;

1144 Computing device data gathered using a process running on a platform of the computing device, and indicative of communication between the computing device responsive to a human user input and at least one of the content site, a search engine site, and/or a beneficiary site, and further indicative of at least one of a program resident on the computing device, a process registered with an operating system of the computing device, a cookie present in computing device, data indicative of an affinity of the human user, and/or a information descriptive of an aspect of the computing device as provided by a process running on a platform of the computing device;

FIG. 32

1140 Computing device data gathered using a process running on a platform of the computing device, and indicative of communication between the computing device responsive to a human user input and at least one of the content site, a search engine site, and/or a beneficiary site;

1146 Computing device data gathered using a process running on a platform of the computing device, and indicative of communication between the computing device responsive to a human user input and at least one of the content site, a search engine site, and/or a beneficiary site, the communication including communication related to the computing device responsive to a human user input receiving a digital work deliverable to the person;

1148 Computing device data gathered using a process running on a platform of the computing device, and indicative of communication between the computing device responsive to a human user input and at least one of the content site, a search engine site, and/or a beneficiary site, the communication including communication related to the computing device responsive to a human user input receiving at least one of a document; review; critique; comment; rating; aggregations of reviews, comments, and/or critiques; a consumer-generated-media; blog; newsgroup; message board; and/or discussion forum deliverable to the person;

FIG. 33

1140 Computing device data gathered using a process running on a platform of the computing device, and indicative of communication between the computing device responsive to a human user input and at least one of the content site, a search engine site, and/or a beneficiary site;

1152 Computing device data gathered using a process running on a platform of the computing device, and indicative of communication between the computing device responsive to a human user input and at least one of the content site, a search engine site, and/or a beneficiary site, the communication including communication related to the computing device and responsive to a transaction, history, search string, search result, and/or computing-device action associated with the computing device;

1154 Computing device data gathered using a process running on a platform of the computing device, and indicative of communication between the computing device responsive to a human user input and at least one of the content site, a search engine site, and/or a beneficiary site, the communication including communication related to the computing device receiving at least one of an electronic content deliverable to the person, a human perceivable content, a textual content, a visual content, an audio content, and/or a graphical content;

FIG. 34

1140 Computing device data gathered using a process running on a platform of the computing device, and indicative of communication between the computing device responsive to a human user input and at least one of the content site, a search engine site, and/or a beneficiary site;

1156 Computing device data gathered using a process running on a platform of the computing device, and indicative of communication between the computing device responsive to a human user input and at least one of the content site, a search engine site, and/or a beneficiary site, the communication including communication related to the computing device receiving at least one of a transaction, history, search string, search result, and/or computing-device action associated with computing device;

FIG. 35

1160 Search engine site data gathered using a process running on a platform of the search engine site, and indicative of communication between the search engine site and the computing device responsive to a human user input;

1162 Search engine site data gathered using a process running on a platform of the search engine site, and indicative of communication between the search engine site and the computing device responsive to a human user input, the communication including communication related to at least one of a transaction, history, search string, search result, and/or an action associated with the computing device;

1164 Search engine site data gathered using a process running on a platform of the search engine site, and indicative of communication between the search engine site and the computing device responsive to a human user input, the communication including communication related to at least one of a program resident on the computing device, a process registered with an operating system of the computing device, a cookie present in computing device, data indicative of an affinity of the human user, and/or a information descriptive of an aspect of the computing device;

FIG. 36

1160 Search engine site data gathered using a process running on a platform of the search engine site, and indicative of communication between the search engine site and the computing device responsive to a human user input;

1166 Search engine site data gathered using a process running on a platform of the search engine site, and indicative of communication between the search engine site and the computing device responsive to a human user input, the communication including communication related to at least one of a program resident on the computing device, a process registered with an operating system of the computing device, a cookie present in computing device, data indicative of an affinity of the human user, and/or a information descriptive of an aspect of the computing device provided by a process running on a platform of the computing device;

FIG. 37

1170 Beneficiary site data gathered using a process running on a platform of the beneficiary site, and indicative of communication between the computing device responsive to a human user input and the beneficiary site.

1172 Beneficiary site data gathered using a process running on a platform of the beneficiary site, and indicative of at least one of communication associated with a purchase, communication associated with a vote, communication associated with a fund raising, and/or communication associated with a transaction between the computing device responsive to a human user input and the beneficiary site.

1174 Beneficiary site data gathered using a process running on a platform of the beneficiary site, and indicative of communication between the computing device responsive to a human user input and the beneficiary site, the communication between the computing device responsive to a human user input and the beneficiary site initiated by a human action unrestricted by an electronic content of the content site.

FIG. 38

1180 Determining a correlation between:

the communication between the content site and a computing device responsive to a human user input; and the communication between the computing device responsive to a human user input and the beneficiary site.

> 1182 At least one of estimating, approximating, and/or inferring a correlation between:
>
> the communication between the content site and a computing device responsive to a human user input; and
>
> the communication between the computing device responsive to a human user input and the beneficiary site.

> 1184 Predicting a future behavior of the human user in response to a determined correlation between:
>
> the communication between the content site and a computing device responsive to a human user input; and
>
> the communication between the computing device responsive to a human user input and the beneficiary site.

> 1186 Determining at least one of a linear correlation, a relationship, a non-linear correlation, a fuzzy correlation, and/or a fuzzy relationship between (a) the communication between the content site and the computing device responsive to a human user input and (b) the communication between the computing device responsive to a human user input and the beneficiary site.

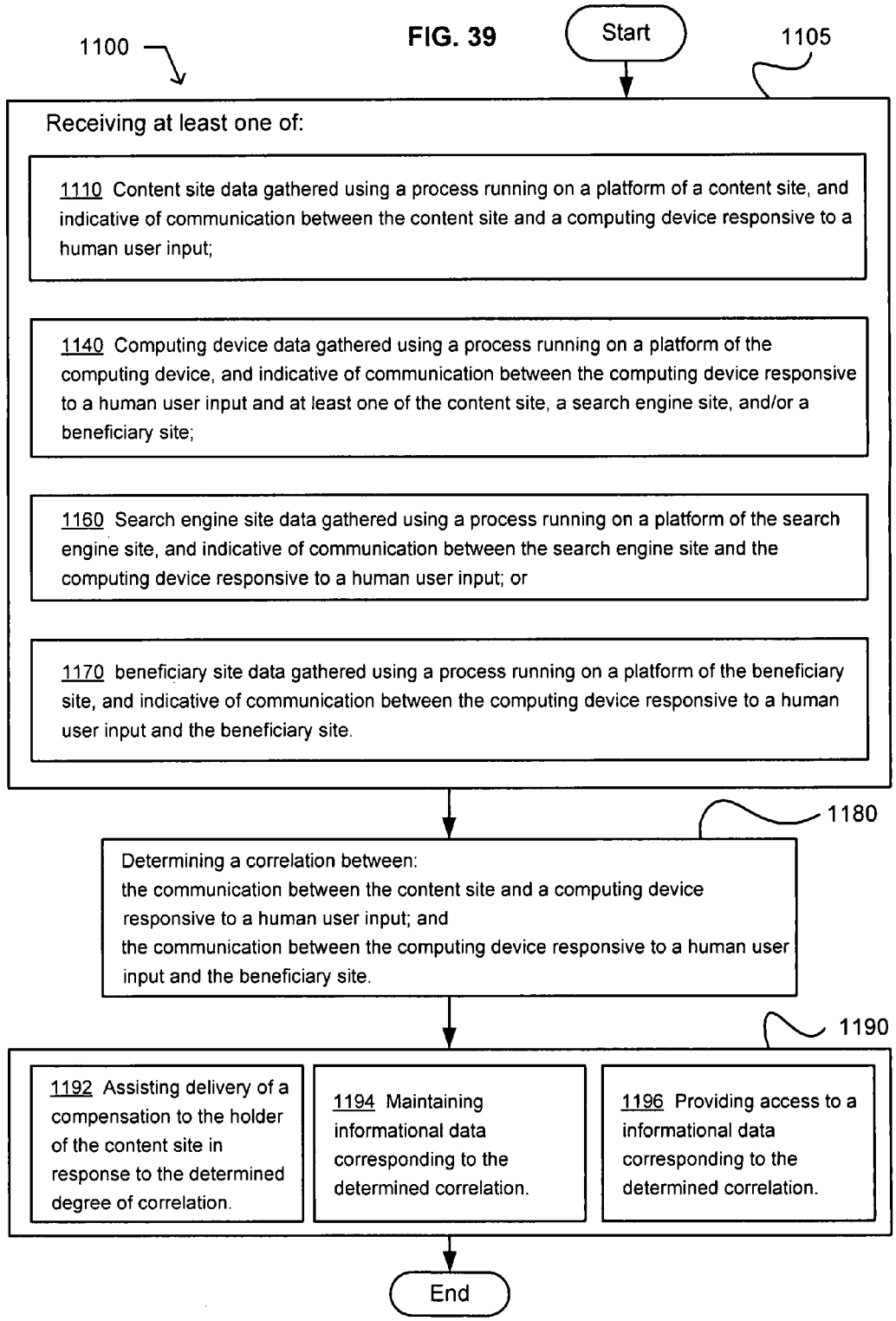

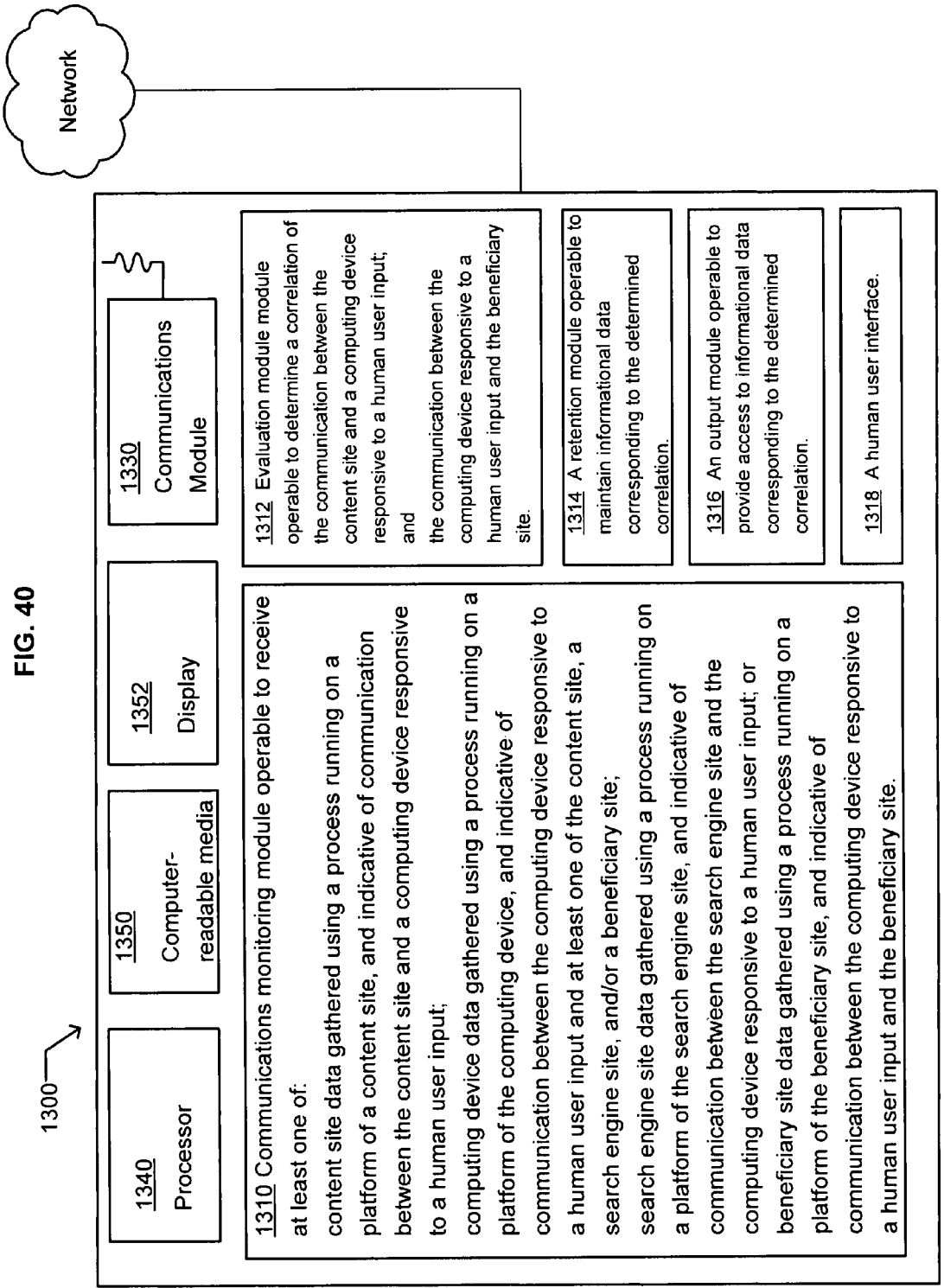

1410 A computer-readable signal bearing medium.

1420 Program instructions operable to perform an influence evaluation process in a computing device, the process includes:

receiving at least one of:
content site data gathered using a process running on a platform of a content site, and indicative of communication between the content site and a computing device responsive to a human user input;
search engine site data gathered using a process running on a platform of the search engine site, and indicative of communication between the search engine site and the computing device responsive to a human user input; or
beneficiary site data gathered using a process running on a platform of the beneficiary site, and indicative of communication between the computing device responsive to a human user input and the beneficiary site; and
assessing an influence of the content site on an involvement between the computing device responsive to a human user input and the beneficiary site.

1422 Receiving data indicative of an affinity of a human user of the computing device.

1424 Outputting the influence assessment in a form usable by a process facilitating delivery of a benefit to an owner of the content site.

1426 Maintaining informational data corresponding to the assessment of influence.

1428 Providing access to maintained informational data corresponding to the assessment of influence.

1432 A computer storage medium.

1434 A communications medium.

1510 Means for receiving at least one of:

content site data gathered using a process running on a platform of a content site, and indicative of communication between the content site and a computing device responsive to a human user input;

computing device data gathered using a process running on a platform of the computing device, and indicative of communication between the computing device and at least one of the content site, a search engine site, and/or a beneficiary site;

search engine site data gathered using a process running on a platform of the search engine site, and indicative of communication between the search engine site and the computing device responsive to a human user input; or beneficiary site data gathered using a process running on a platform of the beneficiary site, and indicative of communication between the computing device and the beneficiary site.

1512 Means for assessing an influence of the content site on an involvement between the computing device responsive to a human user input and the beneficiary site.

1522 Means for receiving data indicative of an affinity of a human user of the computing device.

1524 Means for outputting the influence assessment in a form usable by a process facilitating delivery of a benefit to an owner of the content site.

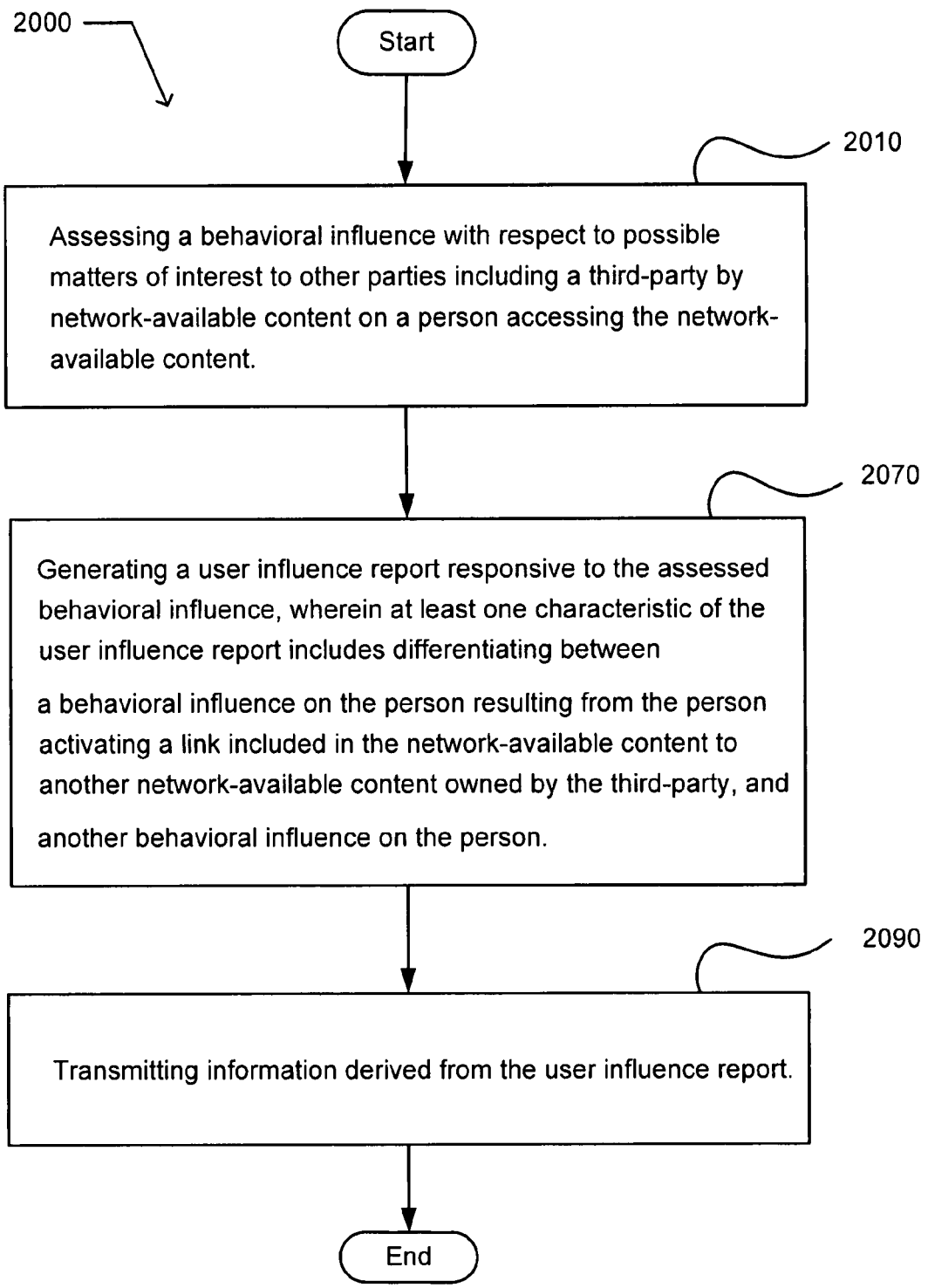

Assessing a behavioral influence with respect to possible matters of interest to other parties including a third-party by network-available content on a person accessing the network-available content.

2012 Using a computing device facilitating the person accessing the network-available content to assess a behavioral influence by the network-available content on a person accessing the network-available content with respect to possible matters of interest to other parties including a third-party.

2014 Using a client-side computing device that is facilitating the person accessing the network-available content to assess a behavioral influence by the network-available content on a person accessing the network-available content with respect to possible matters of interest to other parties including a third-party.

2016 Using a user-side computing device to facilitate the person accessing the network-available content to assess a behavioral influence by the network-available content on a person accessing the network-available content with respect to possible matters of interest to other parties including a third-party.

2018 Using a content server that is facilitating the person accessing the network-available content to assess a behavioral influence by network-available content on a person accessing the network-available content.

2022 Using a search engine site facilitating the person accessing the network-available content to assess a behavioral influence by network-available content on a person accessing the network-available content with respect to possible matters of interest to other parties including a third-party.

Assessing a behavioral influence with respect to possible matters of interest to other parties including a third-party by network-available content on a person accessing the network-available content.

---

2024 Using a network intermediary device that is facilitating the person accessing the network-available content to assess a behavioral influence by network-available content on a person accessing the network-available content with respect to possible matters of interest to other parties including a third-party.

2026 Using a page tag information processor to assess a behavioral influence by network-available content on a person accessing the network-available content with respect to possible matters of interest to other parties including a third-party.

2028 Assessing a behavioral influence by network-available content on a person accessing the network-available content, the assessment of behavioral influence responsive to data acquired by a computing device facilitating the person accessing the network available content with respect to possible matters of interest to other parties including a third-party.

2032 Assessing a behavioral influence by network-available content on a person accessing the network-available content with respect to possible matters of interest to other parties including a third-party, the assessment of behavioral influence responsive to data acquired by at least two sources, the at least two sources include at least one of a computing device facilitating the person accessing the network available content, a content server facilitating the person accessing the network-available content, a search engine site facilitating the person accessing the network-available content, and/or a third-party site.

Assessing a behavioral influence with respect to possible matters of interest to other parties including a third-party by network-available content on a person accessing the network-available content.

2036 Assessing a behavioral influence with respect to possible matters of interest to other parties including a third-party by network-available content on a person accessing the network-available content, the assessment of behavioral influence responsive at least in part to data collected using a process received from a search engine site and running on a computing device facilitating access the network-available content by the person.

2038 Assessing a behavioral influence with respect to possible matters of interest to other parties including a third-party by network-available content on a person accessing the network-available content, the network-available content including a first content having a first-content portion and a second content having a second-content portion.

2042 Assessing a behavioral influence with respect to possible matters of interest to other parties including a third-party by network-available content on a person accessing the network-available content, the network-available content including a first content having a first-content portion hosted by a first content server and a second content having a second-content portion hosted by a second server.

2044 Assessing a behavioral influence by a static or a dynamic network-available content on a person accessing the network-available content with respect to possible matters of interest to other parties including a third-party.

FIG. 49

Assessing a behavioral influence with respect to possible matters of interest to other parties including a third-party by network-available content on a person accessing the network-available content.

─ 2010

2046 Assessing a behavioral influence by the network-available content on a person exposed to the network-available content with respect to possible matters of interest to other parties including a third-party.

2048 Assessing a behavioral influence with respect to possible matters of interest to other parties including a third-party by network-available content on a person accessing the network-available content, wherein the possible matters of interest include at least one of sales, purchases, enrollment, membership, signing up for email lists, votes, and/or enrollment.

2052 Assessing a behavioral influence by downloaded network content presented to the person with respect to possible matters of interest to other parties including a third-party.

2054 Assessing a behavioral influence by a transformed network-available content on the person accessing the transformed network-available content with respect to possible matters of interest to other parties including a third-party.

2056 Assessing a behavioral influence by pushed or a pulled network-available content on a person accessing the network-available content with respect to possible matters of interest to other parties including a third-party.

Generating a user influence report responsive to the assessed behavioral influence, wherein at least one characteristic of the user influence report includes differentiating between a behavioral influence on the person resulting from the person activating a link included in the network-available content to another network-available content owned by the third-party, and another behavioral influence on the person.

| 2072 Generating a user influence report responsive to the assessed behavioral influence, a characteristic of the user influence report including at least one of a single bit, a document, an XML document, a dynamic report, a two-way report, a one-time snapshot, behavioral log, summary log, behavioral comparison, a historical comparison and/or activity history. | 2074 Activating a hyperlink included in the network-available content to another network-available content owned by the third-party. | 2076 Activating an address included in the network-available content that points to another network-available content owned by the third-party. | 2078 A behavioral influence on the person corresponding to at least one of a behavior influence on the person with respect to the network-available content, with respect to a subsequently accessed network-available content, with respect to a subsequent search, and/or with respect to the third-party. |

Generating a user influence report responsive to the assessed behavioral influence, wherein at least one characteristic of the user influence report includes differentiating between a behavioral influence on the person resulting from the person activating a link included in the network-available content to another network-available content owned by the third-party, and another behavioral influence on the person.

2082 A behavioral influence on the person corresponding to at least one of a behavior influence on the person buying, joining, downloading, uploading, and/or voting with respect to a matter of interest to the third-party.

2084 A behavioral influence on the person corresponding to at least one of the person's inputs, keystrokes, navigation commands, mouse movements, caching, sessions, and/or visits.

2086 A behavioral influence on the person corresponding to at least one of the person's activity associated with, incidental to, and/or responsive to mouse movements, scrolling movements, purchases, operations, visited Websites, visited blogs, page views, page visits, viewing time, repeat visits, page tags, printing a content, click stream, search strings, local search strings, interactions, scrolling, menu activity, corresponding/related to browsing the Internet, cut and paste, print history, browsing history, email, and/or cookies received.

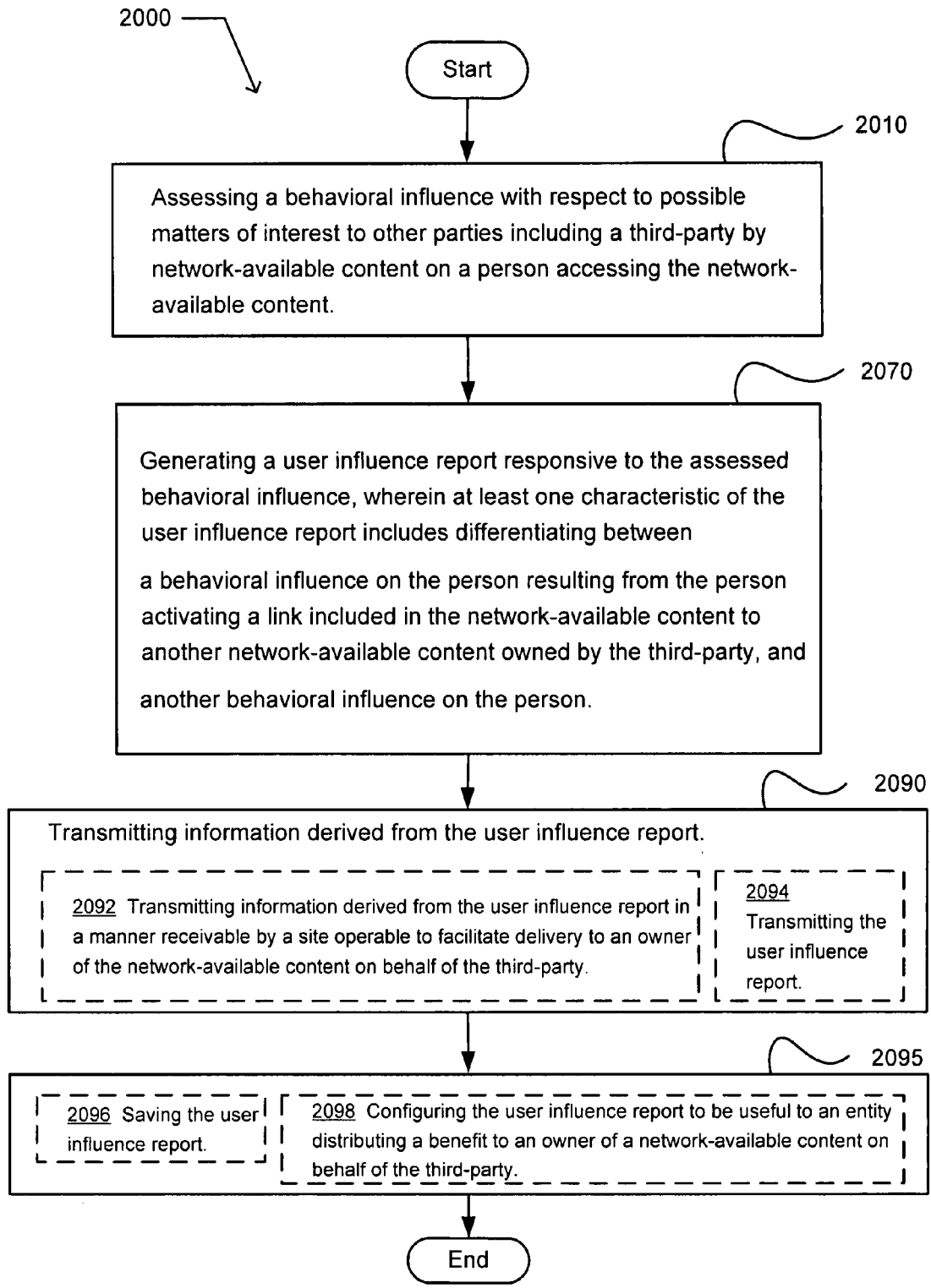

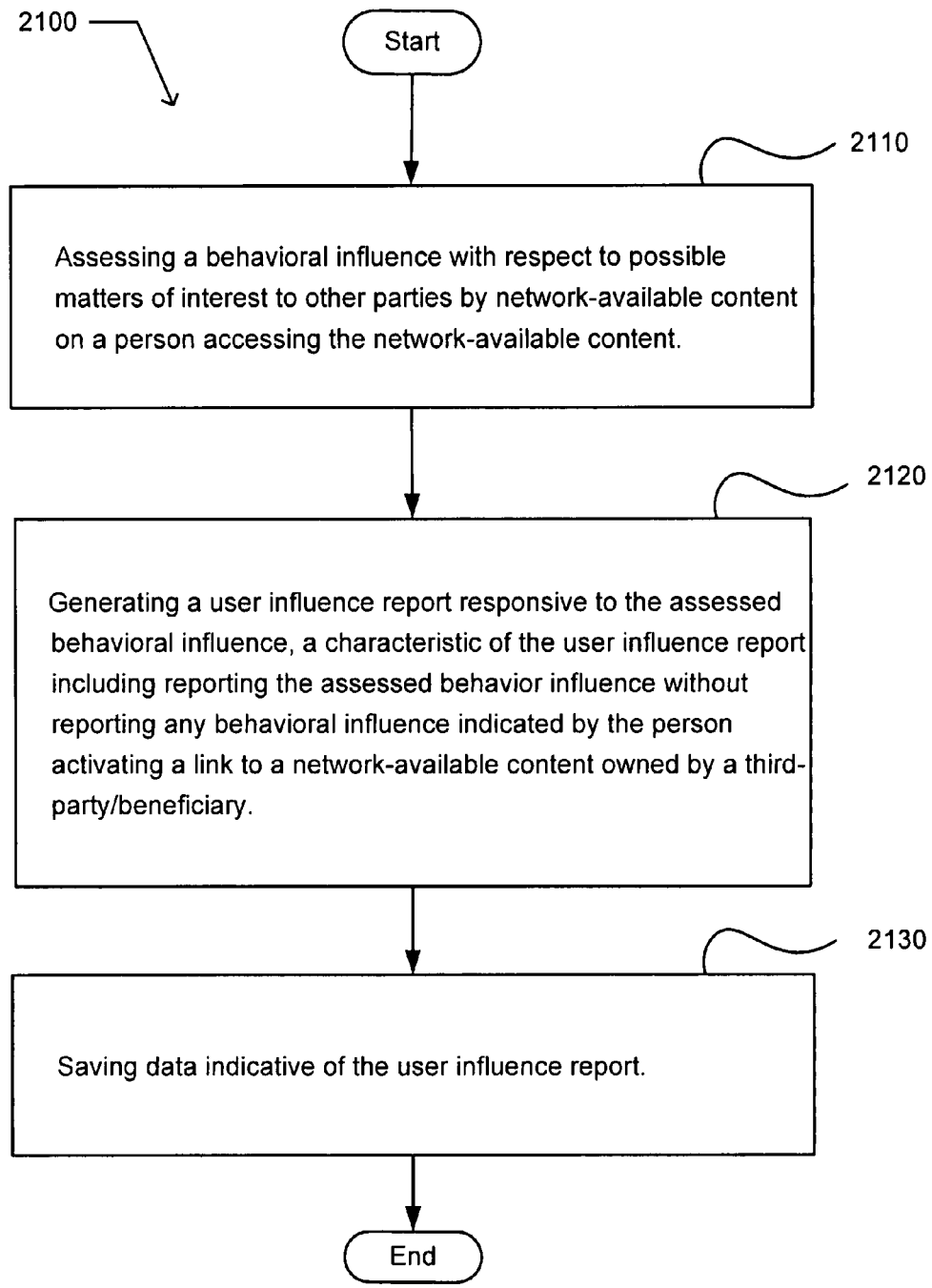

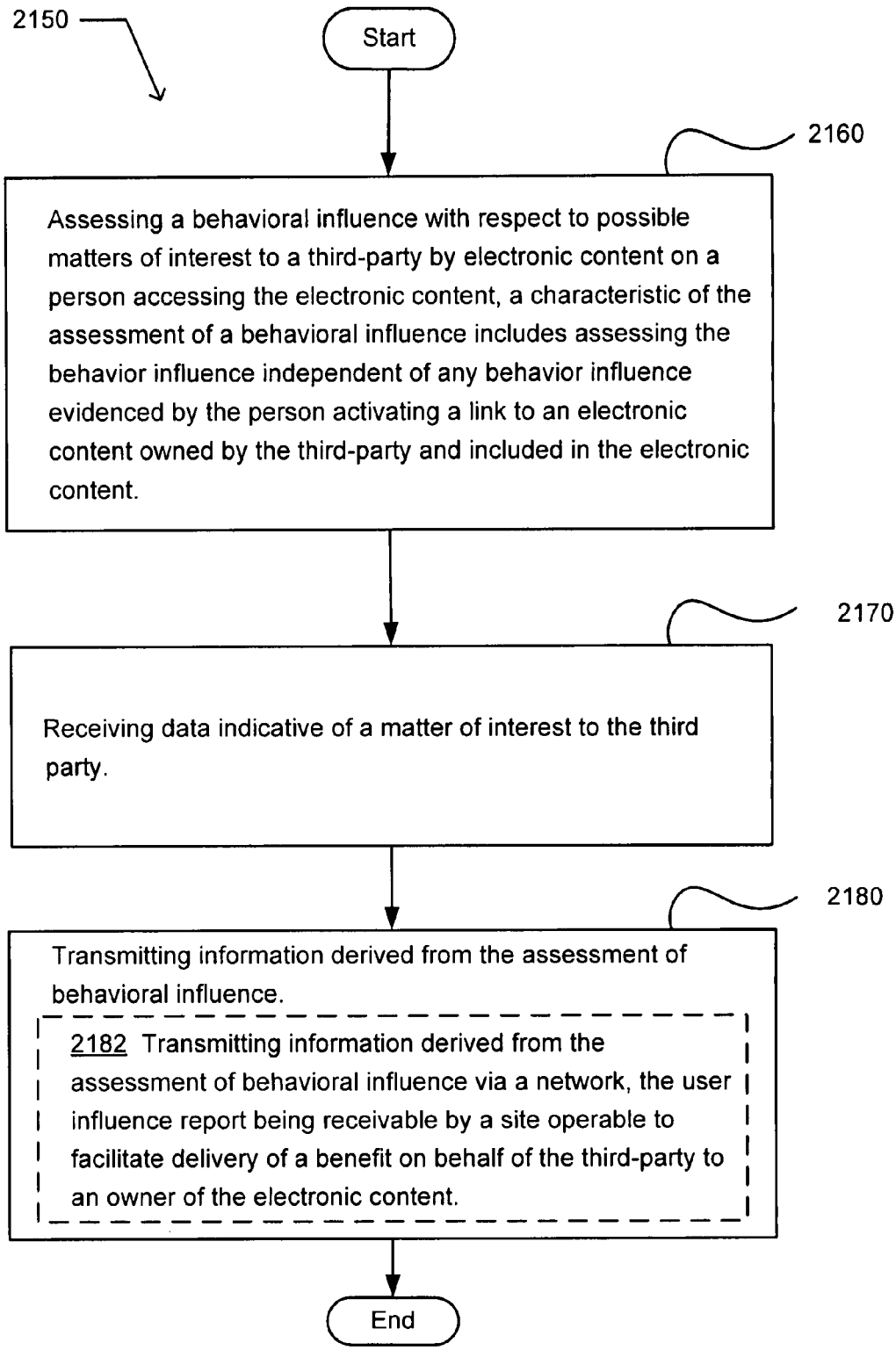

2310 A computer-readable signal bearing medium.

2320  Program instructions operable to perform a process in a computing device, the process includes:

assess a behavioral influence with respect to possible matters of interest to other parties including a third-party by network-available content on a person accessing the network-available content;

generate a user influence report responsive to the assessed behavioral influence, wherein a characteristic of the user influence report includes differentiating between a behavioral influence on the person resulting from the person activating a link to another network-available content owned by the third-party that is included in the network-available content, and another behavioral influence on the person;

provide information derived from the user influence report; and save data indicative of the user influence report.

2312 A computer storage medium.

2314 A communications medium.

2330 Means for assessing a behavioral influence with respect to possible matters of interest to other parties including a third-party by network-available content on a person accessing the network-available content.

2335 Means for generating a user influence report responsive to the assessed behavioral influence, wherein at least one characteristic of the user influence report includes differentiating between a behavioral influence on the person resulting from the person activating a link included in the network-available content to another network-available content owned by the third-party that is included in the network-available content, and another behavioral influence on the person.

2340 Means for transmitting information derived from the user influence report via a network.

2345 Means for for saving the user influence report.

Collecting data indicative of a person accessing electronic content over a computer network using a user computing device, the data collected using a process included in a platform of the user computing device.

| 2512 Collecting data indicative of a person accessing electronic content over a computer network using a user computing device, the data collected using a process incorporated into a platform of the user computing device. | 2514 Collecting data indicative of a person accessing electronic content over a computer network using a user computing device, the data collected using at least one of a kernel mode, user mode, application, and/or program process included in a platform of the user computing device. | 2516 Collecting data indicative of a person accessing electronic content over a computer network using a user computing device, the data collected using a process that is at least one of bundled with, integrated into, registered with and/or added on to a platform of the user computing device. | 2518 Collecting data indicative of a person accessing electronic content over a computer network using a user computing device, the data collected using a process included in a platform of the user computing device, the platform including at least one of a Windows based platform of the Windows family, a Unix based platform of the Unix family, or a Mac OS based platform of the Mac OS family. |

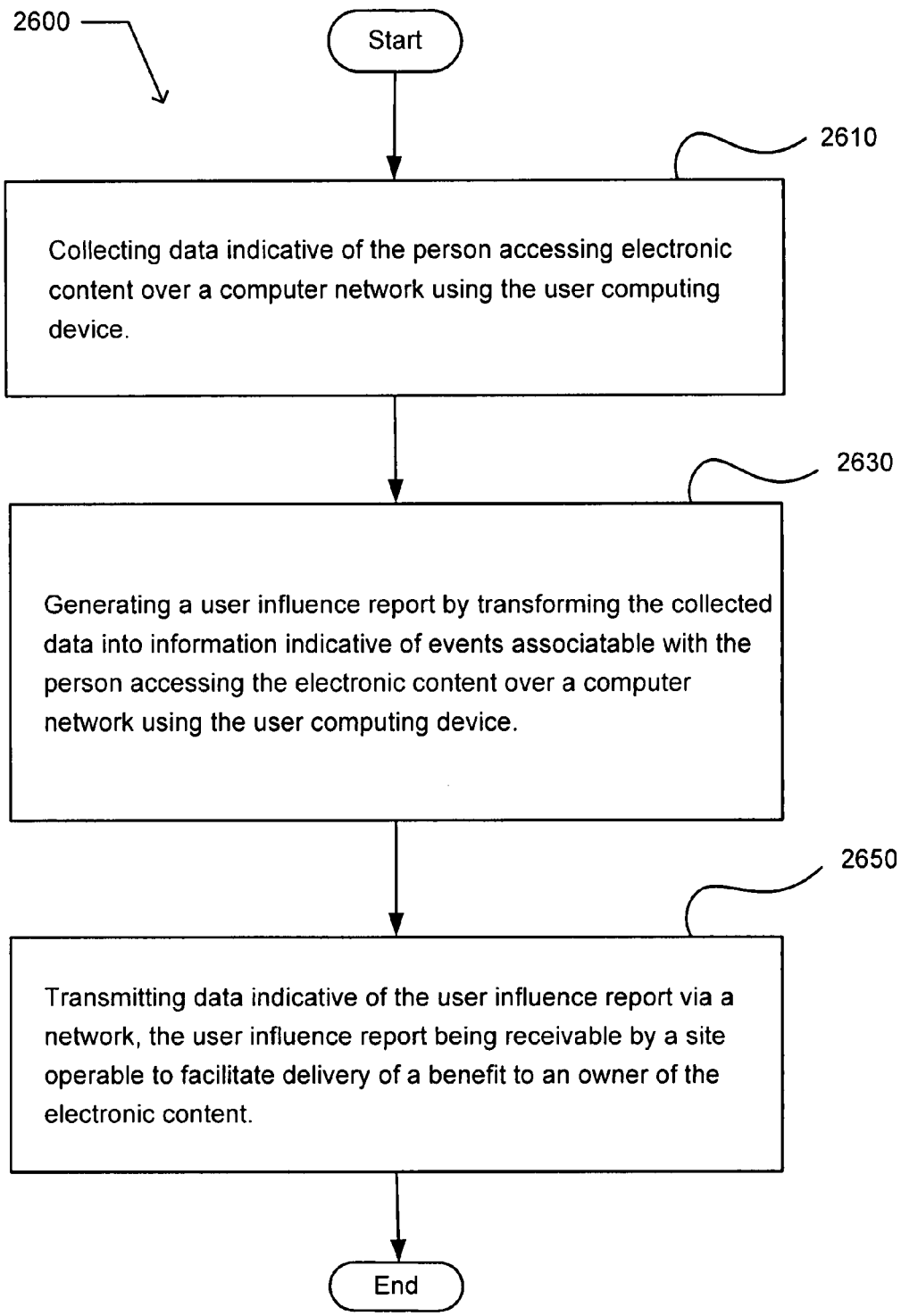

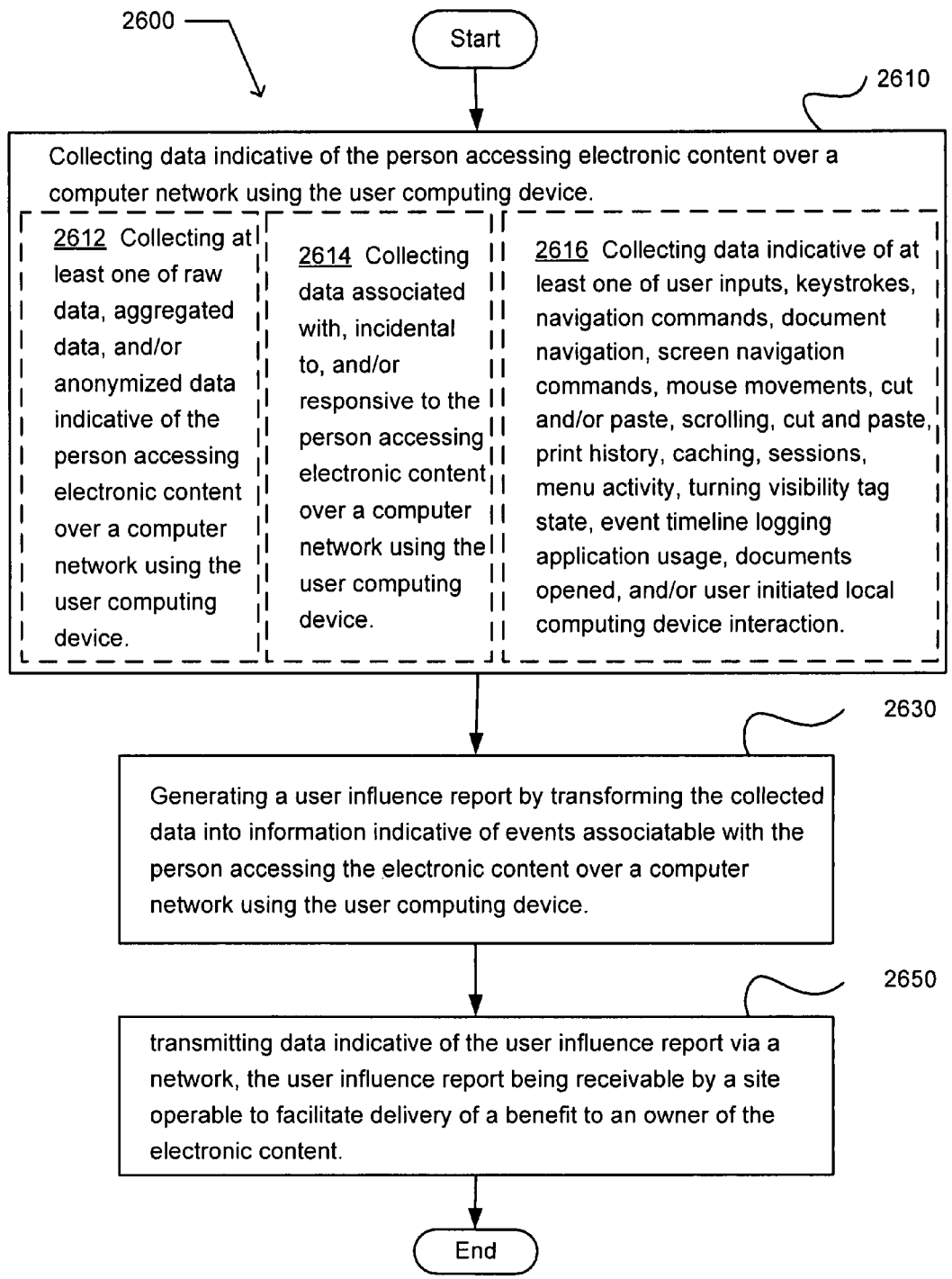

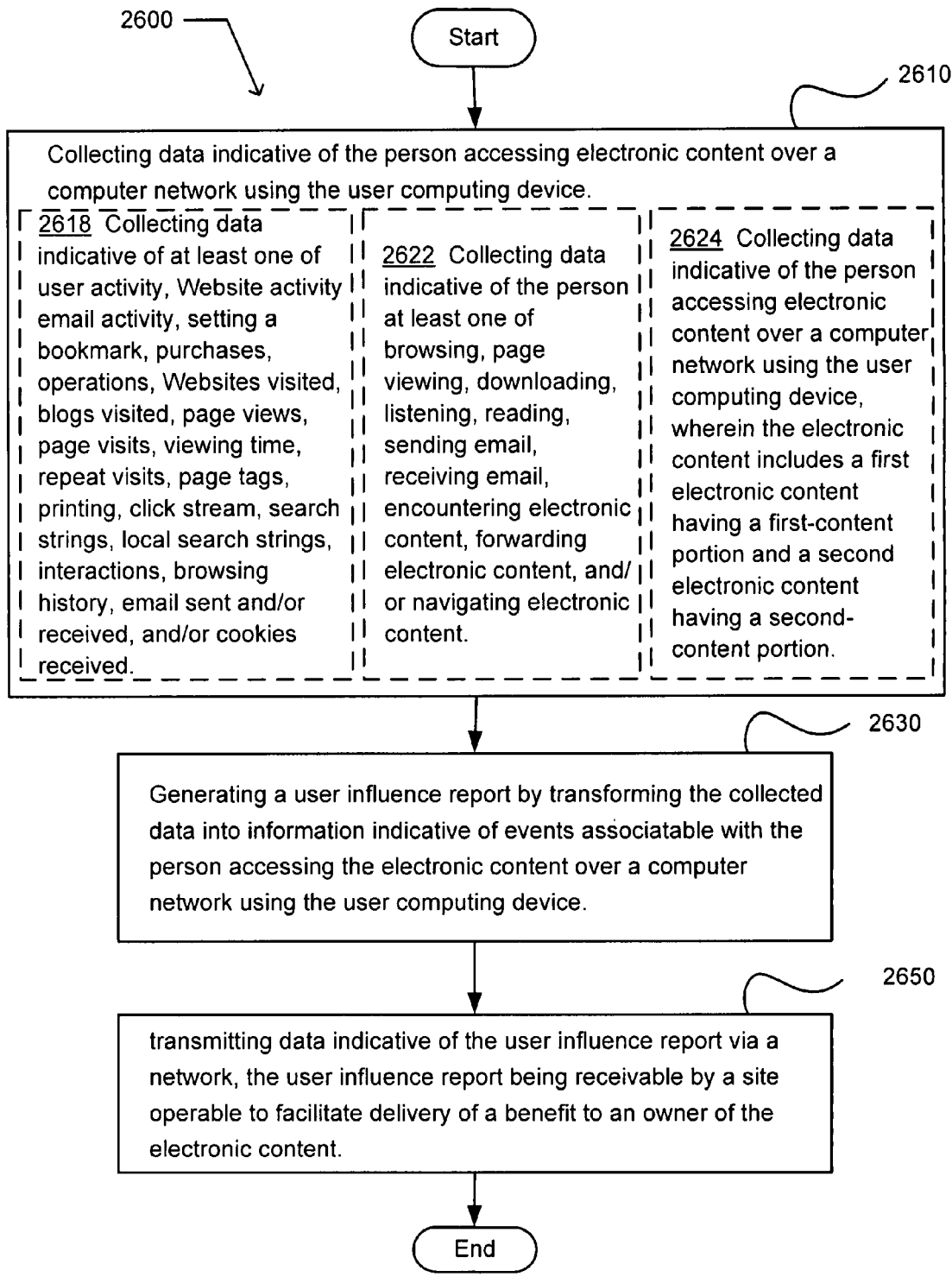

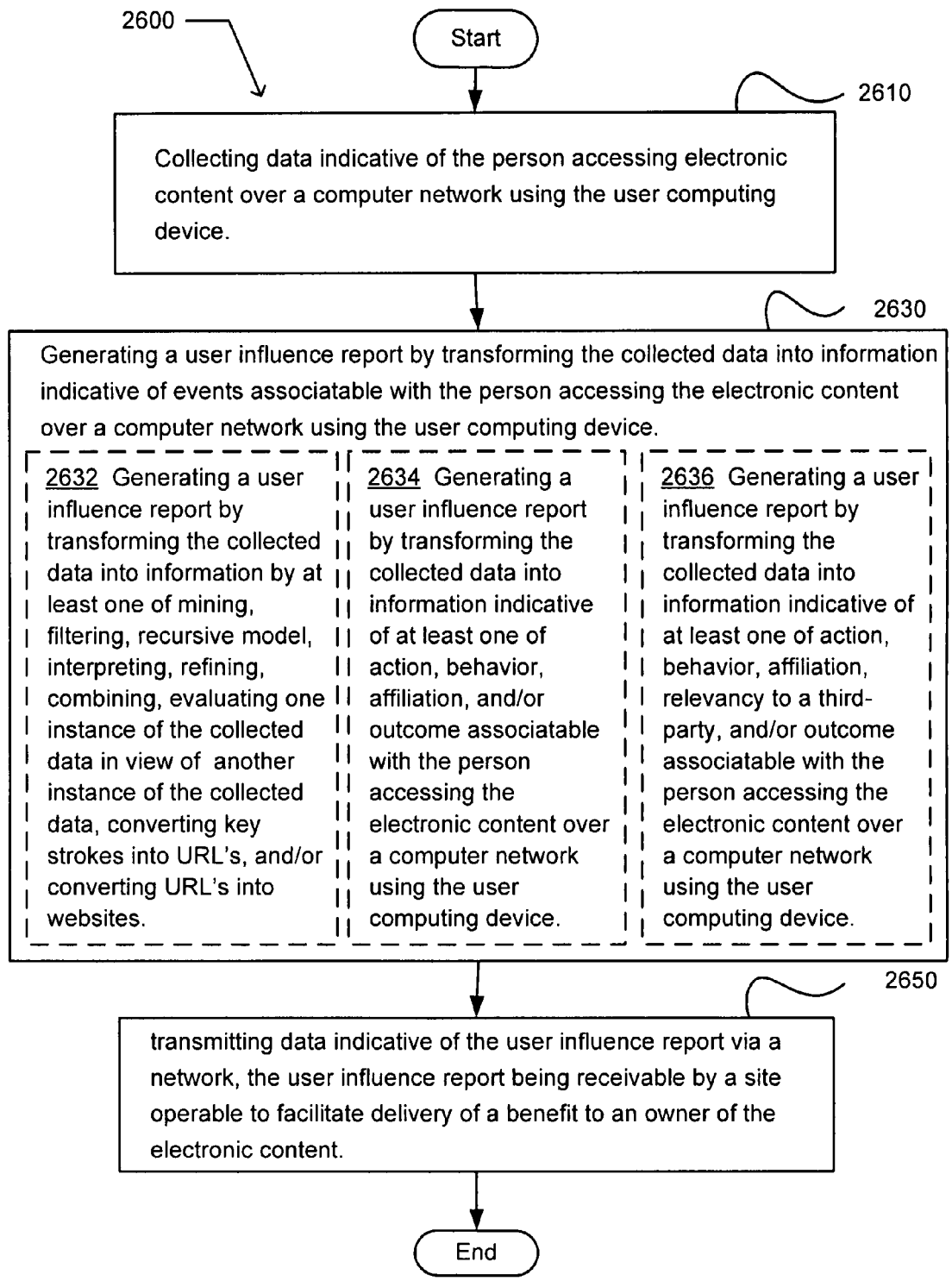

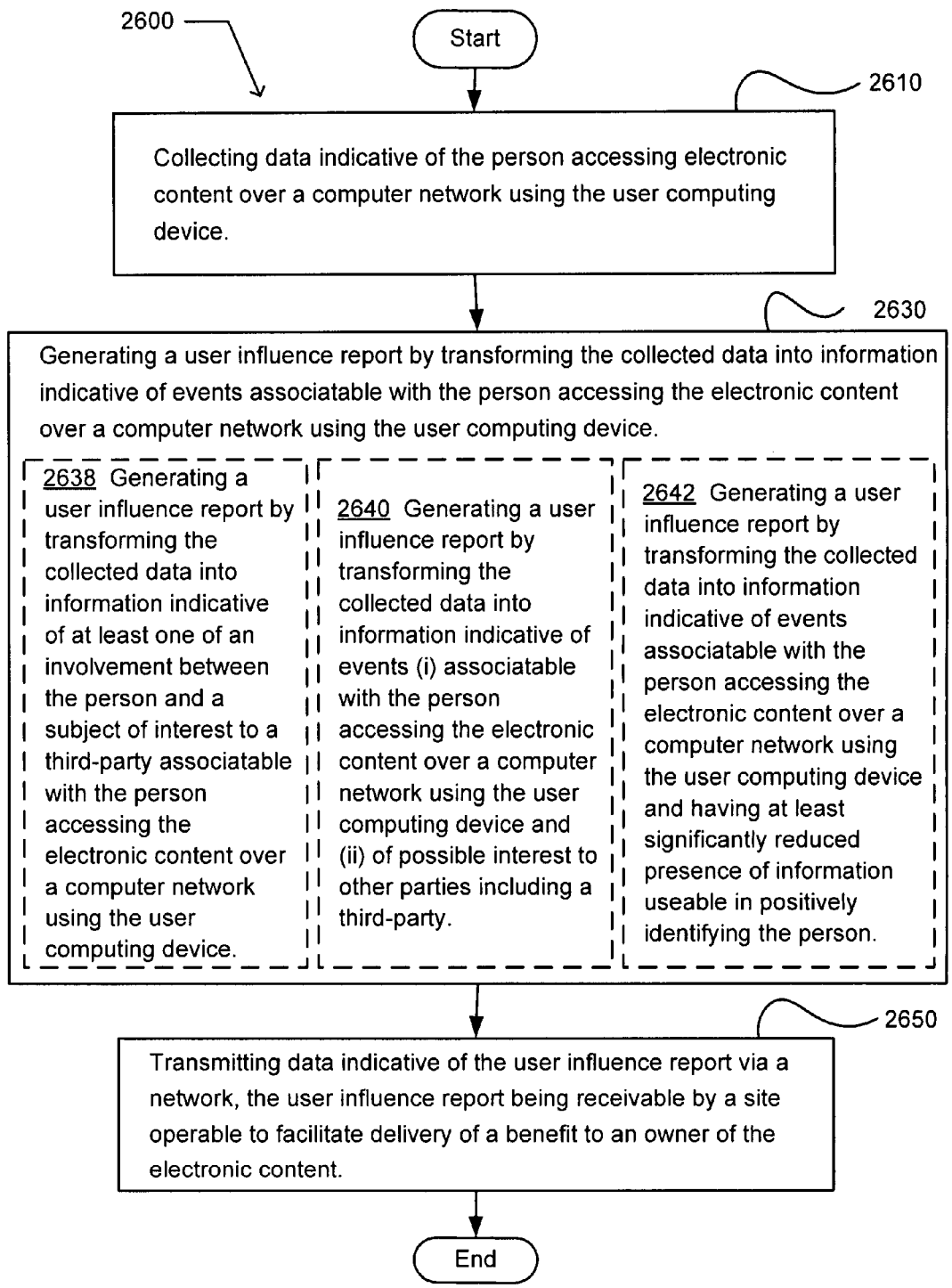

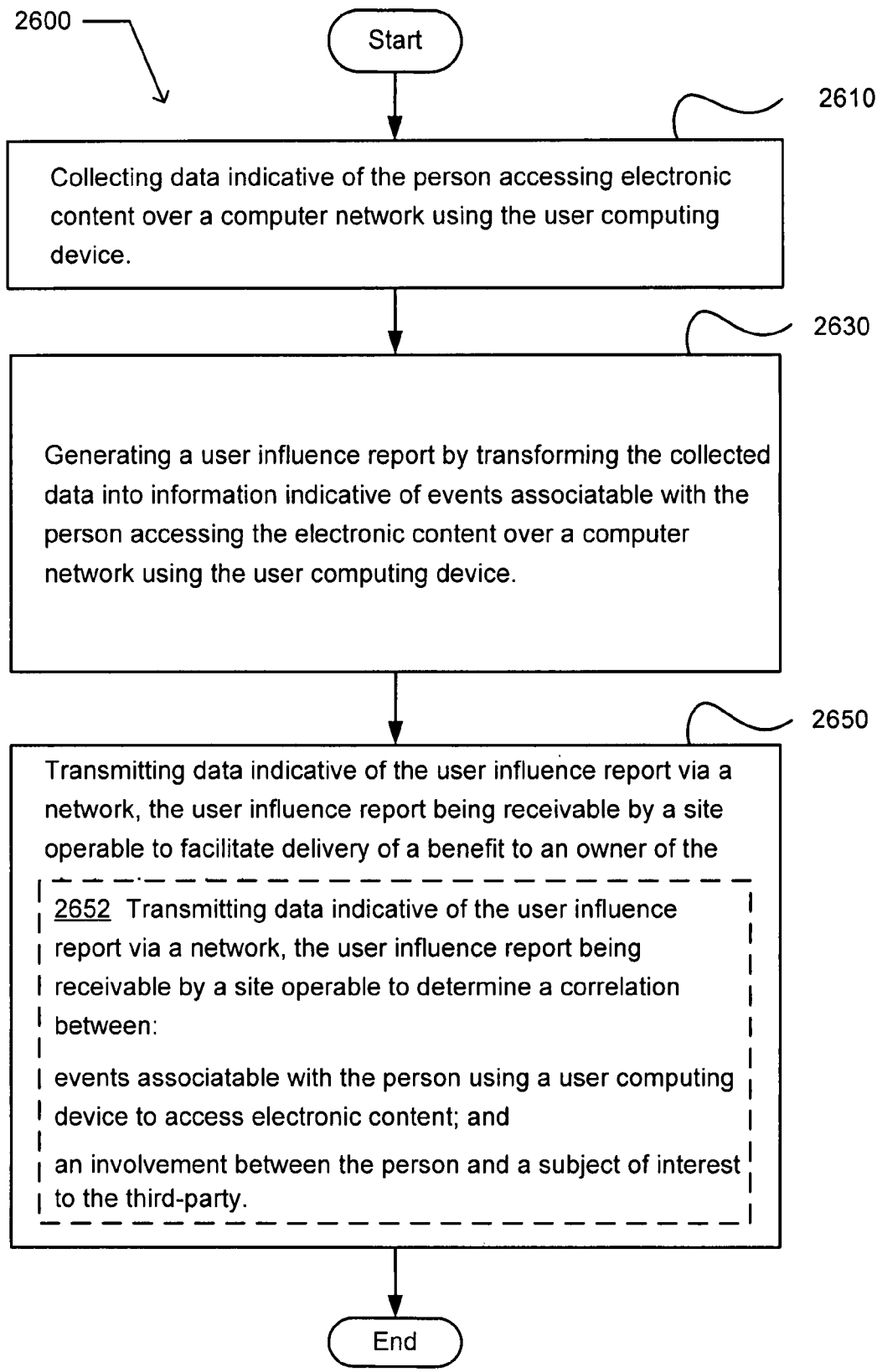

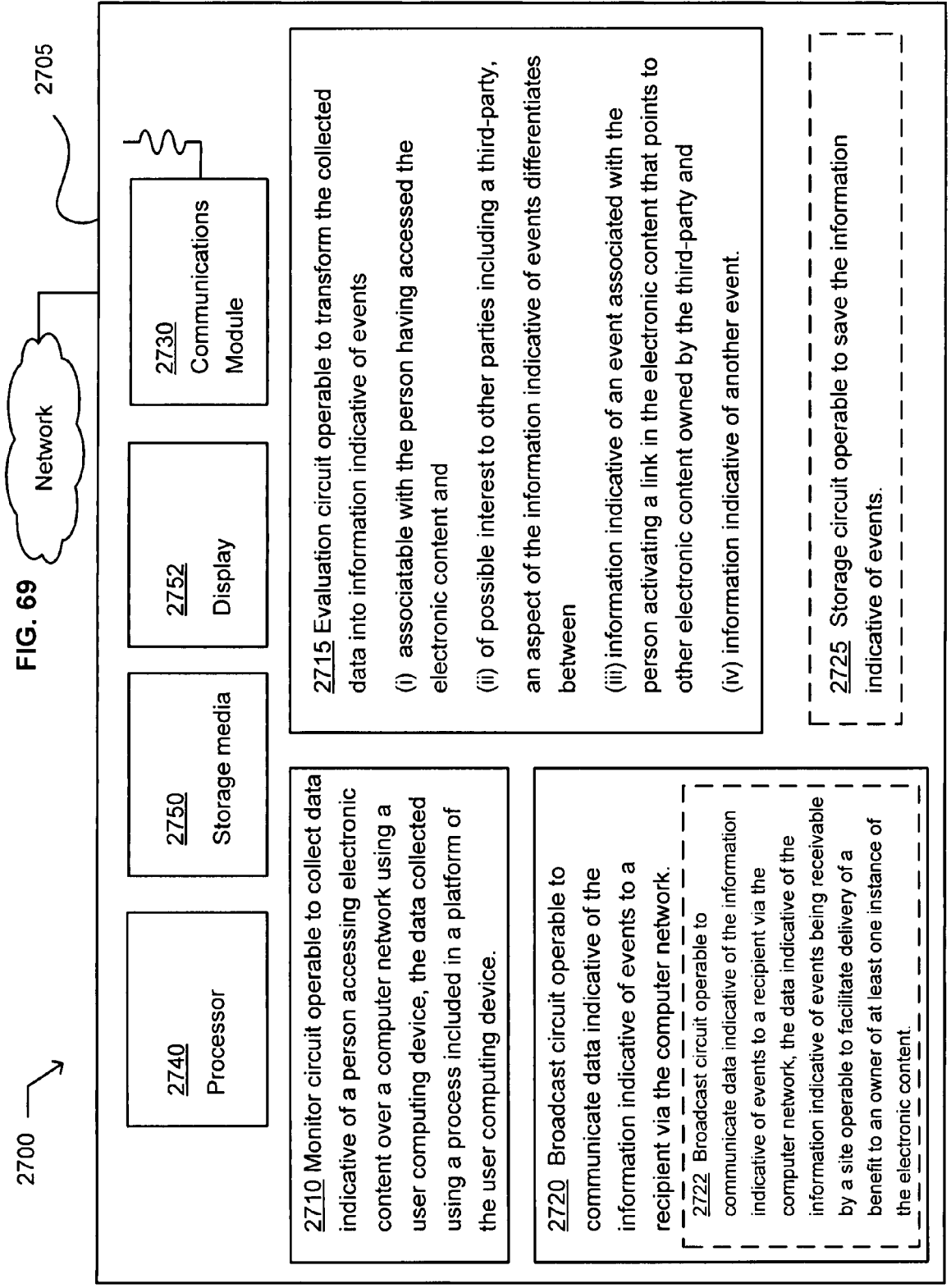

2810 A computer-readable signal bearing medium bearing the program instructions.

2820 Program instructions operable to perform a process in a computing device, the process includes:

collect data using the computing device indicative of a person accessing electronic content over a computer network using the computing device;

generate a user influence report using the computing device by transforming the collected data into information indicative of events associatable with the person accessing the electronic content over the computer network using the computing device;

transmit data indicative of the user influence report to a recipient via the computer network; and save the data indicative of the user influence report.

2822 Program instructions incorporated into a platform of the computing device and operable to perform a process in the computing device.

2824 Program instructions received from a search engine provider and operable to perform a process in the computing device.

2832 A computer storage medium.

2834 A communications medium.

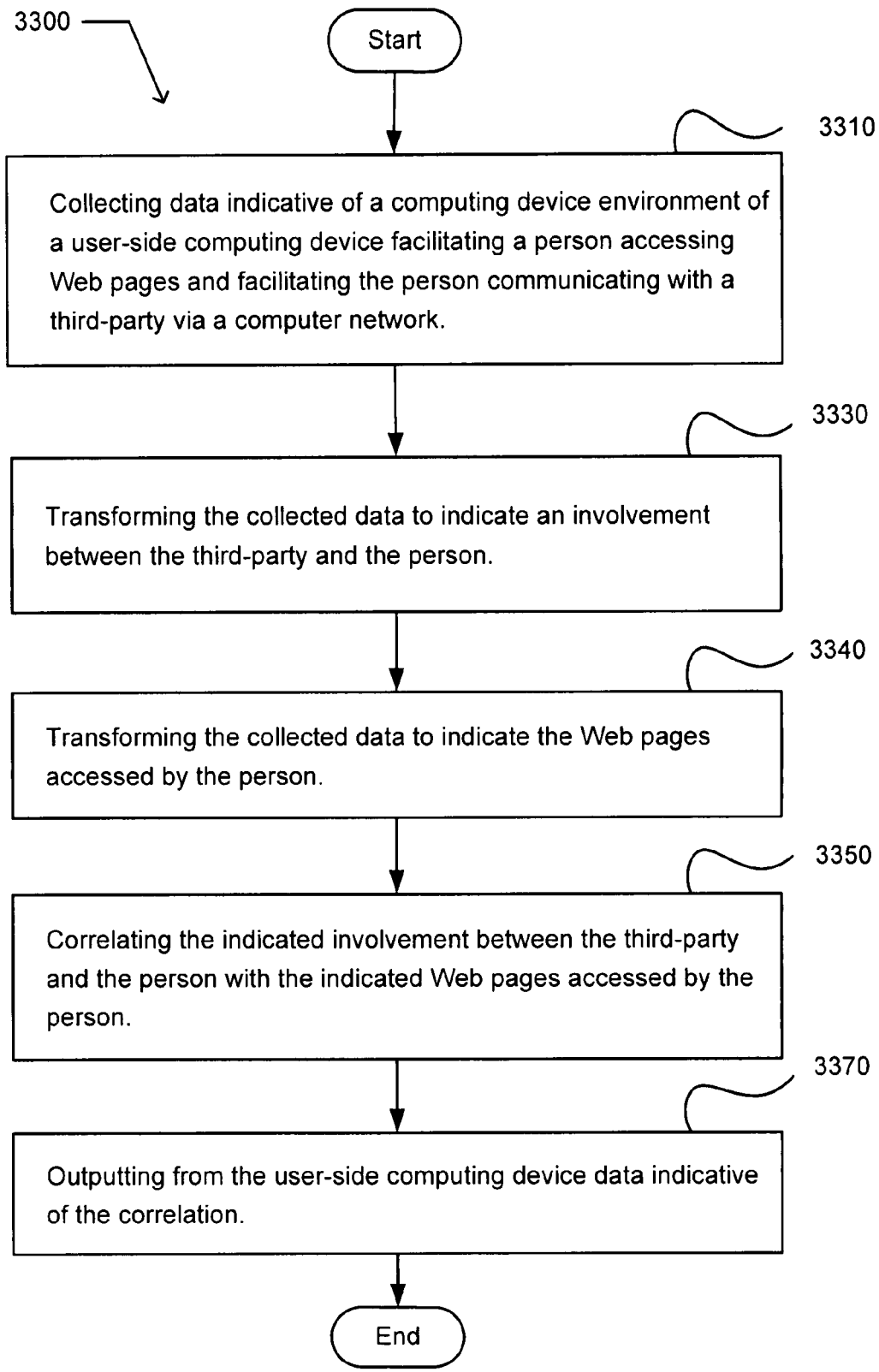

Collecting data indicative of a computing device environment of a user-side computing device facilitating a person accessing Web pages via a computer network.

3312 Collecting data indicative of at least one of a hardware environment, a software environment, and/or a state of a computing device environment of a user-side computing device facilitating a person accessing Web pages and facilitating the person communicating with a third-party via a computer network.

3314 Collecting data indicative of a computing device environment of a user-side computing device facilitating a person accessing Web pages and facilitating the person communicating with a third-party via a computer network, the data collected using a process included in a platform of the user-side computing device.

3316 Collecting data indicative of a computing device environment of a user-side computing device facilitating a person accessing Web pages and facilitating the person communicating with a third-party via a computer network, the data collected using a process running on a platform of the user-side computing device and associated with a search engine site.

3318 Collecting data indicative of a computing device environment of a user-side computing device facilitating a person accessing Web pages and facilitating the person communicating with a third-party via a computer network, the Web pages including a first electronic content and a second electronic content.

3510 A computer-readable signal bearing medium bearing the program instructions.

3520   Program instructions operable to perform a process in a user-side computing device, the process includes:
  collect data indicative of a computing device environment of the user-side computing device facilitating a person accessing Web pages and facilitating the person communicating with a third-party via a computer network;
  transform the collected data to indicate an involvement between the third-party and the person;
  transform the collected data to indicate the Web pages accessed by the person;
  examine the transformed collected data for a relationship between
    (i)   the indicated involvement between the third-party and the person; and
    (ii)  the Web pages accessed by the person; and
  output data corresponding to the examined relationship between the indicated involvement and the Web pages accessed by the person.

3522 Program instructions incorporated into a platform of the user-side computing device and operable to perform a process in the computing device.

3524 Program instructions operable to collaborate with a search engine and operable to perform a process in the user-side computing device.

3526 Anonymize in response to a confidentiality policy the relationship between the indicated involvement and the Web pages accessed by the person.

3532 A computer storage medium.

3534 A communications medium.

COLLECTING INFLUENCE INFORMATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/824,582, entitled COLLECTING INFLUENCE INFORMATION naming Gary W. Flake; William H. Gates, III; Alexander G. Gounares; W. Daniel Hillis; Royce A. Levien; Robert W. Lord; Mark A. Malamud; Craig J. Mundie; Christopher D. Payne; Richard F. Rashid; Clarence T. Tegreene; Charles Whitmer; Lowell L. Wood, Jr. as inventors, filed Jun. 29, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/799,460, entitled REWARDING INFLUENCERS naming Gary W. Flake; William H. Gates, III; Alexander G. Gounares; W. Daniel Hillis; Royce A. Levien; Mark A. Malamud; Craig J. Mundie; Christopher D. Payne; Richard F. Rashid; Clarence T. Tegreene; Charles Whitmer; Lowell L. Wood, Jr. as inventors, filed Apr. 30, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/799,461, entitled DETERMINING INFLUENCERS naming Gary W. Flake; William H. Gates, III; Alexander G. Gounares; W. Daniel Hillis; Royce A. Levien; Mark A. Malamud; Craig J. Mundie; Christopher D. Payne; Richard F. Rashid; Clarence T. Tegreene; Charles Whitmer; Lowell L. Wood, Jr. as inventors, filed Apr. 30, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/824,551, entitled REPORTING INFLUENCE ON A PERSON BY NETWORK-AVAILABLE CONTENT naming Gary W. Flake; William H. Gates, III; Alexander G. Gounares; W. Daniel Hillis; Royce A. Levien; Robert W. Lord; Mark A. Malamud; Craig J. Mundie; Christopher D. Payne; Richard F. Rashid; Clarence T. Tegreene; Charles Whitmer; Lowell L. Wood, Jr. as inventors, filed Jun. 29, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/824,580, entitled DETERMINING AN INFLUENCE ON A PERSON BY WEB PAGES naming Gary W. Flake; William H. Gates, III; Alexander G. Gounares; W. Daniel Hillis; Royce A. Levien; Robert W. Lord; Mark A. Malamud; Craig J. Mundie; Christopher D. Payne; Richard F. Rashid; Clarence T. Tegreene; Charles Whitmer; Lowell L. Wood, Jr. as inventors, filed Jun. 29, 2007, which is currently co-pending, or is an application of which a currently co-pending application is entitled to the benefit of the filing date.

The United States Patent Office (USPTO) has published a notice to the effect that the USPTO's computer programs require that patent applicants both reference a serial number and indicate whether an application is a continuation or continuation-in-part. Stephen G. Kunin, Benefit of Prior-Filed Application, USPTO Official Gazette Mar. 18, 2003, available on the web site of the USPTO at www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides method of reporting influence. The method includes assessing a behavioral influence with respect to possible matters of interest to other parties including a third-party by network-available content on a person accessing the network-available content. The method also includes generating a user influence report responsive to the assessed behavioral influence. At least one characteristic of the user influence report includes differentiating between (i) a behavioral influence on the person resulting from the person activating a link included in the network-available content to another network-available content owned by the third-party, and (ii) another behavioral influence on the person. The method further includes transmitting information derived from the user influence report. The method may include saving the user influence report. The method may include configuring the user influence report to be useful to an entity distributing a benefit to an owner of a network-available content on behalf of the third-party. In addition to the foregoing, other method embodiments are described in the claims, drawings, and text that form a part of the present application.

Another embodiment provides a method of reporting influence on a person. The method includes assessing a behavioral influence with respect to possible matters of interest to other parties by network-available content on a person accessing the network-available content. The method also includes generating a user influence report responsive to the assessed behavioral influence, a characteristic of the user influence report including reporting the assessed behavior influence without reporting any behavioral influence indicated by the person activating a link to a network-available content owned by a third-party/beneficiary. The method further includes saving data indicative of the user influence report. In addition to the foregoing, other method embodiments are described in the claims, drawings, and text that form a part of the present application.

A further embodiment provides a method of reporting an influence by electronic-content. The method includes assessing a behavioral influence with respect to possible matters of interest to a third-party by the electronic content on a person accessing the electronic content. A characteristic of the assessment of a behavioral influence includes assessing the behavior influence independent of any behavior influence evidenced by the person activating a link to an electronic content owned by the third-party and included in the electronic content. The method also includes receiving data indicative of a matter of interest to the third party. The method further includes transmitting information derived from the assessment of behavioral influence. In addition to the foregoing, other method embodiments are described in the claims, drawings, and text that form a part of the present application.

An embodiment provides a system. The system includes a computing device couplable with a computer network. The system also includes an evaluation circuit operable to assess a behavioral influence with respect to possible matters of interest to other parties including a third-party by network-available content on a person accessing the network-available content. The system further includes an analysis circuit operable to generate a user influence report responsive to the assessed behavioral influence. At least one characteristic of the user influence report includes differentiating between (i) a behavioral influence on the person associated with the person activating a link to another network-available content owned by the third-party that is included in the network-available content, and (ii) another behavioral influence on the person. The system also includes a broadcast circuit operable to transmit information derived from the user influence report via the computer network. The system may include a storage circuit operable to save the user influence report. In addition to the foregoing, other system embodiments are described in the claims, drawings, and text that form a part of the present application.

Another embodiment provides a computer program product. The computer program product includes program instructions operable to perform a process in a computing device. The process includes assess a behavioral influence with respect to possible matters of interest to other parties including a third-party by network-available content on a person accessing the network-available content. The process also includes generate a user influence report responsive to the assessed behavioral influence. A characteristic of the user influence report includes differentiating between a behavioral influence on the person resulting from the person activating a link to another network-available content owned by the third-party that is included in the network-available content, and another behavioral influence on the person. The process further includes provide information derived from the user influence report. The process also includes save data indicative of the user influence report. The computer program product also includes a computer-readable signal-bearing medium bearing the program instructions. In addition to the foregoing, other computer program product embodiments are described in the claims, drawings, and text that form a part of the present application.

A further embodiment provides an apparatus. The apparatus includes means for assessing a behavioral influence with respect to possible matters of interest to other parties including a third-party by network-available content on a person accessing the network-available content. The apparatus further includes means for generating a user influence report responsive to the assessed behavioral influence. A characteristic of the user influence report includes differentiating between (i) a behavioral influence on the person resulting from the person activating a link included in the network-available content to another network-available content owned by the third-party that is included in the network-available content, and (ii) another behavioral influence on the person. The apparatus also includes means for transmitting information derived from the user influence report via a network. The apparatus may include means for saving the user influence report. In addition to the foregoing, other apparatus embodiments are described in the claims, drawings, and text that form a part of the present application.

An embodiment provides a method of reporting possible influential electronic content. The method includes collecting data indicative of a person accessing electronic content over a computer network using a user computing device. The data collected using a process included in a platform of the user computing device. The method further includes transforming the collected data into information indicative of events (i) associatable with the person having accessed the electronic content and (ii) of possible interest to other parties including a third-party. An aspect of the information indicative of events differentiates between (iii) information indicative of an event associated with the person activating a link in the electronic content that points to other electronic content owned by the third-party and (iv) information indicative of another event. The method also includes transmitting at least a portion of the information indicative of events via a network. In addition to the foregoing, other method embodiments are described in the claims, drawings, and text that form a part of the present application.

Another embodiment provides a method of reporting influence on a person. The method includes collecting data indicative of the person accessing electronic content over a computer network using the user computing device. The method also includes generating a user influence report by transforming the collected data into information indicative of events associatable with the person accessing the electronic content over a computer network using the user computing device. The method further includes transmitting data indicative of the user influence report via a network, the user influence report being receivable by a site operable to facilitate delivery of a benefit to an owner of the electronic content. In addition to the foregoing, other method embodiments are described in the claims, drawings, and text that form a part of the present application.

A further embodiment provides a system. The system includes a computing device couplable with a computer network. The system also includes a monitor circuit operable to collect data indicative of a person accessing electronic content over a computer network using a user computing device. The data is collected using a process included in a platform of the user computing device. The system further includes an evaluation circuit operable to transform the collected data into information indicative of events (i) associatable with the person having accessed the electronic content and (ii) of possible interest to other parties including a third-party. An aspect of the information indicative of events differentiates between (iii) information indicative of an event associated with the person activating a link in the electronic content that points to other electronic content owned by the third-party and (iv) information indicative of another event. The system includes a broadcast circuit operable to communicate data indicative of the information indicative of events to a recipient via the computer network. The system may include a storage circuit operable to save the information indicative of events. In addition to the foregoing, other system embodiments are described in the claims, drawings, and text that form a part of the present application.

An embodiment provides a computer program product. The computer program product includes a computer-readable signal-bearing medium bearing program instructions. The program instructions are operable to perform a process in a computing device. The process includes collect data using the computing device indicative of a person accessing electronic content over a computer network using the computing device. The process also includes generate a user influence report using the computing device by transforming the collected data into information indicative of events associatable with the person accessing the electronic content over the computer network using the computing device. The process further includes transmit data indicative of the user influence report to a recipient via the computer network. The process also includes save data indicative of the user influence report. In addition to the foregoing, other computer program product embodiments are described in the claims, drawings, and text that form a part of the present application.

Another embodiment provides an influence reporting apparatus. The apparatus includes means for collecting data indicative of a person accessing electronic content over a computer network using the user computing device. The apparatus also includes means for generating a user influence report by transforming the collected data into information indicative of events associatable with the person accessing the electronic content over a computer network using the user computing device. The apparatus further includes means for transmitting data indicative of the user influence report via a network. The apparatus may include means for saving the user influence report. In addition to the foregoing, other apparatus embodiments are described in the claims, drawings, and text that form a part of the present application.

A further embodiment provides an influence assessment method. The method includes collecting data indicative of a computing environment of a computing device facilitating a person accessing electronic content via a computer network using the computing device. The electronic content includes a first electronic content having a first content portion and a second electronic content having a second content portion. The method also includes transforming the collected data into an assessment of an influence of the first electronic content and the second electronic content relevant to an involvement between the person using the computing device and to a subject of interest to a third-party. The method further includes transmitting a user influence report indicating the influence assessment of the electronic content on a behavior of the person. In addition to the foregoing, other method embodiments are described in the claims, drawings, and text that form a part of the present application.

An embodiment provides a user-side influence reporting method. The method includes collecting data indicative of a computing device environment of a user-side computing device facilitating a person accessing Web pages and facilitating the person communicating with a third-party via a computer network. The method also includes transforming the collected data to indicate an involvement between the third-party and the person. The method further includes transforming the collected data to indicate the Web pages accessed by the person. The method also includes correlating the indicated involvement between the third-party and the person with the indicated Web pages accessed by the person. The method further includes outputting from the user-side computing device data indicative of the correlation. In addition to the foregoing, other method embodiments are described in the claims, drawings, and text that form a part of the present application. The method may include anonymizing the data indicative of the correlation in response to a privacy policy. In addition to the foregoing, other method embodiments are described in the claims, drawings, and text that form a part of the present application.

Another embodiment provides a system. The system includes a computing device couplable with a computer network. The system also includes a monitor circuit operable to collect data indicative of a computing device environment of a user-side computing device facilitating a person accessing Web pages and facilitating the person communicating with a third-party via a computer network. The system further includes a conversion circuit operable to (i) transform the collected data to indicate an involvement between the third-party and the person; and (ii) transform the collected data to indicate the Web pages accessed by the person. The system also includes an evaluation circuit operable to discern a relationship between (i) the indicated involvement between the third-party and the person and (ii) the indicated Web pages accessed by the person. The system further includes a broadcast circuit operable to output via the computer network data indicative of the discerned relationship. The system may include a privacy circuit operable to anonymize the data indicative of the discerned relationship in response to a privacy policy. The system may include a storage circuit operable to save data indicative of the discerned relationship. In addition to the foregoing, other system embodiments are described in the claims, drawings, and text that form a part of the present application.

An embodiment provides a computer program product. The computer program product includes a computer-readable signal-bearing medium bearing program instructions. The program instructions are operable to perform a process in a user-side computing device. The process includes collect data indicative of a computing device environment of the user-side computing device facilitating a person accessing Web pages and facilitating the person communicating with a third-party via a computer network. The process also includes transform the collected data to indicate an involvement between the third-party and the person. The process further includes transform the collected data to indicate the Web pages accessed by the person. The process also includes examine the transformed collected data for a relationship between (i) the indicated involvement between the third-party and the person, and (ii) the Web pages accessed by the person. The process further includes output data corresponding to the examined relationship between the indicated involvement and the Web pages accessed by the person. In addition to the foregoing, other computer program product embodiments are described in the claims, drawings, and text that form a part of the present application.

Another embodiment provides an apparatus. The apparatus includes means for collecting data indicative of a computing device environment of a user-side computing device facilitating a person accessing Web pages and communicating with a third-party via a computer network. The apparatus also includes means for transforming the collected data to indicate an involvement between the third-party and the person. The apparatus further includes means for transforming the collected data to indicate the Web pages accessed by the person. The apparatus also includes means for correlating the indicated involvement and the accessed Web pages. The apparatus also includes means for transmitting via the computer network data indicative of the correlation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 17 illustrates a further embodiment of the exemplary operational flow of FIG. 5;

FIG. 18 illustrates a further embodiment of the exemplary operational flow of FIG. 5;

FIG. 19 illustrates an embodiment of the exemplary operational flow of FIG. 5;

FIG. 20 illustrates an embodiment of the exemplary operational flow of FIG. 5;

FIG. 21 illustrates another embodiment of the exemplary operational flow of FIG. 5;

FIG. 22 illustrates a further embodiment of the exemplary operational flow of FIG. 5;

FIG. 23 illustrates an exemplary computer program product;

FIG. 28 illustrates an alternative embodiment of the exemplary operational flow of FIG. 27;

FIG. 29 illustrates another alternative embodiment of the exemplary operational flow of FIG. 27;

FIG. 30 illustrates a further alternative embodiment of the exemplary operational flow of FIG. 27;

FIG. 31 illustrates a further alternative embodiment of the exemplary operational flow of FIG. 27;

FIG. 32 illustrates an alternative embodiment of the exemplary operational flow of FIG. 27;

FIG. 33 illustrates another alternative embodiment of the exemplary operational flow of FIG. 27;

FIG. 34 illustrates an alternative embodiment of the exemplary operational flow of FIG. 27;

FIG. 35 illustrates another alternative embodiment of the exemplary operational flow of FIG. 27;

FIG. 36 illustrates a further alternative embodiment of the exemplary operational flow of FIG. 27;

FIG. 37 illustrates an alternative embodiment of the exemplary operational flow of FIG. 27;

FIG. 38 illustrates another alternative embodiment of the exemplary operational flow of FIG. 27;

FIG. 39 illustrates a further alternative embodiment of the exemplary operational flow of FIG. 27;

FIG. 40 illustrates an exemplary computing device operable to communicate over a network;

FIG. 41 illustrates an exemplary computer program product;

FIG. 42 illustrates an exemplary device;

FIG. 45 illustrates an example operational flow for reporting influence;

FIG. 46 illustrates an alternative embodiment of the operational flow described in FIG. 45;

FIG. 47 illustrates another embodiment of the operational flow described in FIG. 45;

FIG. 48 illustrates a further embodiment of the operational flow described in FIG. 45;

FIG. 49 illustrates an alternative embodiment of the operational flow described in FIG. 45;

FIG. 50 illustrates a further embodiment of the operational flow described in FIG. 45;

FIG. 51 illustrates another embodiment of the operational flow described in FIG. 45;

FIG. 52 illustrates an alternative embodiment of the operational flow described in FIG. 45;

FIG. 53 illustrates an operational flow of reporting influence on a person;

FIG. 54 illustrates an operational flow for reporting an influence of electronic content;

FIG. 56 illustrates an example computer program product;

FIG. 57 illustrates an example apparatus;

FIG. 60 illustrates an alternative embodiment of the operational flow of FIG. 59;

FIG. 63 illustrates an operational flow for reporting influence on a person;

FIG. 64 illustrates an alternative embodiment of the operational flow of FIG. 63;

FIG. 65 illustrates another embodiment of the operational flow of FIG. 63;

FIG. 66 illustrates a further embodiment of the operational flow of FIG. 63;

FIG. 67 illustrates an alternative embodiment of the operational flow of FIG. 63;

FIG. 68 illustrates another alternative embodiment of the operational flow of FIG. 59;

FIG. 69 illustrates an example system in which embodiments may be implemented;

FIG. 70 illustrates an example computer program product;

FIG. 76 illustrates an example operational flow for influence reporting;

FIG. 77 illustrates an alternative embodiment of the operational flow of FIG. 76;

FIG. 85 illustrates an example computer program product; and

DETAILED DESCRIPTION

Figure 1:
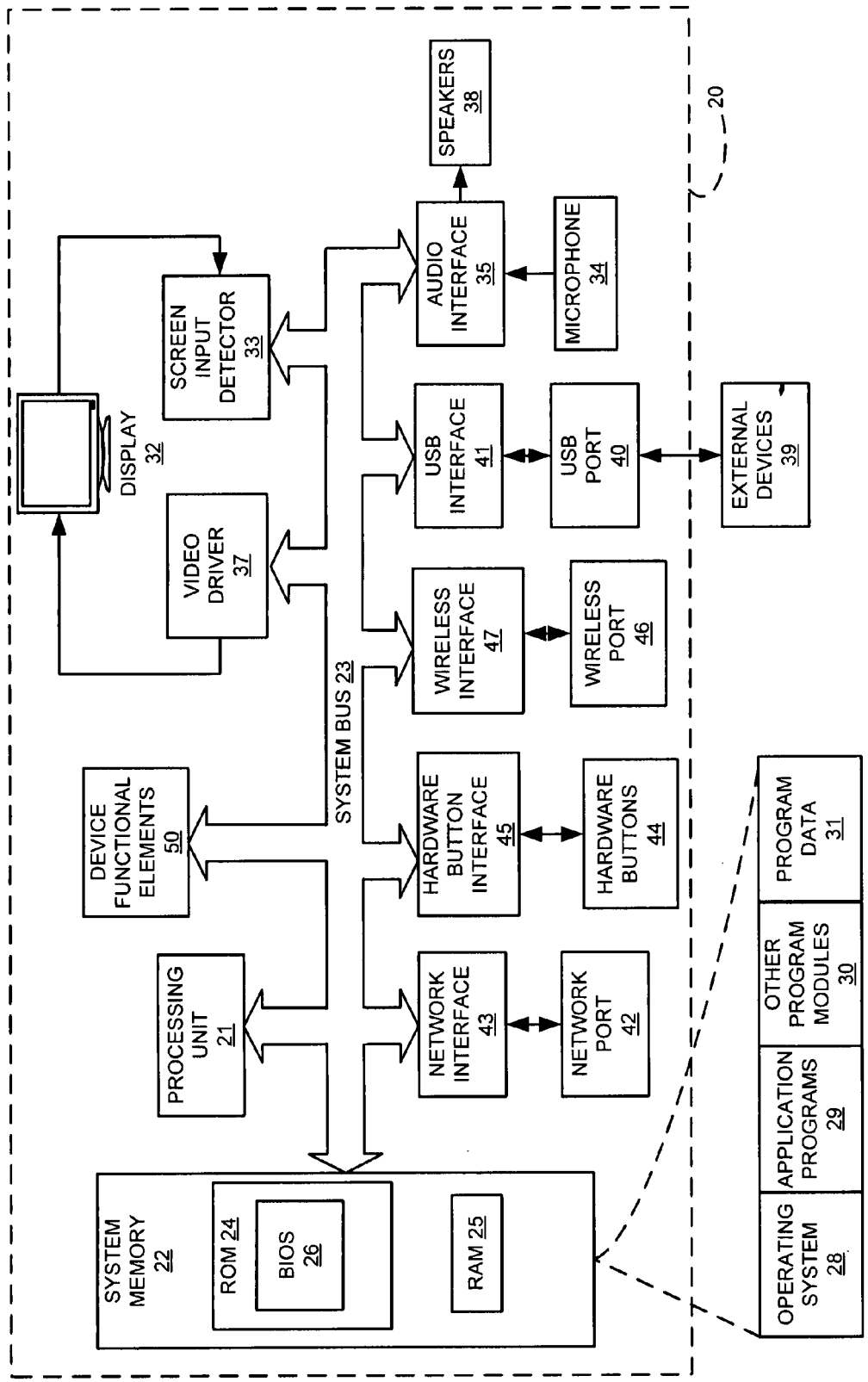
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 which may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
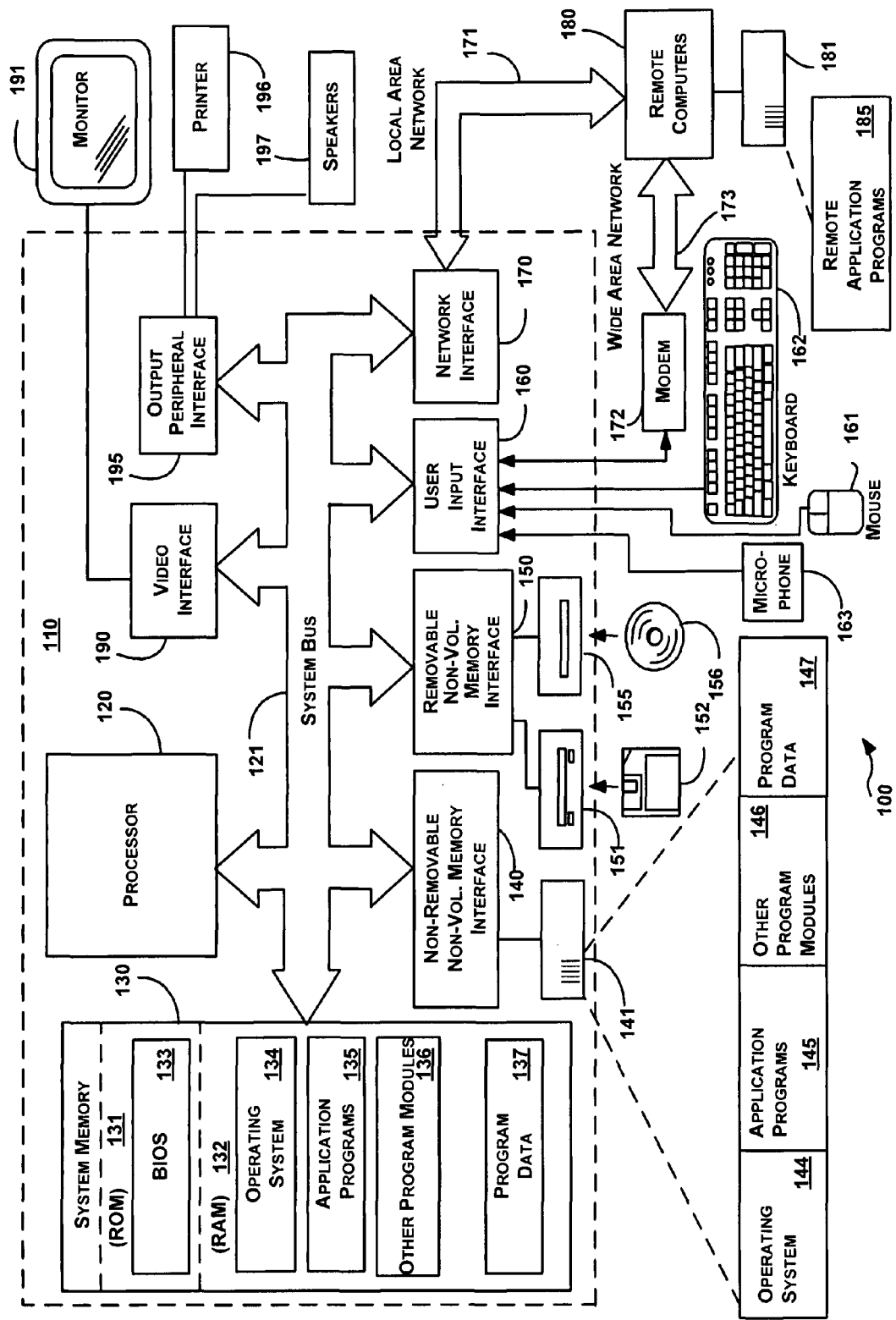
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
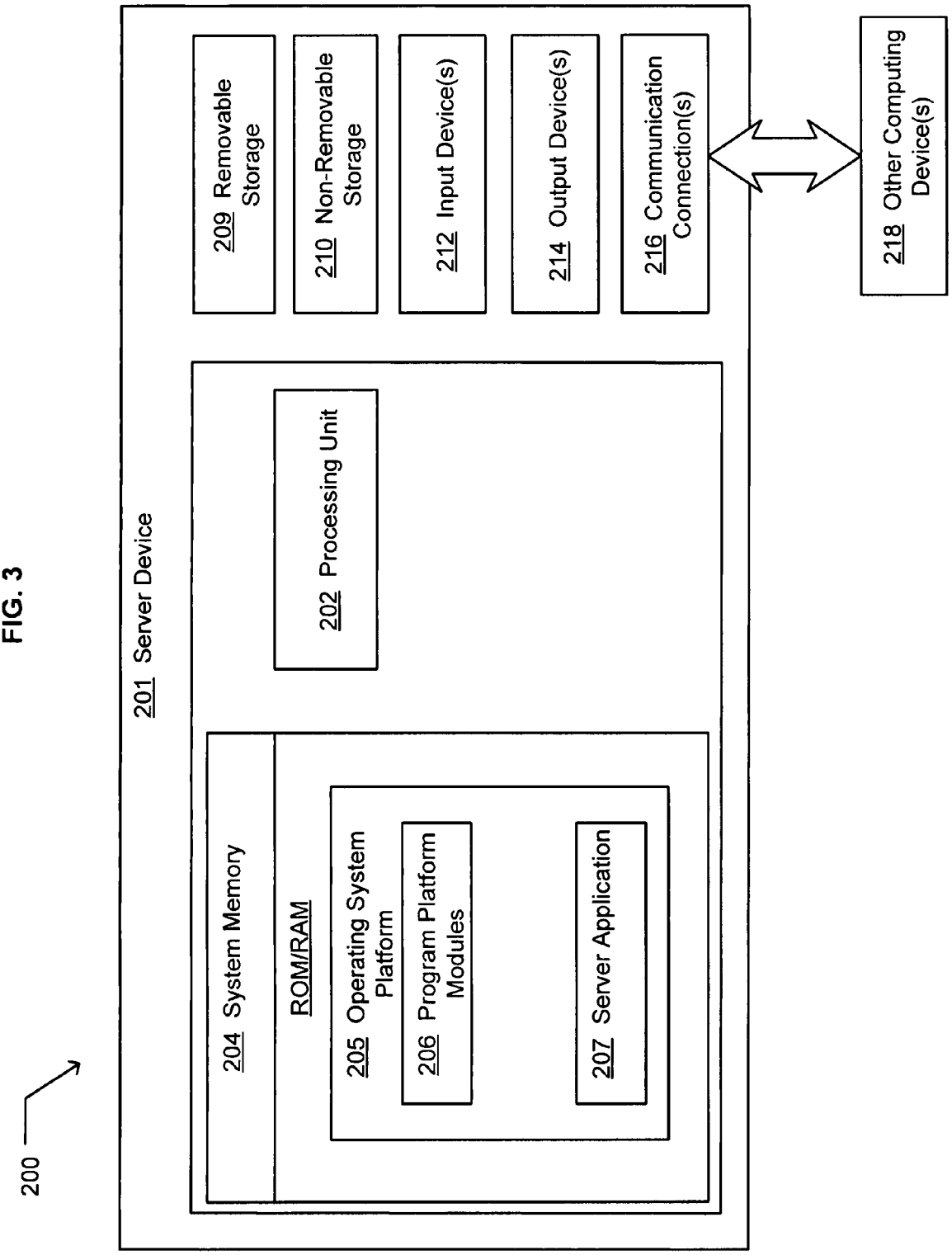
FIG. 3 illustrates an exemplary system in which embodiments may be implemented.

FIG. 3 illustrates an exemplary system 200 in which embodiments may be implemented. The exemplary system includes a computing system couplable to a network and operable to provide electronic content, such as a server 201. In an embodiment, the server may include an application server, audio server, database server, fax server, file server, intranet server, mail server, merchant server, modem server, network access server, network server, print server, proxy server, remote access server, telephony server, terminal server, video server, and/or Web server. In another embodiment, the server may include a network intermediary, a network switch, and/or a router. Server functionality may be implemented in software, hardware, firmware, and/or a combination thereof. Server functionality may be provided by a computing device that also provides other functionality. The network may include an electronic network, an optical network, and/or a combination of optical and electronic networks.

In a configuration, the server 201 typically includes at least one processing unit 202 and system memory 204. System memory 204 typically includes operating system platform 205 and one or more program modules 206 running on operating system. In addition to the program modules 206, a server application 207 may also be running on the operating system. The server application 207 may be operable to deliver electronic content and/or files to applications via a protocol, and may include and/or interact with other computing devices, application servers, applications, and application interfaces (APIs) residing in other applications. For example, the server application may include a Web server operable to deliver Web pages and/or electronic content to Web browser applications via HTTP protocols.

The server 201 may have additional features or functionality. For example, server may also include additional data storage devices (removable and/or non-removable), as illustrated in FIG. 3 by removable storage 209 and non-removable storage 210. System memory 204, removable storage 209 and non-removable storage 210 are all examples of computer storage media. The server may include input device(s) 212 and output device(s) 214. The server also contains communication connections 216 that allow the device to communicate with and perform a service associated with a network, including communicating with other servers and/or with other computing device, illustrated as other computing device(s) 218. Communication connections 216 are one example of communication media.

FIGS. 1-3 are intended to provide a brief, general description of illustrative and/or suitable exemplary environments in which embodiments may be implemented. An exemplary system may include the thin computing device 20 of FIG. 1, the computing system environment 100 of FIG. 2, and/or the server of FIG. 3. FIGS. 1-3 are examples of a suitable environment and are not intended to suggest any limitation as to the structure, scope of use, or functionality of an embodiment. A particular environment should not be interpreted as having any dependency or requirement relating to any one or combination of components illustrated in an exemplary environment. For example, in certain instances, one or more elements of an environment may be deemed not necessary and omitted. In other instances, one or more other elements may be deemed necessary and added. Further, it will be appreciated that device(s) and/or environment(s) described herein may include numerous electrical, optical, mechanical, and/or digital components that may necessary to operate the device, but are not needed to illustrate the subject matter described herein. As such, some of these electrical, optical, mechanical, and/or digital components may be omitted from the specification for clarity.

In the description that follows, certain embodiments may be described with reference to acts and symbolic representations of operations that are performed by one or more computing devices, such as the computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 4:
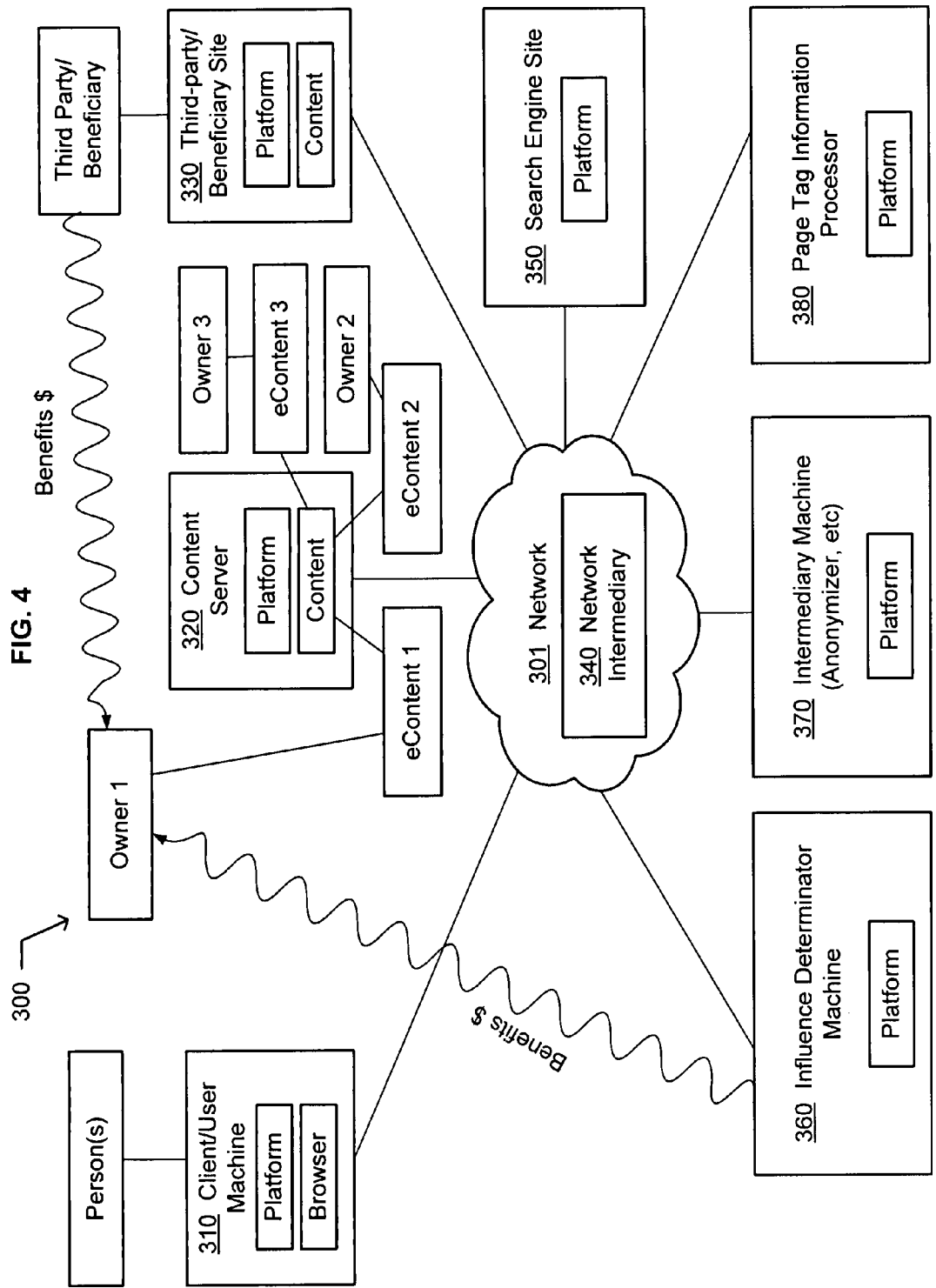
FIG. 4 illustrates an exemplary network environment in which embodiments may be implemented.

FIG. 4 illustrates an exemplary network environment 300 in which embodiments may be implemented. The exemplary environment includes networks, illustrated as a network 301, and client machines, illustrated as client machine 310. A fabric of the network may include network intermediaries, illustrated as a network intermediary 340 running on a platform (not shown). In an embodiment, the client machine includes a computing device used by a human user. In another embodiment, the client machine includes a computing device used by a human user to communicate in a peer-to-peer environment (P2P), and/or to communicate in a cloud-to-cloud environment (C2C). In a further embodiment, the client machine includes a computing device used by a human user to communicate with a server. The client machine may include the thin computing device 20 illustrated in FIG. 1, and/or the computing device 110 illustrated in FIG. 2.

The exemplary environment 300 also includes servers, illustrated as a content server 320. In an embodiment, the content server is operable to provide electronic content (illustrated as eContent 1 and/or eContent 2 to one or more client machines. In another embodiment, the content server includes the server 201 illustrated in FIG. 3. In a further embodiment, the content server(s) includes a node in P2P and/or a C2C network. The node may include the thin computing device 20 illustrated in FIG. 1, and/or the computing device 110 illustrated in FIG. 2. The exemplary environment also includes a third-party site, illustrated as a third-party site 330. The third-party site may include a merchant site, such as amazon.com for books, a manufacturer site, such as subaru.com for automobiles, a religious institution, such as catholic.org and/or hinduism.com, and/or a political site, such as rnc.org and/or democrats.org. The exemplary environment also includes search engine sites, illustrated as a search engine site 350. The search engine site may include a general search engine site, such as google.com and/or live.com. In another embodiment, the search engine site may include a topical search site, such as HONMedhunt and/or FindLaw.com.

The exemplary environment 300 may also include an influence determinator machine 360, an intermediary machine 370, and/or a page tag information processor 380. Each of these machines may be operable to receive data and/or information gathered by at least one of the client machine 310, the content server 320, the third-party site 330, and/or the network intermediary 340, and to produce an output useable in assessing an influence on a person using the client machine by a content of the content server.

Figure 5:
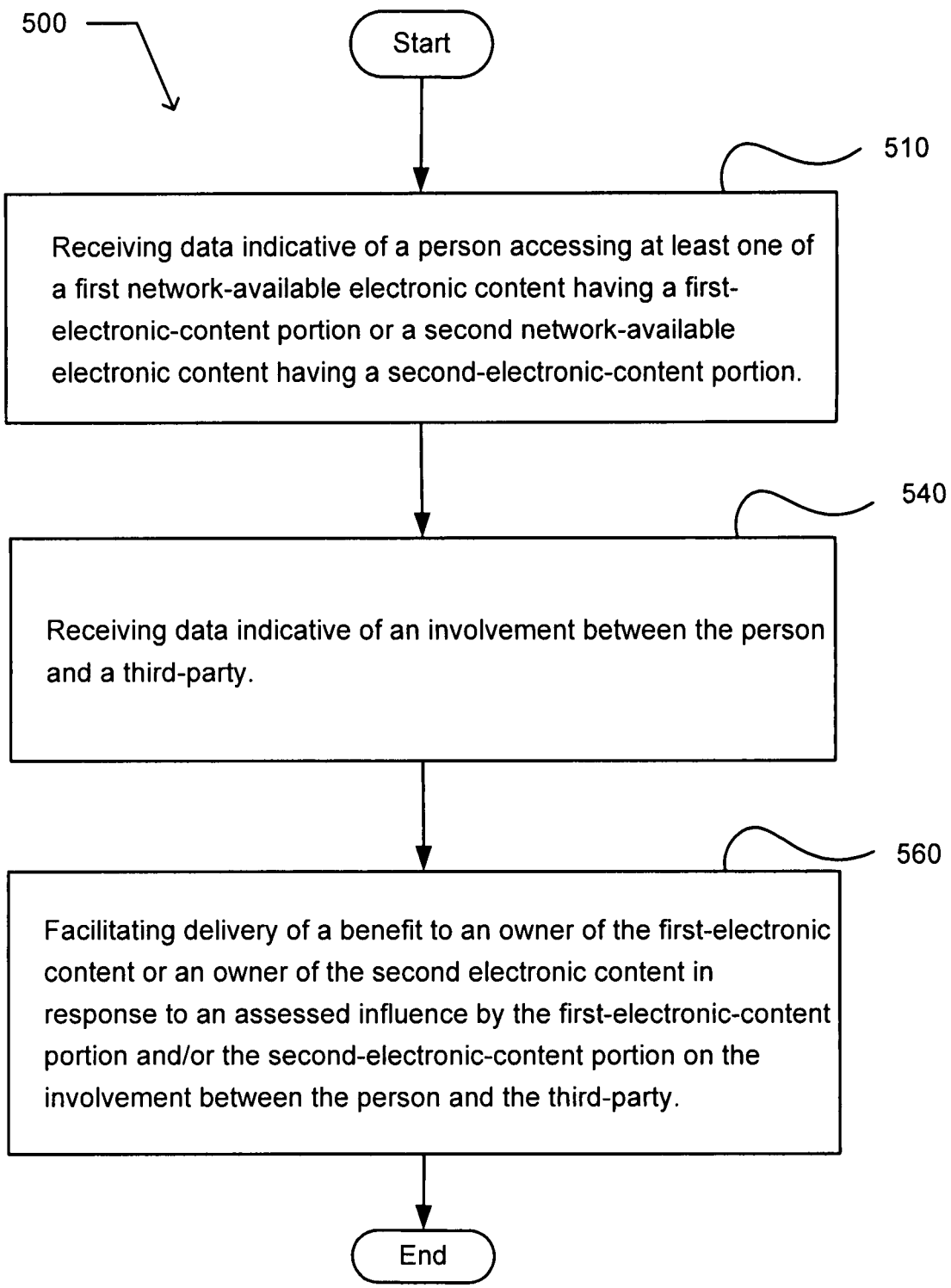
FIG. 5 illustrates an exemplary operational flow.

FIG. 5 illustrates an exemplary operational flow 500. After a start operation, the operational flow moves to a navigation content operation 510. The navigation content operation receives data indicative of a person accessing at least one of a first network-available electronic content having a first-electronic-content portion or a second network-available electronic content having a second-electronic-content portion. An engagement data operation 540 receives data indicative of an involvement between the person and a third-party. A recognition operation 560 facilitates delivery of a benefit to an owner of the first-electronic content or an owner of the second electronic content in response to an assessed influence by the first-electronic-content portion and/or the second-electronic-content portion on the involvement between the person and the third-party. The operational flow then moves to an end operation.

In an embodiment, the exemplary operational flow 500 may be performed at a computing device. For example, the exemplary operational flow may be performed by at least one of the client machine 310, the content server 320, the third-party site 330, the search engine site 350, the influence determinator machine 360, the intermediary machine 370, and/or the page tag information processor 380 of FIG. 4. In an embodiment, at least a portion of the data may be received from a platform or an application running on the platform of the device performing the operational flow 500. In an embodiment, the operational flow may be performed by the content server using data received from the client machine and received from an application running on a platform of the content server. In another embodiment, the operational flow may be performed by the content server using data from both the client machine and the third-party site. In a further embodiment, the operational flow may be performed by the influence determinator machine using data received from at least one of the client machine, the content server, the search engine site, and/or the third-party site. In another embodiment, the operational flow may be performed by the search engine platform using data received from at least one of the client machine, the content server, and/or the third-party site.

FIG. 4 may be used to illustrate a use of an embodiment of the exemplary operational flow 500. For example, a person may use their computing device, illustrated as the client machine 310, to access over the Internet and browse blog pages hosted by a content server, illustrated as the content server 320 and eContent 1 and eContent 2 respectively created by owner 1 and owner 2. By way of further example, in a situation where the person is looking to buy a new truck, they may access eContent 1 and eContent 2 looking for recommendations and reviews of trucks. The person may spend five minutes accessing eContent 1 because they like the content or find it helpful, and only ten seconds accessing eContent 2 because they do not find the content helpful. The navigation content operation 510 in FIG. 5 may receive data indicative of the person accessing eContent 1 having a first-electronic-content portion pertaining to Ford and GM trucks and eContent 2 having a second-electronic-content portion pertaining to Ford and Toyota trucks. The navigation operation may receive data indicative of respective access times and other aspects of the person's access. The person may use their computing device to become involved over the Internet with a third party, such as a Ford sales site. They may order delivery of printed promotional materials, a quote on a new truck, arrange a test drive, seek an address of a Ford dealer, and/or order a truck. Alternatively, they may become involved by visiting a dealer showroom, taking a test drive, and/or purchasing a truck. The engagement data operation 540 may receive data indicative of an involvement between the person and a third party, such as Ford. The data may be received from any number of sources, for example, such as the client machine 310, the third-party site 330, the network intermediary 340, the search engine site 350, and/or the page tag information processor 380. Alternatively, the data indicative of an involvement between the person and Ford may be manually gathered by a sales person at a dealership visited by the person. The recognition operation 560 facilitates delivery of a benefit to an owner of the first-electronic content or an owner of the second electronic content in response to an assessed influence by the first-electronic-content portion and/or the second-electronic-content portion on the involvement between the person and the third-party. For example, an assessed influence by the first-electronic-content portion and/or the second-electronic-content portion on the involvement between the person and the third-party may indicate that the first-electronic-content portion likely influenced the involvement between the person and the third-party, which in this example, is Ford. The recognition operation may facilitate a benefit to the owner of the first-electronic-content portion in response to the assessed influence.

Figure 6:
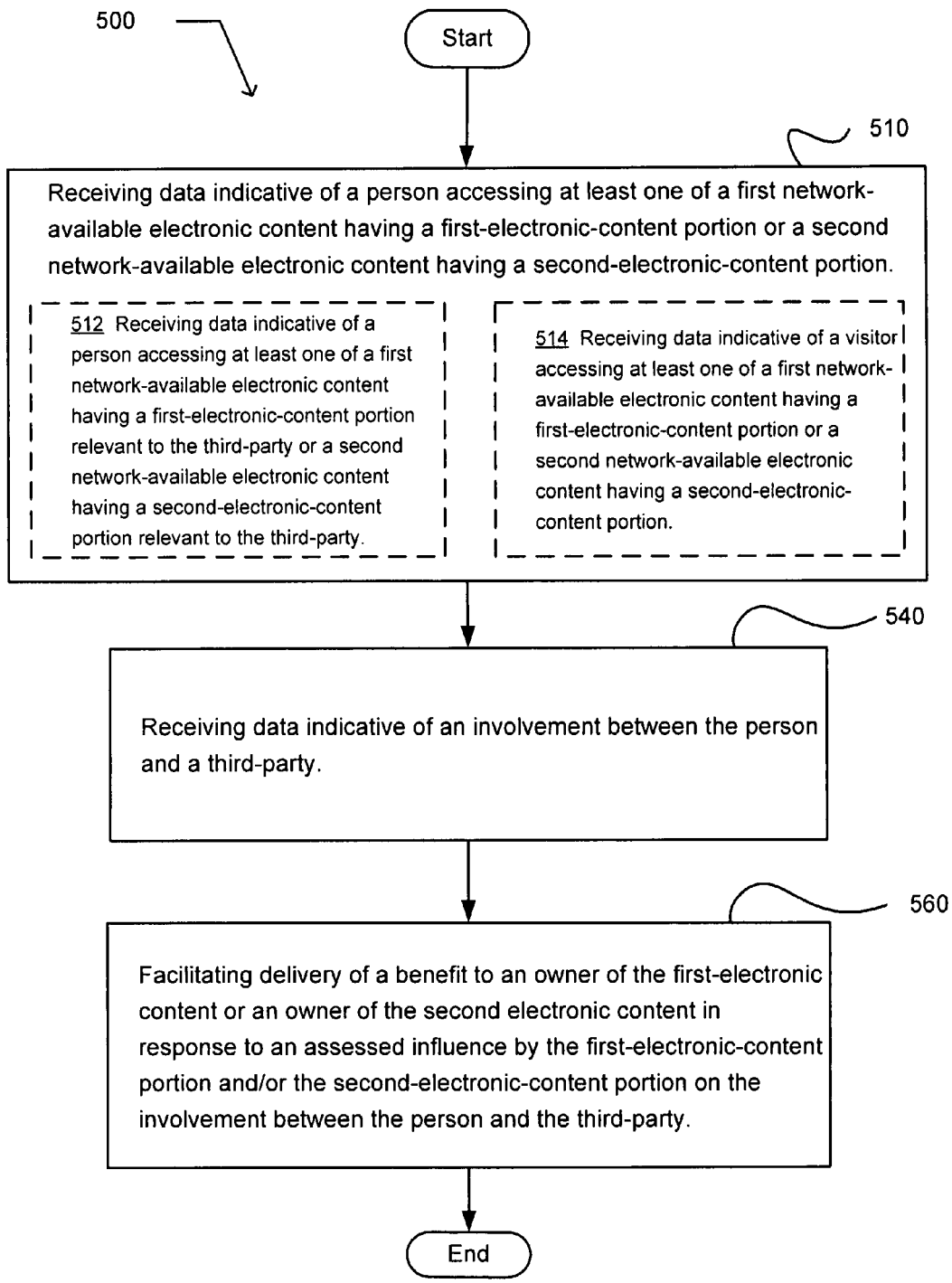
FIG. 6 illustrates an embodiment of the exemplary operational flow of FIG. 5.

FIG. 6 illustrates an embodiment of the exemplary operational flow 500 of FIG. 5. The navigation content operation 510 may include at least one additional operation. The at least one additional operation may include an operation 512, and/or an operation 514. The operation 512 receives data indicative of a person accessing at least one of a first network-available electronic content having a first-electronic-content portion relevant to the third-party or a second network-available electronic content having a second-electronic-content portion relevant to the third-party. The operation 514 receives data indicative of a visitor accessing at least one of a first network-available electronic content having a first-electronic-content portion or a second network-available electronic content having a second-electronic-content portion.

Figure 7:
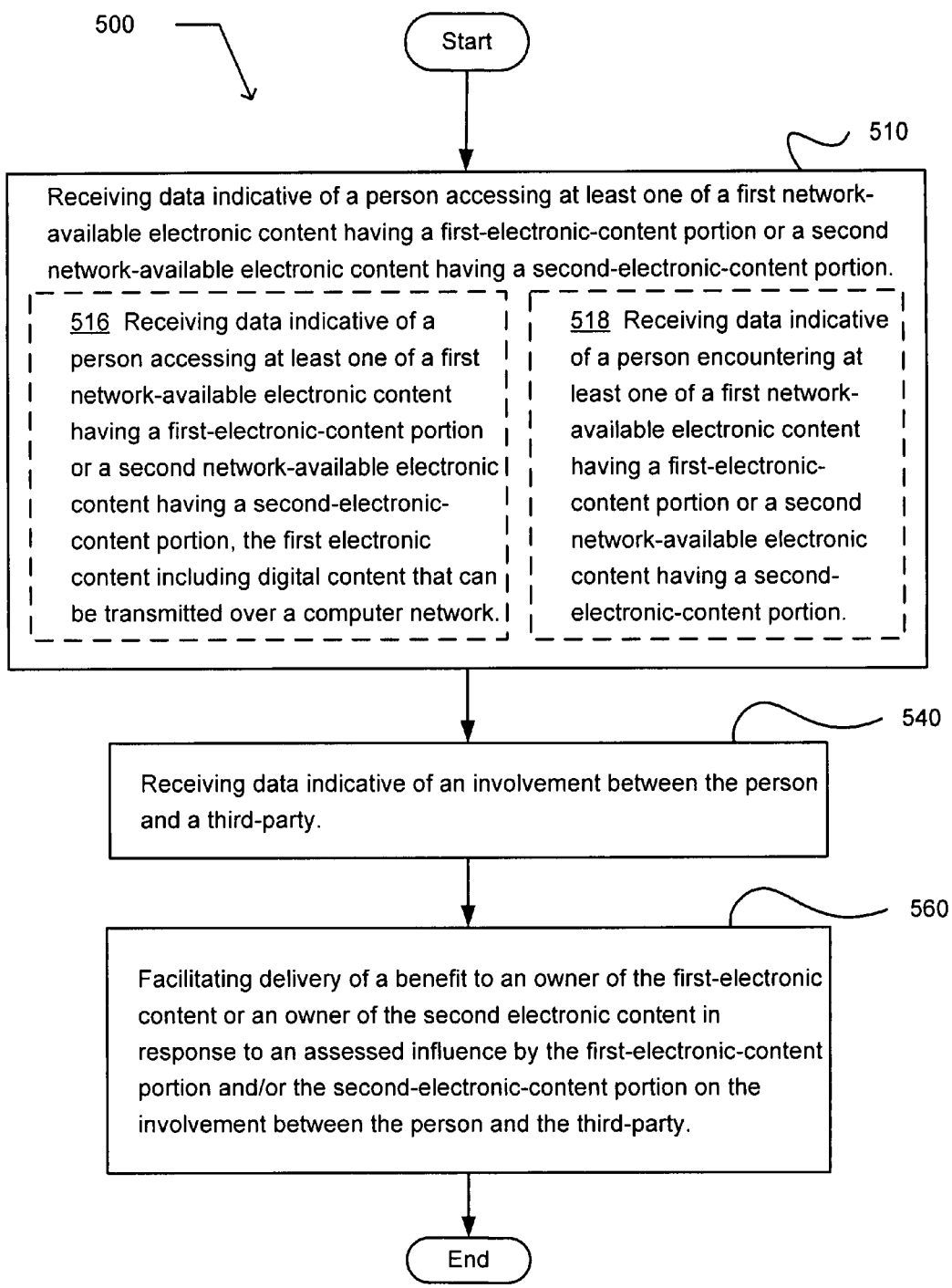
FIG. 7 illustrates another embodiment of the exemplary operational flow of FIG. 5.

FIG. 7 illustrates another embodiment of the exemplary operational flow 500 of FIG. 5. The navigation content operation 510 may include at least one additional operation. The at least one additional operation may include an operation 516, and/or an operation 518. The operation 516 receives data indicative of a person accessing at least one of a first network-available electronic content having a first-electronic-content portion or a second network-available electronic content having a second-electronic-content portion. The first electronic content including digital content that can be transmitted over a computer network. The operational flow 518 receives data indicative of a person encountering at least one of a first network-available electronic content having a first-electronic-content portion or a second network-available electronic content having a second-electronic-content portion. The encountering may include indirectly accessing at least one of a first network-available electronic content having a first-electronic-content portion or a second network-available electronic content having a second-electronic-content portion. For example, indirectly accessing may include viewing a summary, a precis, and/or an aggregation of content that includes at least one of a first network-available electronic content or a second network-available electronic content.

Figure 8:
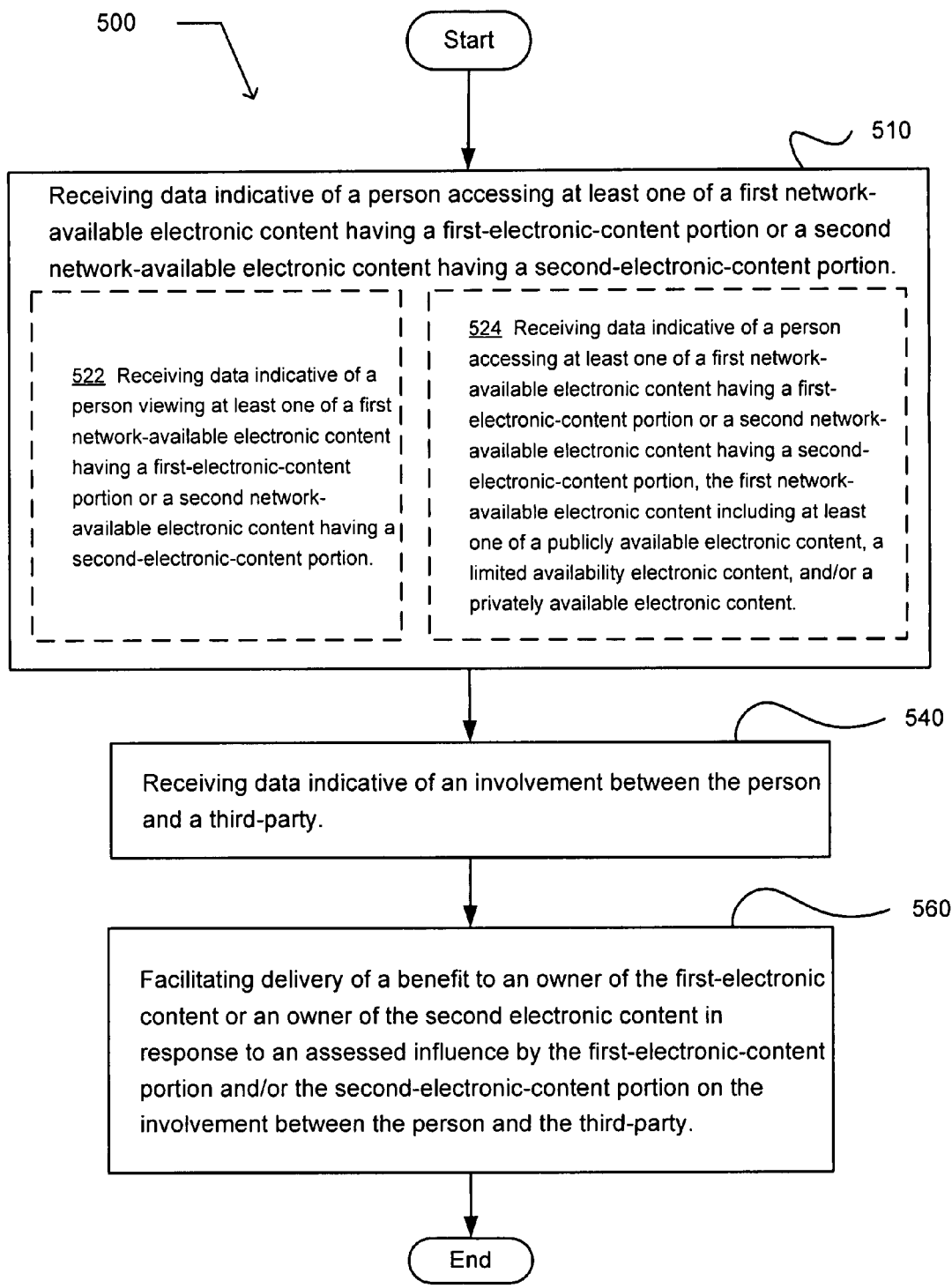
FIG. 8 illustrates a further embodiment of the exemplary operational flow of FIG. 5.

FIG. 8 illustrates a further embodiment of the exemplary operational flow 500 of FIG. 5. The navigation content operation 510 may include at least one additional operation. The at least one additional operation may include an operation 522, and/or an operation 524. The operation 522 receives data indicative of a person viewing at least one of a first network-available electronic content having a first-electronic-content portion or a second network-available electronic content having a second-electronic-content portion. The operation 524 receives data indicative of a person accessing at least one of a first network-available electronic content having a first-electronic-content portion or a second network-available electronic content having a second-electronic-content portion. The first network-available electronic content including at least one of a publicly available electronic content, a limited availability electronic content, and/or a privately available electronic content.

Figure 9:
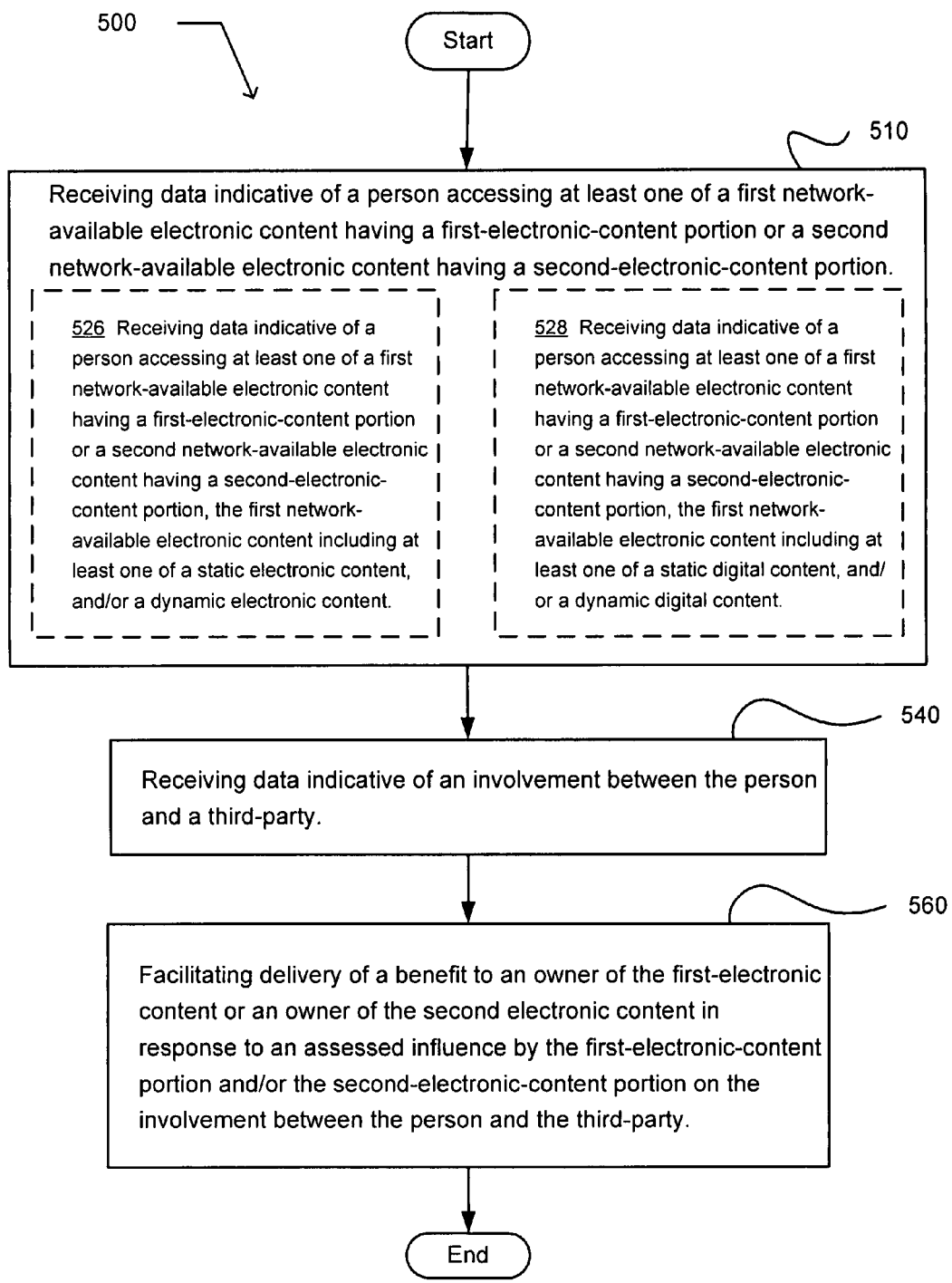
FIG. 9 illustrates an embodiment of the exemplary operational flow of FIG. 5.

FIG. 9 illustrates an embodiment of the exemplary operational flow 500 of FIG. 5. The navigation content operation 510 may include at least one additional operation. The at least one additional operation may include an operation 526, and/or an operation 528. The operation 526 receives data indicative of a person accessing at least one of a first network-available electronic content having a first-electronic-content portion or a second network-available electronic content having a second-electronic-content portion. The first network-available electronic content including at least one of a static electronic content, and/or a dynamic electronic content. The operation 528 receives data indicative of a person accessing at least one of a first network-available electronic content having a first-electronic-content portion or a second network-available electronic content having a second-electronic-content portion. The first network-available electronic content including at least one of a static digital content, and/or a dynamic digital content.

Figure 10:
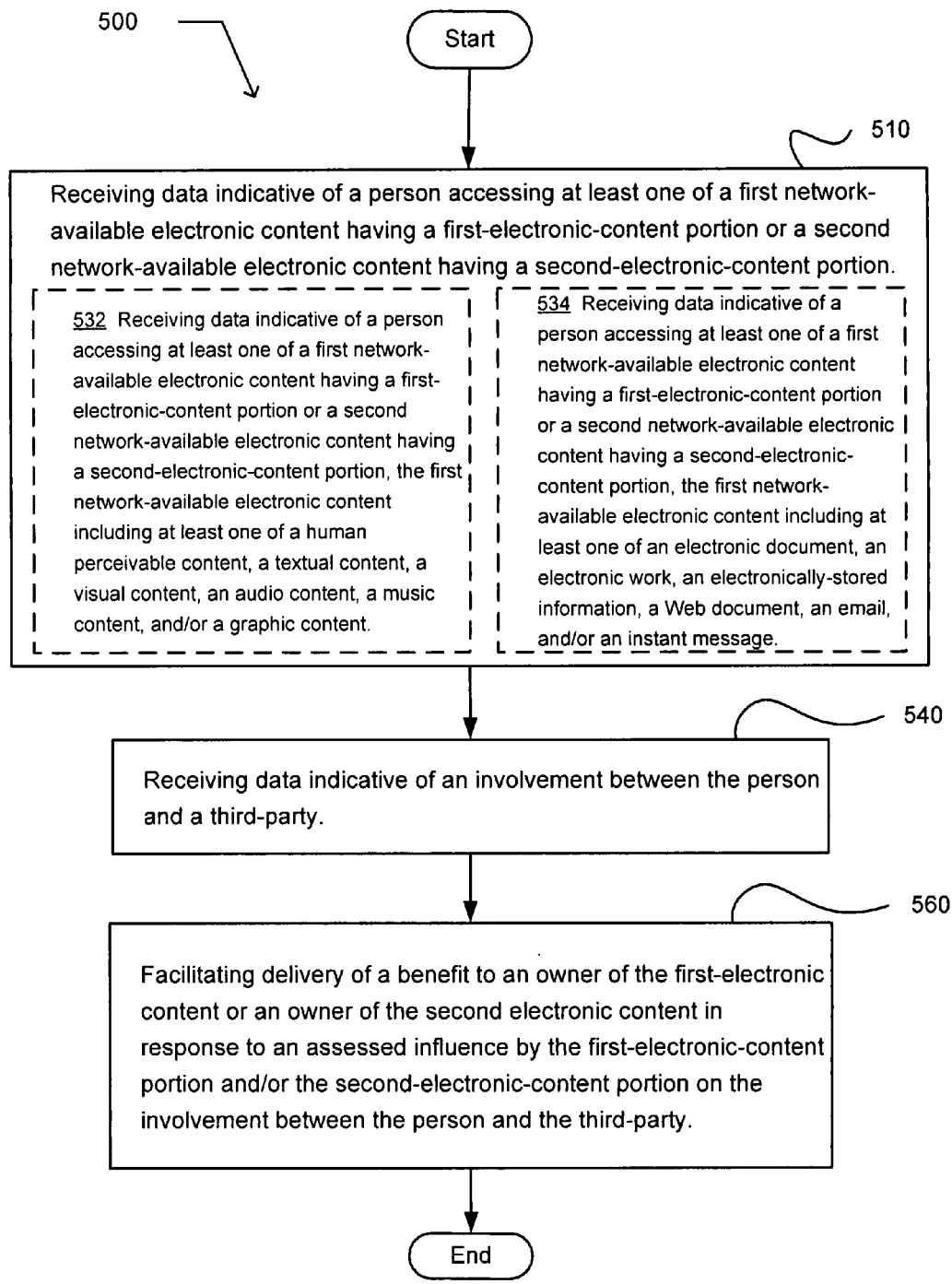
FIG. 10 illustrates another embodiment of the exemplary operational flow of FIG. 5.

FIG. 10 illustrates another embodiment of the exemplary operational flow 500 of FIG. 5. The navigation content operation 510 may include at least one additional operation. The at least one additional operation may include an operation 532, and/or an operation 534. The operation 532 receives data indicative of a person accessing at least one of a first network-available electronic content having a first-electronic-content portion or a second network-available electronic content having a second-electronic-content portion. The first network-available electronic content including at least one of a human perceivable content, a textual content, a visual content, an audio content, a music content, and/or a graphic content. The operation 534 receives data indicative of a person accessing at least one of a first network-available electronic content having a first-electronic-content portion or a second network-available electronic content having a second-electronic-content portion. The first network-available electronic content including at least one of an electronic document, an electronic work, an electronically-stored information, music, video, a Web document, an email, and/or an instant message. In an embodiment, the Web document may include at least one of a Web site, a Web page, a Weblog, a blog, a blog entry, and/or a web element.

Figure 11:
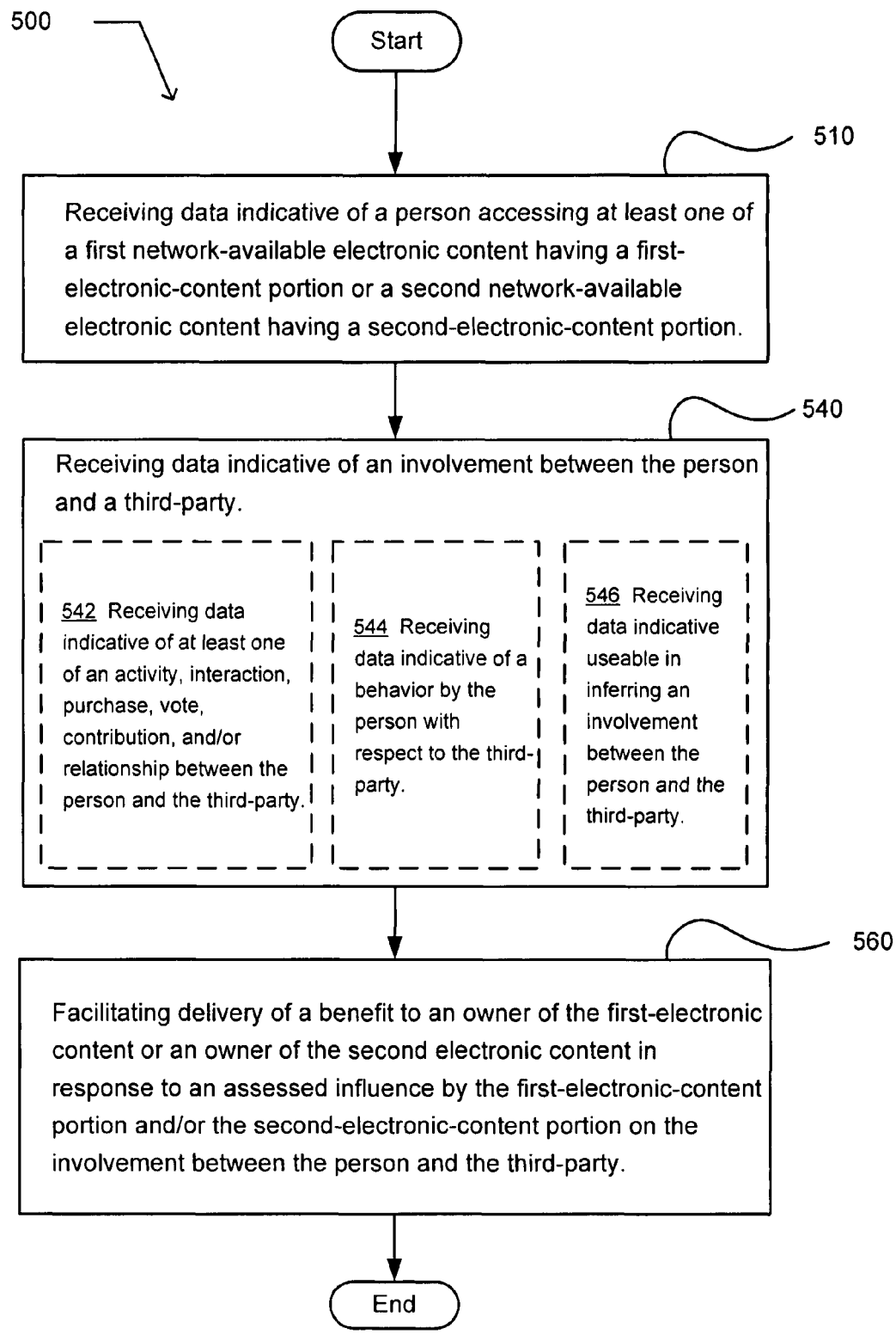
FIG. 11 illustrates an embodiment of the exemplary operational flow of FIG. 5.

FIG. 11 illustrates an embodiment of the exemplary operational flow 500 of FIG. 5. The engagement data operation 540 may include at least one additional operation. The at least one additional operation may include an operation 542, an operation 544, and/or an operation 546. The operation 542 receives data indicative of at least one of an activity, interaction, purchase, vote, contribution, performance, and/or relationship between the person and the third-party. The operation 544 receives data indicative of a behavior by the person with respect to the third-party. In another embodiment, data indicative of a behavior by the person with respect to the third party includes hits, page views, visits, sessions, generating requests, viewing, time between visits, and/or impressions. The operation 546 receives data indicative useable in inferring an involvement between the person and the third-party.

Figure 12:
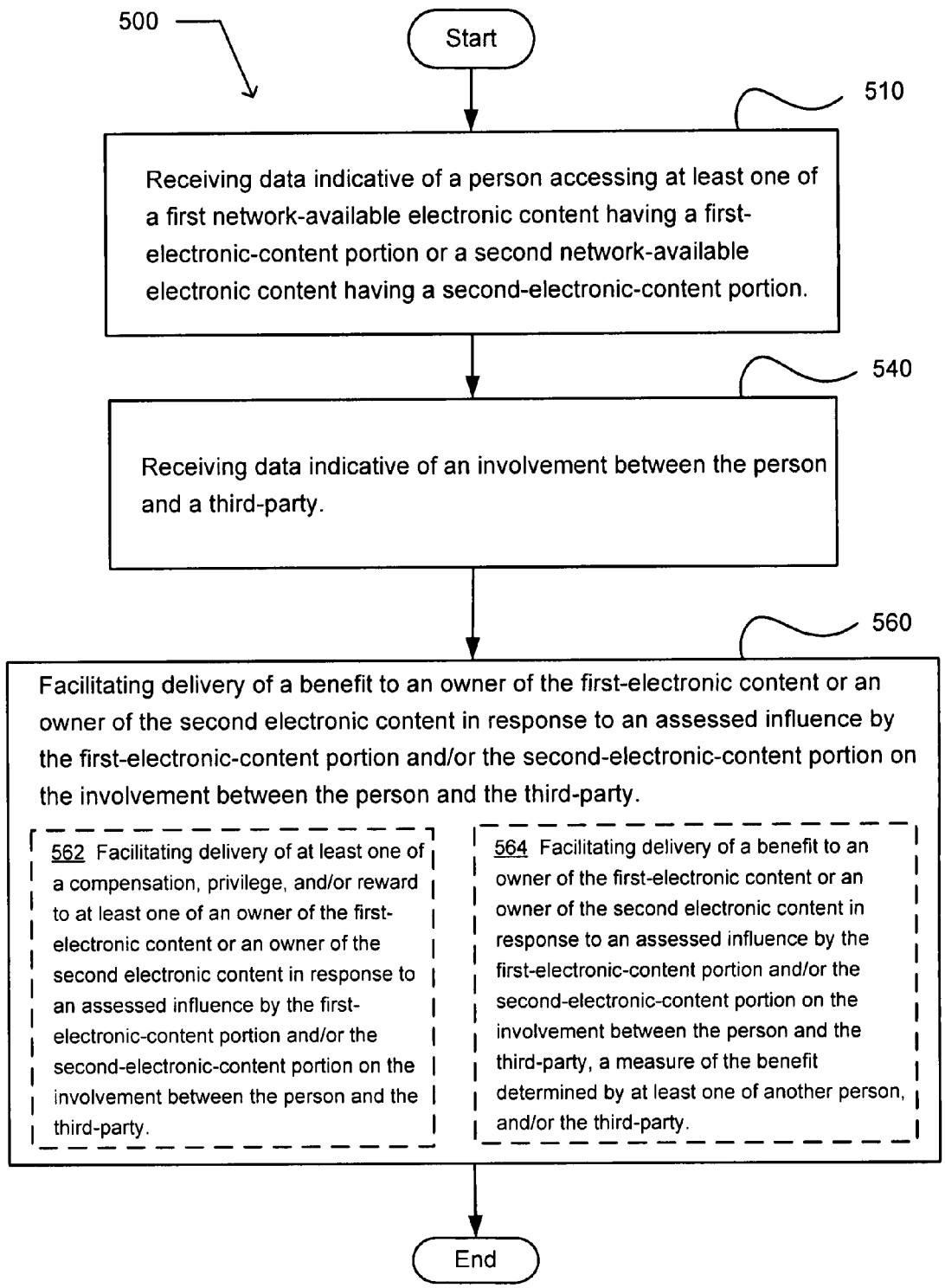
FIG. 12 illustrates another embodiment of the exemplary operational flow of FIG. 5.

FIG. 12 illustrates another embodiment of the exemplary operational flow 500 of FIG. 5. The recognition operation 560 may include at least one additional operation. The at least one additional operation may include an operation 562, and/or an operation 564. The operation 562 facilitates delivery of at least one of a compensation, privilege, and/or reward to at least one of an owner of the first-electronic content or an owner of the second electronic content in response to an assessed influence by the first-electronic-content portion and/or the second-electronic-content portion on the involvement between the person and the third-party. The operation 564 facilitates delivery of a benefit to an owner of the first-electronic content or an owner of the second electronic content in response to an assessed influence by the first-electronic-content portion and/or the second-electronic-content portion on the involvement between the person and the third-party. A measure of the benefit is determined by at least one of another person, and/or the third-party. In an embodiment, the measure of a benefit may include at least one of an amount, degree, and/or quantity.

Figure 13:
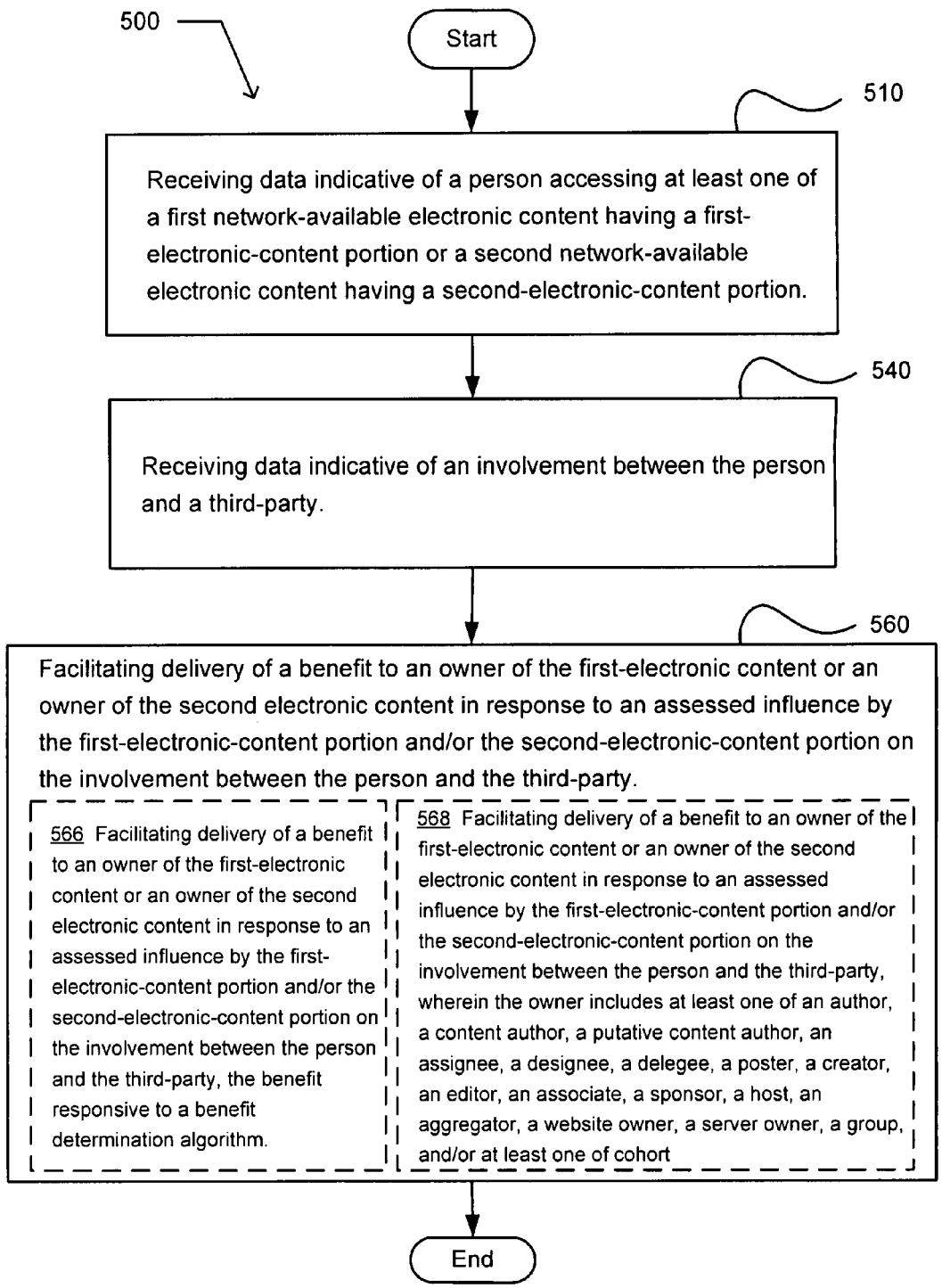
FIG. 13 illustrates a further embodiment of the exemplary operational flow of FIG. 5.

FIG. 13 illustrates a further embodiment of the exemplary operational flow 500 of FIG. 5. The recognition operation 560 may include at least one additional operation. The at least one additional operation may include an operation 566, and/or an operation 568. The operation 566 facilitates delivery of a benefit to an owner of the first-electronic content or an owner of the second electronic content in response to an assessed influence by the first-electronic-content portion and/or the second-electronic-content portion on the involvement between the person and the third-party, the benefit responsive to a benefit determination algorithm. In an alternative embodiment, the benefit determination algorithm includes a benefit contribution determination algorithm. The operation 568 facilitates delivery of a benefit to an owner of the first-electronic content or an owner of the second electronic content in response to an assessed influence by the first-electronic-content portion and/or the second-electronic-content portion on the involvement between the person and the third-party. The owner includes at least one of an author, a content author, a putative content author, an assignee, a designee, a delegee, a poster, a creator, an editor, an associate, a sponsor, a host, an aggregator, a website owner, a server owner, a group, and/or at least one of cohort. In an alternative embodiment, a cohort may include a social networking site, for example Facebook, MySpace, Classmates, YouTube, and/or Friendster.

Figure 14:
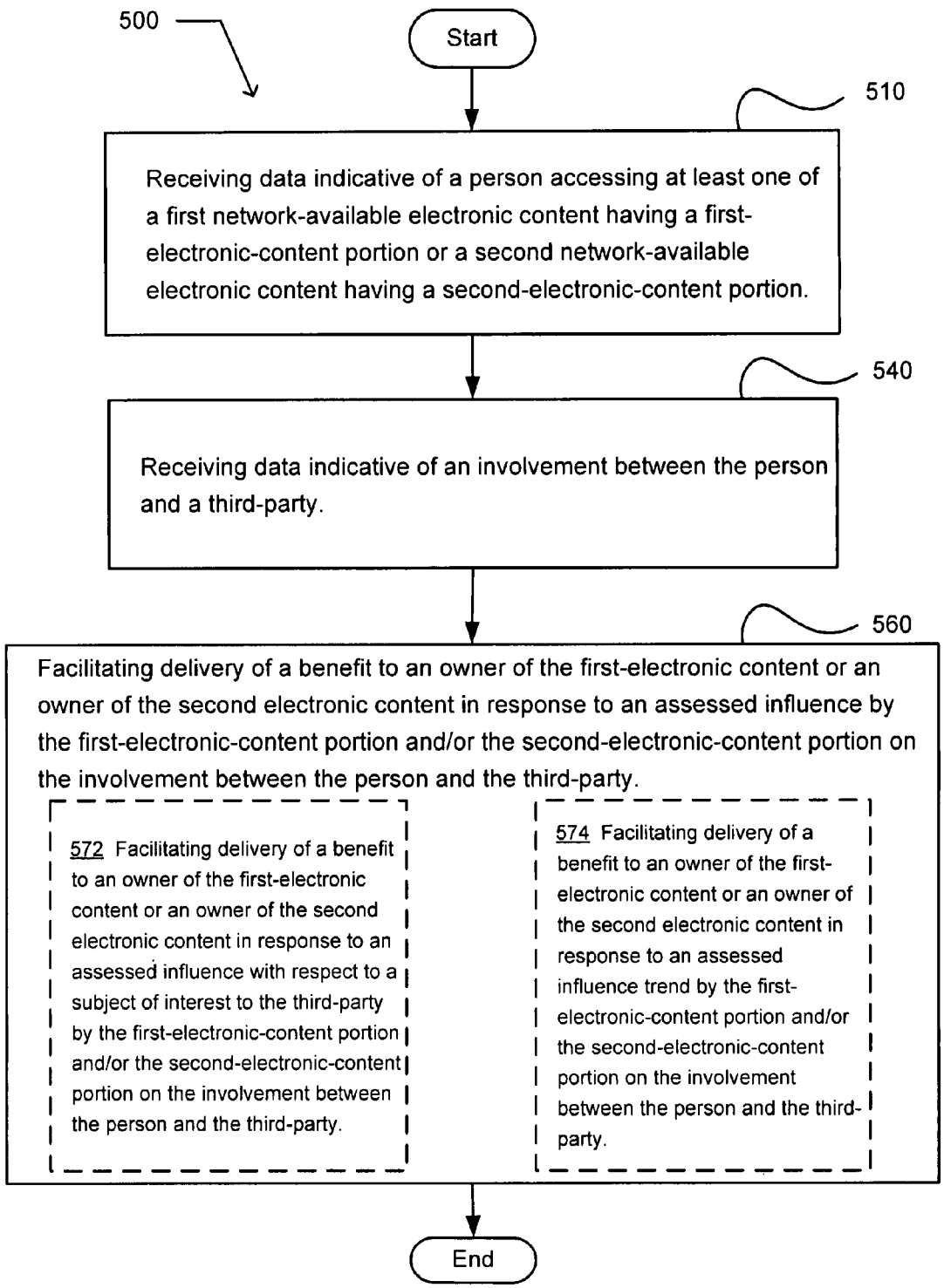
FIG. 14 illustrates an embodiment of the exemplary operational flow of FIG. 5.

FIG. 14 illustrates an embodiment of the exemplary operational flow 500 of FIG. 5. The recognition operation 560 may include at least one additional operation. The at least one additional operation may include an operation 572, and/or an operation 574. The operation 572 facilitates delivery of a benefit to an owner of the first-electronic content or an owner of the second electronic content in response to an assessed influence with respect to a subject of interest to the third-party by the first-electronic-content portion and/or the second-electronic-content portion on the involvement between the person and the third-party. The operation 574 facilitates delivery of a benefit to an owner of the first-electronic content or an owner of the second electronic content in response to an assessed influence trend by the first-electronic-content portion and/or the second-electronic-content portion on the involvement between the person and the third-party.

Figure 15:
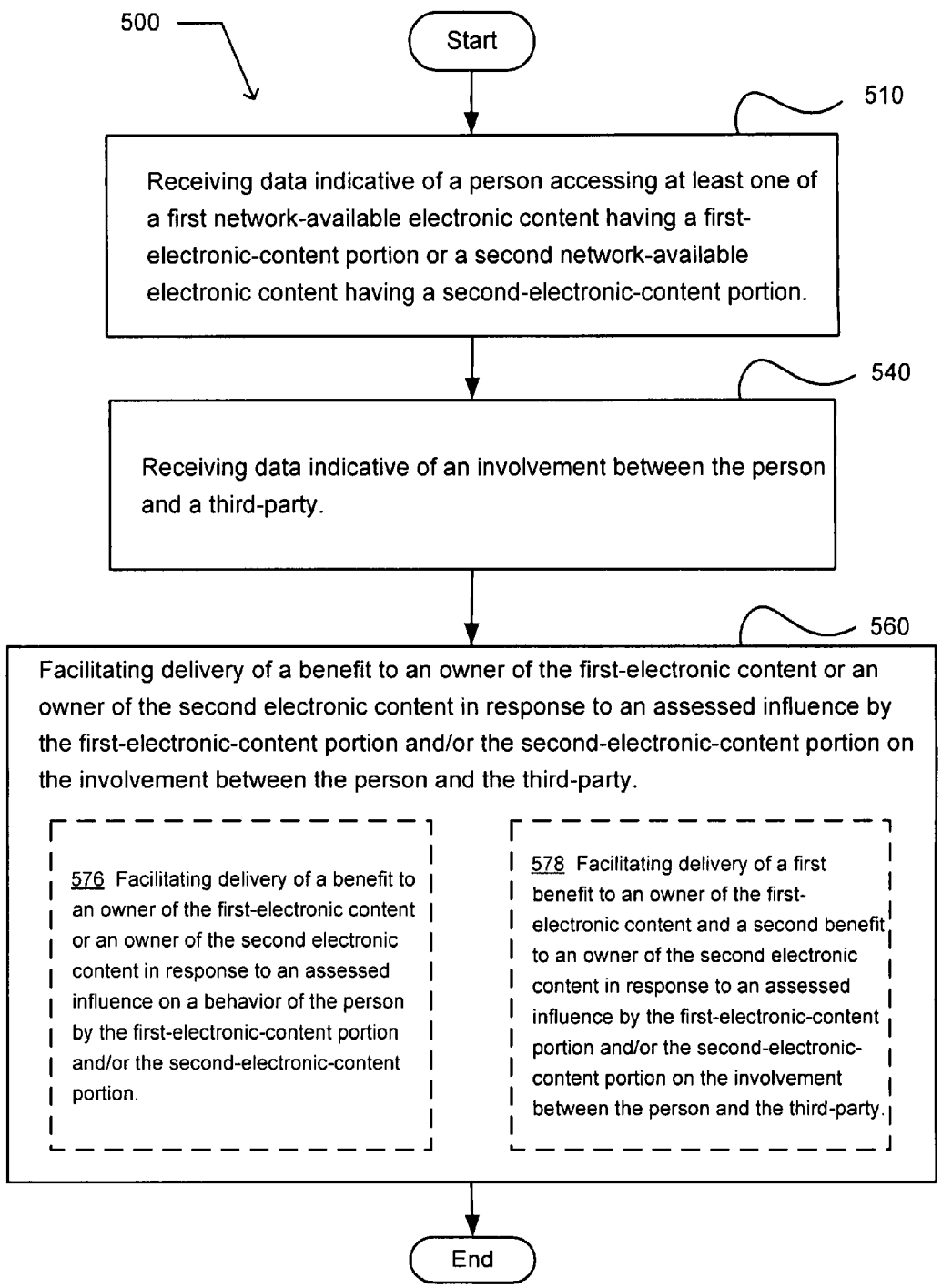
FIG. 15 illustrates another embodiment of the exemplary operational flow of FIG. 5.

FIG. 15 illustrates another embodiment of the exemplary operational flow 500 of FIG. 5. The recognition operation 560 may include at least one additional operation. The at least one additional operation may include an operation 576, and/or an operation 578. The operation 576 facilitates delivery of a benefit to an owner of the first-electronic content or an owner of the second electronic content in response to an assessed influence on a behavior of the person by the first-electronic-content portion and/or the second-electronic-content portion. In an embodiment, an assessed influence may include generalized sales figures, election votes, and/or enrollment. In another embodiment, an assessed influence may include sales figures, election votes, and/or enrollment related to the person. The operation 578 facilitates delivery of a first benefit to an owner of the first-electronic content and a second benefit to an owner of the second electronic content in response to an assessed influence by the first-electronic-content portion and/or the second-electronic-content portion on the involvement between the person and the third-party.

Figure 16:
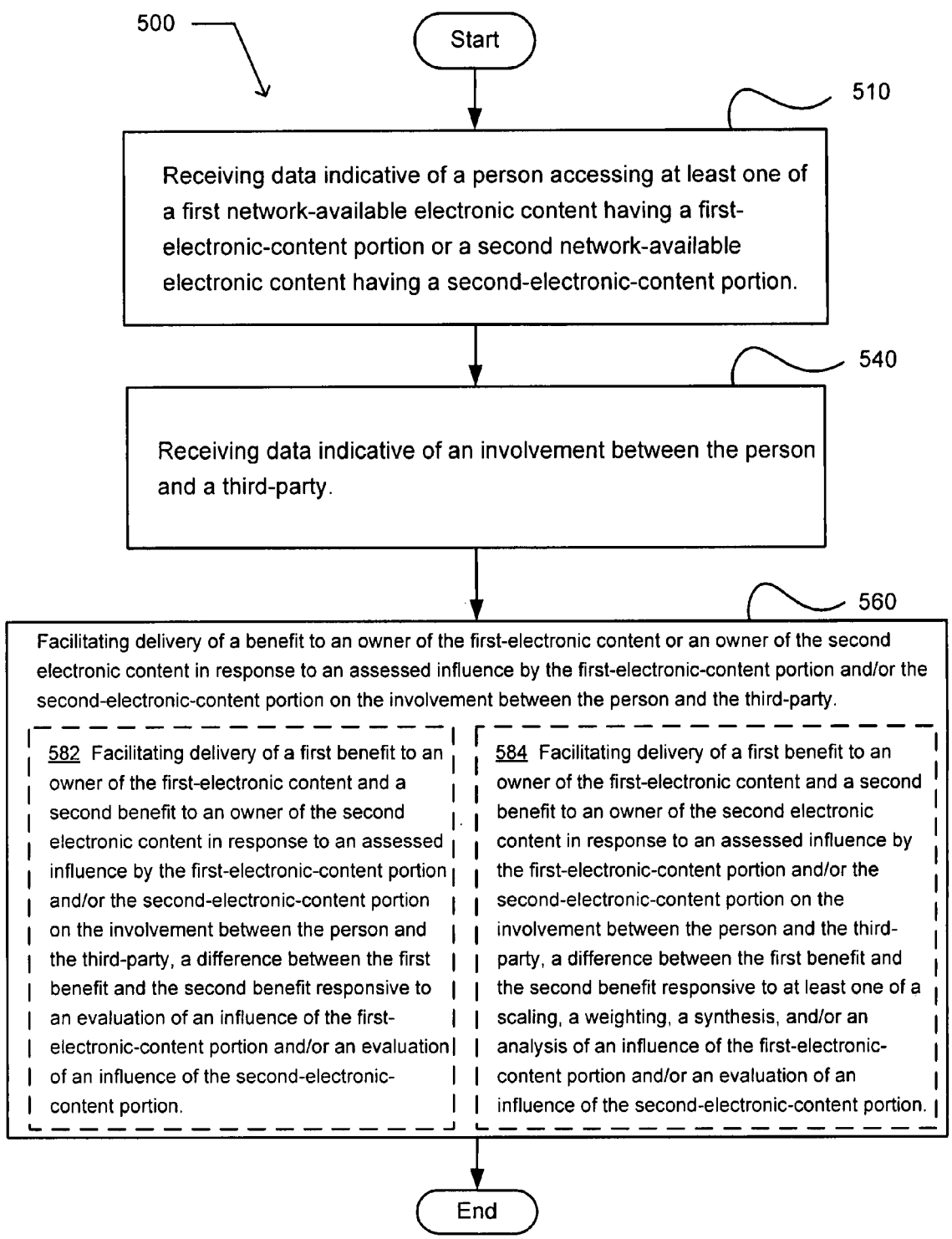
FIG. 16 illustrates a further embodiment of the exemplary operational flow of FIG. 5.

FIG. 16 illustrates a further embodiment of the exemplary operational flow 500 of FIG. 5. The recognition operation 560 may include at least one additional operation. The at least one additional operation may include an operation 582, and/or an operation 584. The operation 582 facilitates delivery of a first benefit to an owner of the first-electronic content and a second benefit to an owner of the second electronic content. The first benefit and the second benefit are in response to an assessed influence by the first-electronic-content portion and/or the second-electronic-content portion on the involvement between the person and the third-party. A difference between the first benefit and the second benefit being responsive to an evaluation of an influence of the first-electronic-content portion and/or an evaluation of an influence of the second-electronic-content portion. In an embodiment, the influence evaluation may include an algorithmically implemented influence evaluation. In another embodiment, the influence evaluation may include an artificial intelligence implemented influence evaluation. The operation 584 facilitates delivery of a first benefit to an owner of the first-electronic content and a second benefit to an owner of the second electronic content. The first benefit and the second benefit are in response to an assessed influence by the first-electronic-content portion and/or the second-electronic-content portion on the involvement between the person and the third-party. A difference between the first benefit and the second benefit is responsive to at least one of a scaling, a weighting, a synthesis, and/or an analysis of an influence of the first-electronic-content portion and/or an evaluation of an influence of the second-electronic-content portion.

FIG. 17 illustrates a further embodiment of the exemplary operational flow 500 of FIG. 5. The recognition operation 560 may include at least one additional operation. The at least one additional operation may include an operation 586, and/or an operation. 587. The operation 586 facilitates delivery of a first benefit to an owner of the first-electronic content and a second benefit to an owner of the second electronic content. The first benefit and the second benefit are in response to an assessed influence by the first-electronic-content portion and/or the second-electronic-content portion on the involvement between the person and the third-party. A difference between the first benefit and the second benefit is responsive to an evaluation of an influence of the first-electronic-content portion and/or an evaluation of an influence of the second-electronic-content portion, a difference between the first benefit and the second benefit responsive to a novelty added by the first-electronic content portion and/or a novelty added by the second-electronic content portion. The operation 587 facilitates delivery of a first benefit to an owner of the first-electronic content and a second benefit to an owner of the second electronic content in response to an assessed influence by the first-electronic-content portion and/or the second-electronic-content portion on the involvement between the person and the third-party. The first benefit and the second benefit respectively are responsive to an evaluation of an influence of the first-electronic-content portion and/or an evaluation of an influence of the second-electronic-content portion. In an embodiment, the first benefit and the second benefit are respectively responsive to at least one of an algorithm implemented evaluation, and/or an artificial intelligence implemented evaluation. In another embodiment, the first and second benefit are respectively responsive to at least one of at least one of a comparison, a relative allocation, a difference, and/or distribution of an influence of the first-electronic-content portion and/or an evaluation of an influence of the second-electronic-content portion.

FIG. 18 illustrates a further embodiment of the exemplary operational flow 500 of FIG. 5. The recognition operation 560 may include at least one additional operation. The at least one additional operation may include an operation 588, and/or an operation 589. The operation 588 facilitates delivery of a benefit to an owner of the first-electronic content or an owner of the second electronic content. The benefit is in response to an assessed influence by the first-electronic-content portion and/or the second-electronic-content portion on the involvement between the person and the third-party. The assessed influence is responsive to the received data indicative of a person accessing a first network-available electronic content having a first-electronic-content portion and/or a second network-available electronic content having a second-electronic-content portion. The operation 589 facilitates delivery of a benefit to an owner of the first-electronic content or an owner of the second electronic content in response to an assessed influence by the first-electronic-content portion and/or the second-electronic-content portion on the involvement between the person and the third-party. The assessed influence is responsive to the received data indicative of a person accessing at least one of a first network-available electronic content having a first-electronic-content portion and/or a second network-available electronic content having a second-electronic-content portion; and the received data indicative of an involvement between the person and the third-party. The assessed influence may be responsive to one or more other factors.

FIG. 19 illustrates an embodiment of the exemplary operational flow 500 of FIG. 5. The operational flow may include at least one additional operation, such as a kinship operation 590. The kinship operation receives data indicative of an affinity of the person. In an alternative embodiment, the data indicative of an affinity of the person is useable at the recognition operation 560 in assessing an influence by the first-electronic-content portion and/or the second-electronic-content portion on the involvement between the person and the third-party.

FIG. 20 illustrates an embodiment of the exemplary operational flow 500 of FIG. 5. The kinship operation 590 may include at least one additional operation. The at least one additional operation may include an operation 592 and/or an operation 594. The operation 592 receives data indicative of at least one of an express, and/or an inferred affinity of the person. The operation 594 receives data indicative of at least one of an affinity characteristic, and/or an affiliation of the person, such as the person's age category (young, middle age, senior), and/or the person's income (low income, median income, high income).

FIG. 21 illustrates another embodiment of the exemplary operational flow 500 of FIG. 5. The kinship operation 590 may include at least one additional operation, such as the operation 595. The operation 595 facilitates delivery of a benefit to an owner of the first-electronic content or an owner of the second electronic content in response to an assessed influence by the first-electronic-content portion and/or the second-electronic-content portion on the involvement between the person and the third-party. The assessed influence is responsive to the received data indicative of a person accessing at least one of a first network-available electronic content having a first-electronic-content portion or a second network-available electronic content having a second-electronic-content portion. The assessed influence is also responsive to the received data indicative of an affinity of the person.

FIG. 22 illustrates a further embodiment of the exemplary operational flow 500 of FIG. 5. The operational flow 500 may include may include at least one additional operation 596. The at least one additional operation 596 may include an operation 597 and/or an operation 598. The operation 597 maintains informational data corresponding to the assessed influence. The operation 598 provides access to informational data corresponding to the assessed influence.

FIG. 23 illustrates an exemplary computer program product 700. The program product includes a computer-readable signal-bearing medium 710 bearing program instructions 720 operable to perform an influence evaluation process in a computing device. The process includes receiving data indicative of a person accessing at least one of a first network-available electronic content having a first-electronic-content portion or a second network-available electronic content having a second-electronic-content portion. The process also includes receiving data indicative of an involvement between the person and the third-party, and assessing an influence by the first-electronic-content portion and/or the second-electronic-content portion on the involvement between the person and the third-party.

In an alternative embodiment, the process of the program instructions 720 further includes receiving data indicative of an affinity of the person 722. In another embodiment, the process of the program instructions further includes outputting the assessed influence in a form usable by a process facilitating delivery of a benefit to an owner of the first electronic content or an owner of the second electronic content 724. In a further embodiment, the process of the program instructions further includes maintaining informational data corresponding to the assessed influence 726. In another embodiment, the process of the program instructions further includes providing access to maintained informational data corresponding to the assessed influence 728.

In another embodiment, the computer-readable signal-bearing medium includes computer storage medium 732. In a further embodiment, the computer-readable signal-bearing medium includes communication medium 734.

Figure 24:
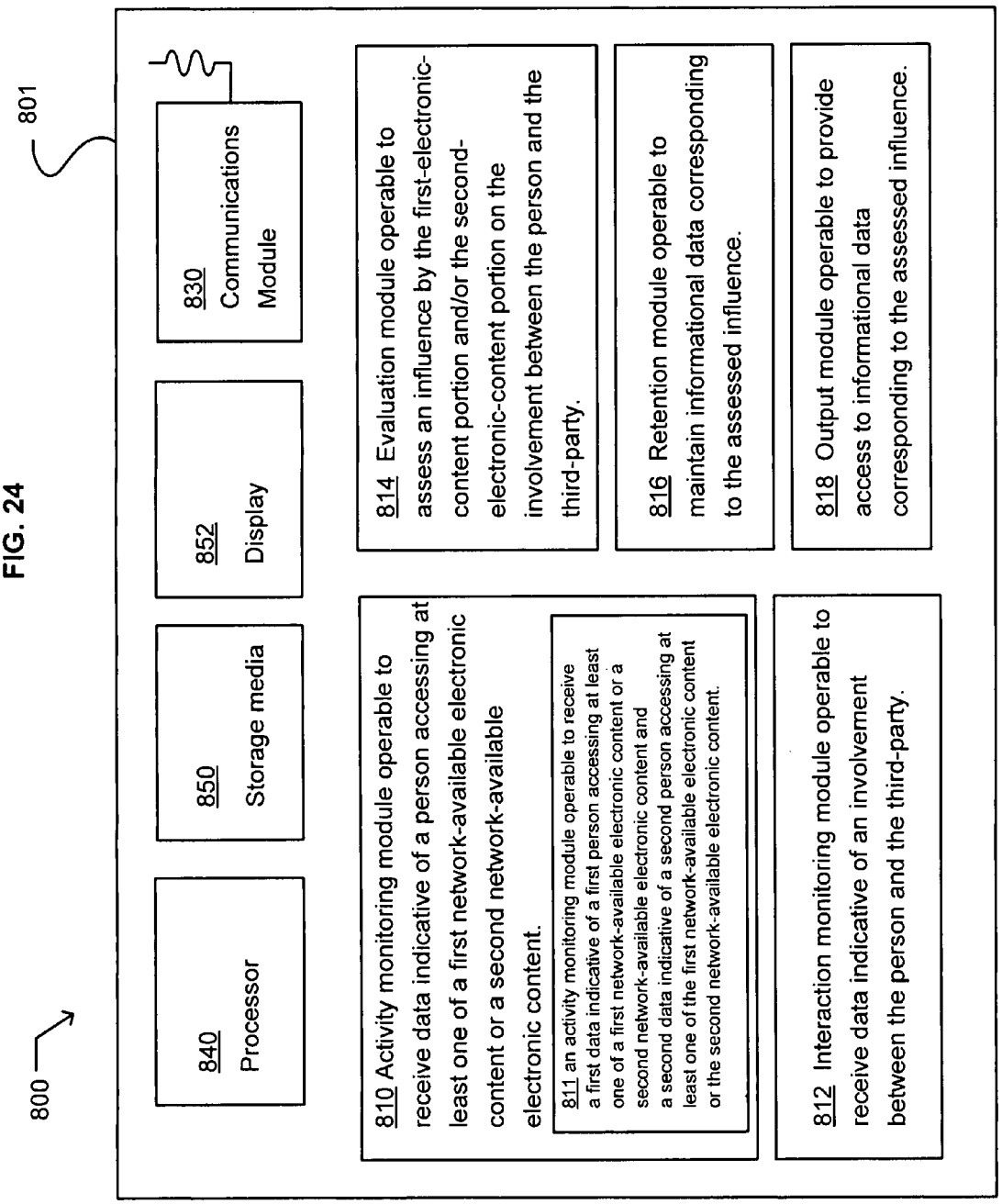
FIG. 24 illustrates an exemplary system.

FIG. 24 illustrates an exemplary system 800. The system includes a computing device 801 operable to communicate with a network (not shown). In an embodiment, the computing device may include the computing device 20 described in conjunction with FIG. 1, and/or the computing device 110 described in conjunction with FIG. 2. Communication by the computing device with a network may be implemented using a communications module 830. The communications module may include a wired, wireless, and/or optical communication capability. The computing device also includes an activity monitoring module 810, an interaction monitoring module 812, and an evaluation module 814. The activity monitoring module is operable to receive data indicative of a person accessing at least one of a first network-available electronic content or a second network-available electronic content. The interaction monitoring module is operable to receive data indicative of an involvement between the person and the third-party. The evaluation module is operable to assess an influence by the first-electronic-content and/or the second-electronic-content on the involvement between the person and the third-party.

In another embodiment, the computing device 801 includes a processor 840, a storage media 850, and/or a display 852. In a further embodiment, the computing device further includes a retention module 816 operable to maintain informational data corresponding to the assessed influence. In another embodiment, the computing device further includes an output module 818 operable to provide access to informational data corresponding to the assessed influence.

In an embodiment, the computing device 801 operable to communicate with a network further includes a computing device responsive to human input, and operable to display human perceivable content and communicate with a network. In another embodiment, the computing device operable to communicate with a network includes a computing device operable to provide electronic content to a network. In a further embodiment, the computing device operable to communicate with a network further includes an intermediate computing device operable to communicate with a network.

In an embodiment, the activity monitoring module 810 further includes an activity monitoring module 811 operable to receive a first data indicative of a first person accessing at least one of a first network-available electronic content or a second network-available electronic content. The activity monitoring module is further operable to receive a second data indicative of a second person accessing at least one of the first network-available electronic content or the second network-available electronic content. In another embodiment, the interaction monitoring module 812 further includes an interaction monitoring module (not shown) operable to operable to receive data indicative of an involvement between the first person and the third-party and/or the second person and the third party. In another embodiment, the evaluation module 814 further includes an evaluation module (not shown) operable to assess an influence by the first-electronic-content and/or the second-electronic-content on the involvement between the first person and the third-party, and/or on the involvement between the second person and the third-party.

In an embodiment, the computing device 801 operable to communicate with a network further includes a network intermediary device operable to communicate with a network. In another embodiment, the computing device operable to communicate with a network further includes a computing device under a control of the third-party and operable to communicate with a network.

Figure 25:
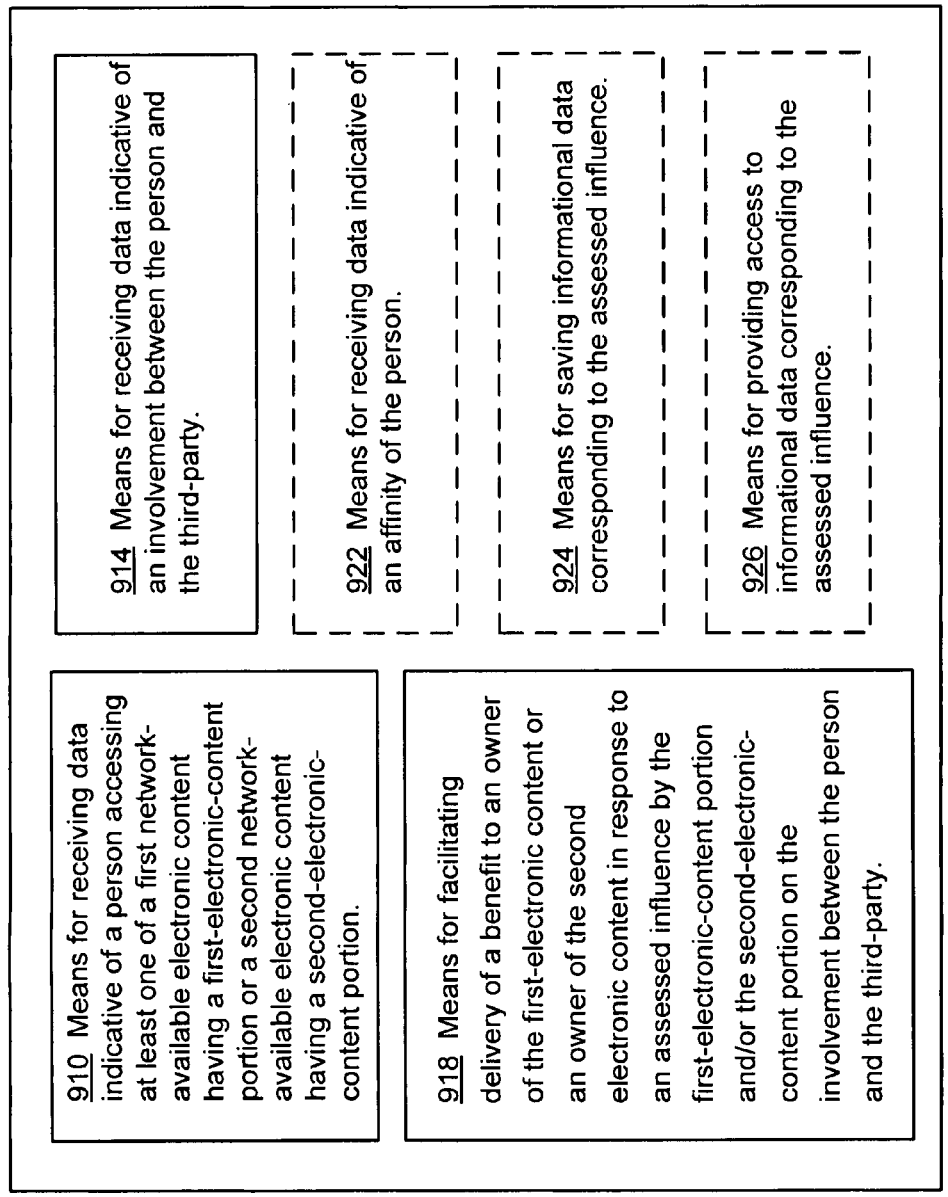
FIG. 25 illustrates a device.

FIG. 25 illustrates a device 900. The device includes means 910 for receiving data indicative of a person accessing at least one of a first network-available electronic content having a first-electronic-content portion or a second network-available electronic content having a second-electronic-content portion. The device also includes means 914 for receiving data indicative of an involvement between the person and the third-party. The device further includes means 918 for facilitating delivery of a benefit to an owner of the first-electronic content or an owner of the second electronic content in response to an assessed influence by the first-electronic-content portion and/or the second-electronic-content portion on the involvement between the person and the third-party.

In an embodiment, the device 900 further includes means 922 for receiving data indicative of an affinity of the person. In another embodiment, the device further includes means 924 for saving informational data corresponding to the assessed influence. In a further, embodiment, the device includes means 926 for providing access to informational data corresponding to the assessed influence.

Figure 26:
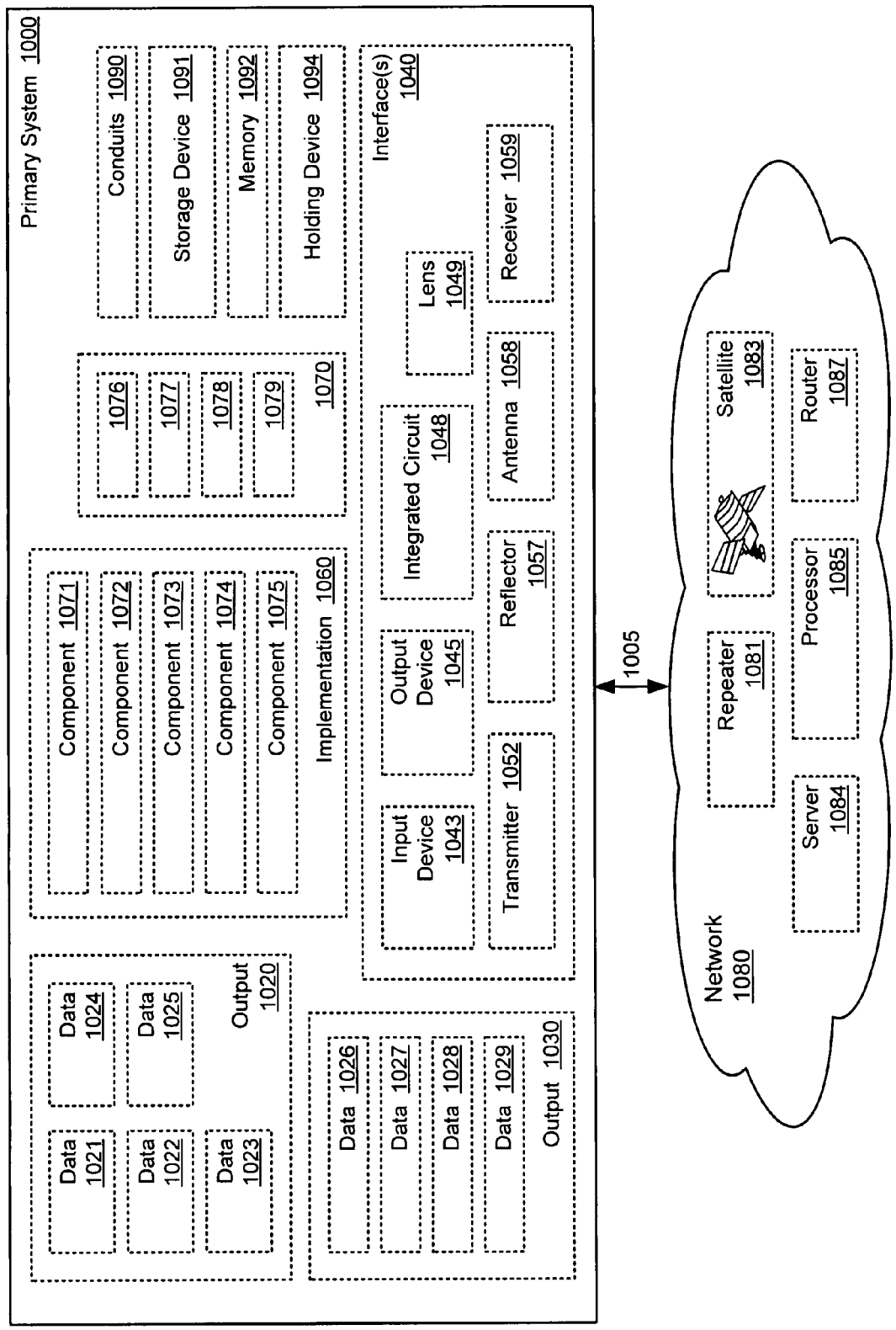
FIG. 26 illustrates an example of a system that may serve as a context for introducing one or more processes, systems or other articles.

FIG. 26 illustrates an example of a system that may serve as a context for introducing one or more processes, systems or other articles. Primary system 1 000 may include one or more instances of outputs 1020, 1030 or implementations 1060, 1070 that may be held or transmitted by interfaces 1040, conduits 1090, storage devices 1091, memories 1092, holding devices 1094, or the like. In various embodiments as described herein, for example, one or more instances of implementation output data 1021, 1022, 1023, 1024, 1025, 1026, 1027, 1028, 1029 or implementation components 1071, 1072, 1073, 1074, 1075, 1076, 1077, 1078, 1079 may each be expressed in any aspect or combination of software, firmware, or hardware as signals, data, designs, functional expressions, instructions, or the like. The interface(s) 1040 may include one or more instances of input devices 1043, output devices 1045, integrated circuits 1048, lenses 1049, transmitters 1052, reflectors 1057, antennas 1058, receivers 1059, or the like for handling data or communicating with local users or with network 1080 via linkage 1005, for example. Several variants of primary system 1000 are described below with reference to one or more instances of repeaters 1081, communication satellites 1083, servers 1084, processors 1085, routers 1087, or other elements of network 1080.

Those skilled in the art will recognize that some list items may also function as other list items. In the above-listed types of media, for example, some instances of interface(s) 1040 may include conduits 1090, or may also function as storage devices that are also holding devices 1094. Transmitters 1052 may likewise include input devices or bidirectional user interfaces, in many implementations of interface(s) 1040. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable "implementation outputs" such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Figure 27:
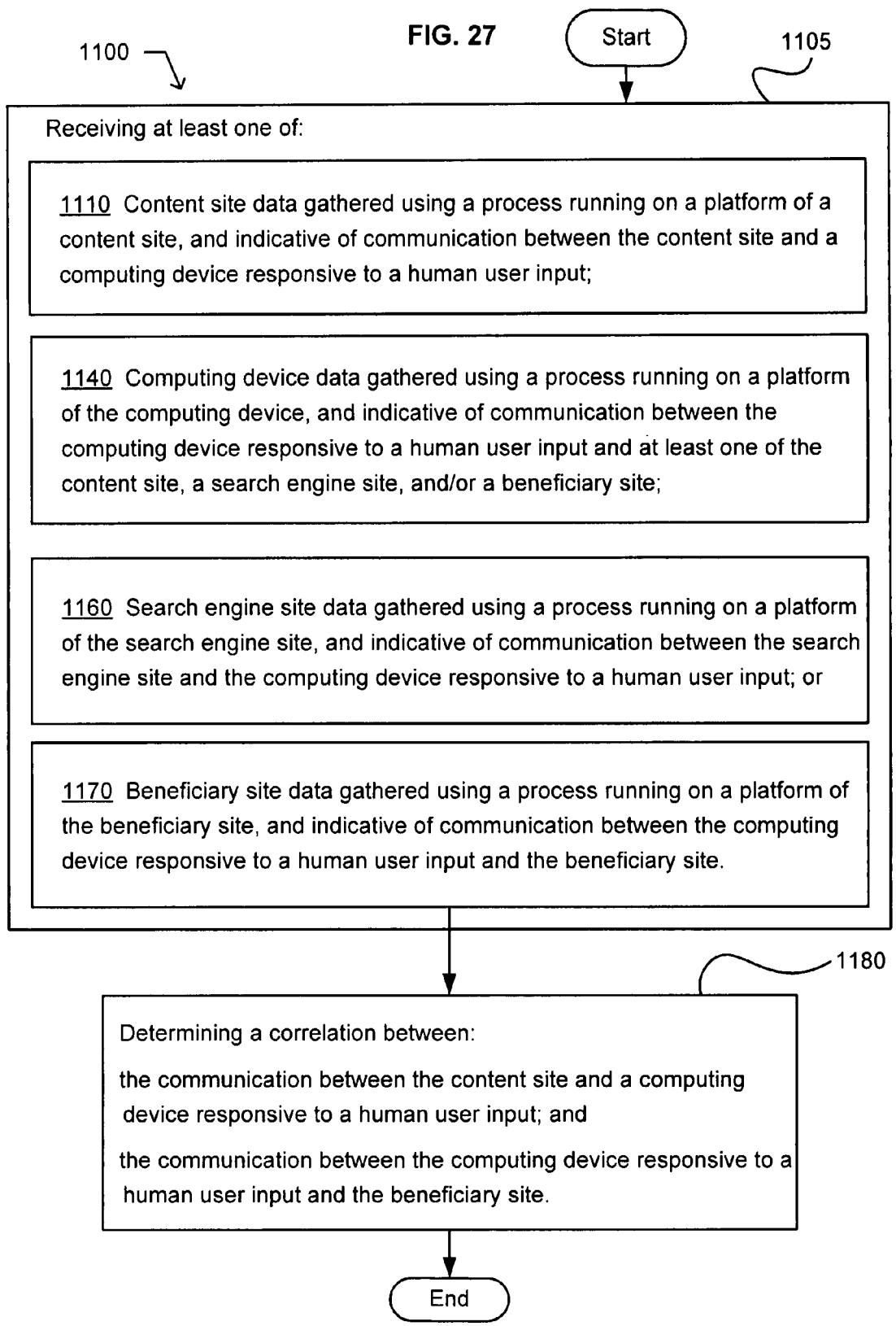
FIG. 27 illustrates an exemplary operational flow.

FIG. 27 illustrates an exemplary operational flow 1100. After a start operation, the operational flow moves to data gathering operation 1105. In an embodiment, the data gathering operation includes an operational flow that receives data from at least one of a content site data operation 1110, a computing device data operation 1140, a search engine site data operation 1160, or a beneficiary site data operation 1170. The receiving content site data operation includes receiving content site data gathered through a process running on a platform of a content site, and indicative of communication between the content site and a computing device responsive to a human user input. The computing device data operation includes receiving computing device data gathered through a process running on a platform of the computing device, and indicative of communication between the computing device responsive to a human user input and at least one of the content site, a search engine site, and/or a beneficiary site. In an embodiment, the beneficiary site and the content site are independent of each other. The search engine site data operation includes receiving search engine site data gathered through a process running on a platform of the search engine site, and indicative of communication between the search engine site and the computing device responsive to a human user input. The beneficiary site data operation includes receiving beneficiary site data gathered through a process running on a platform of the beneficiary site, and indicative of communication between the computing device responsive to a human user input and the beneficiary site.

In an embodiment, the data gathering operation 1105 described above includes receiving at least one class of data. This text describes the data gathering operation by using the word "or" in accord with a convention analogous to when "at least one of A, B, or C, etc." is used. In general, such a convention is intended in the sense one having skill in the art would understand the convention—(e.g., "an operational flow receiving at least one of A, B, or C" would include but not be limited to an operational flow receiving A alone; receiving B alone; receiving C alone; receiving both A and B; receiving both A and C; receiving both B and C; receiving A, B, and C; and so on). For example, in another embodiment, the data gathering operation receives a single instance of content site data. In a further embodiment, the data gathering operation receives content site data and beneficiary site data. In another operation, the data gathering operation receives two instances of computing device data and one instance of search engine site data.

The operational flow 1100 includes an influence evaluation operation 1180. The influence evaluation operation determines a correlation between (a) the communication between the content site and a computing device responsive to a human user input and (b) the communication between the computing device responsive to a human user input and the beneficiary site. The operational flow then moves to an end operation.

In an embodiment, the exemplary operational flow 1100 may be performed at a computing device. In another embodiment, FIG. 4 may be used to illustrate an environment in which the exemplary operational flow may be implemented. For example, the exemplary operational flow may be performed by at least one of the client machine 310, a content site illustrated as the content server 320, a beneficiary site illustrated as the third-party site 330, the search engine site 350, the influence determinator machine 360, the intermediary machine 370, and/or the page tag information processor 380 of FIG. 4. In yet another embodiment, at least a portion of the data may be outputted by a platform and/or an application running on the platform of the device performing the operational flow 1100. In a further embodiment, the operational flow may be performed by the content server using data outputted by the client machine and outputted by an application running on a platform of the content server. In another embodiment, the operational flow may be performed by the content server using data from both the client machine and the third-party site. In a further embodiment, the operational flow may be performed by the influence determinator machine using data outputted by at least one of the client machine, the content server, the search engine site, and/or the third-party site. In another embodiment, the operational flow may be performed by the search engine platform using data outputted by at least one of the client machine, the content server, and/or the third-party site. In an embodiment, an instance of data may be received directly or indirectly from a machine that gathered it. For example, if the operational flow is being performed at the influence determinator machine, the computing device data 1110 may be received by the content server, which then provides the computing device data to the influence determinator machine.

In an embodiment of the operational flow 1100, the platform of the content site and the platform of the computing device include an at least substantially common platform. For example, a platform may include an operating system architecture, such as Microsoft Windows, UNIX, LINUX, Solaris, and/or Mac OS X. By way further example, a platform may include an application and/or a family of applications. A family of applications may include Word, Excel, Outlook, Internet Explorer, Live Search, and/or Visio. Another family of applications may include the Google search engine, Gmail, Google Calendar, and/or Google Docs & Spreadsheets. A further family of applications may include a general family of applications, and/or a specialized family of applications. In another example, a platform may include a hardware platform. In a further example, a hardware platform may include a gaming platform and/or a particular chip architecture. In another example, a hardware platform may include a platform of combination of a switch, a router, and/or a sniffer.

In another embodiment of the operational flow 1100, the platform of the content site and the platform of the computing device include an at least substantially common platform. In a further embodiment, the platform of the content site and the platform of the computing device include an at least substantially common platform family.

In an embodiment of the operational flow 1100, the platform of the content site and the platform of the search engine site include an at least substantially common platform. In another embodiment, the platform of the content site and the platform of the search engine site include an at least substantially common platform family. In a further embodiment, the platform of the content site and the platform of the beneficiary site include an at least substantially common platform. In another embodiment, the platform of the content site and the platform of the beneficiary site include an at least substantially common platform family. In a further embodiment, the platform of the computing device and the platform of the search engine site include an at least substantially common platform. In another embodiment, the platform of the computing device and the platform of the search engine site include an at least substantially common platform family. In a further embodiment, the platform of the computing device and the platform of the beneficiary site include an at least substantially common platform.

In an embodiment of the operational flow 1100, the platform of the computing device and the platform of the beneficiary site include an at least substantially common platform family. In another embodiment, the platform of the search engine site and the platform of the beneficiary site include an at least substantially common platform. In a further embodiment, the platform of the search engine site and the platform of the beneficiary site include an at least substantially common platform family. In another embodiment, the process running on a platform of the content site and the process running on a platform of the computing device include an at least substantially common process. In a further embodiment, the process running on a platform of the content site and the process running on a platform of the computing device include at least substantially coordinating processes. In another embodiment, the process running on a platform of the content site and the process running on a platform of the search engine site include an at least substantially common process. In a further embodiment, the process running on a platform of the content site and the process running on a platform of the search engine site include at least substantially coordinating processes. In another embodiment, the process running on a platform of the content site and the process running on a platform of the beneficiary site include an at least substantially common process.

In an embodiment of the operational flow 1100, the process running on a platform of the content site and the process running on a platform of the beneficiary site include at least substantially coordinating processes. In another embodiment, the process running on a platform of the computing device and the process running on a platform of the search engine site include an at least substantially common process. In a further embodiment, the process running on a platform of the computing device and the process running on a platform of the search engine site include at least substantially coordinating processes. In another embodiment, the process running on a platform of the computing device and the process running on a platform of the beneficiary site include an at least substantially common process. In a further embodiment, the process running on a platform of the computing device and the process running on a platform of the beneficiary site include at least substantially coordinating processes.

In an embodiment of the operational flow 1100, the process running on a platform of the search engine site and the process running on a platform of the beneficiary site include an at least substantially common process. In another embodiment, the process running on a platform of the search engine site and the process running on a platform of the beneficiary site include at least substantially coordinating processes.

Referring now also to the context of FIG. 26, in some embodiments, flow 1100 may be performed by one or more instances of server 1084 remote from primary system 1000 but operable to cause output device(s) 1045 to receive and present results via linkage 1005. Alternatively or additionally, any included instances of device-detectable data 1021-1025 may be borne by one or more conduits 1090, holding devices 1094, integrated circuits 1048, or the like as described herein. Such data may optionally be configured for transmission by a semiconductor chip or other embodiment of integrated circuit 1048 that contains or is otherwise operatively coupled with one or more antennas 1058 (in a radio-frequency identification tag, for example).

In some variants, flow 1100 may be implemented entirely within primary system 1000, optionally as a stand-alone system. Operation 1105 may be implemented by configuring component 1071 as logic for receiving content site data gathered through a process running on a platform of a content site, and indicative of communication between the content site and a computing device responsive to a human user input, for example, such as by including special-purpose instruction sequences or special-purpose-circuit designs for this function. Output data 1021 from such a component in primary system 1000 or network 1080 may be recorded by configuring available portions of storage device(s) 1091. Alternatively or additionally, such specific output data may be transmitted by configuring transistors, relays, or other conduits 1090 of primary system 1000 to transfer it to component 1075, for example.

Alternatively or additionally, one or more instances of component 1072 may perform operation 1105 via implementation as logic for receiving computing device data gathered through a process running on a platform of the computing device, and indicative of communication between the computing device responsive to a human user input and at least one of the content site, a search engine site, and/or a beneficiary site, for example. Implementation output data 1022 from such a component in primary system 1000 or network 1080 may be sent in some form to component 1075, for example.

Alternatively or additionally, one or more instances of component 1073 may perform operation 1105 via implementation as logic for receiving beneficiary site data gathered through a process running on a platform of the beneficiary site, and indicative of communication between the computing device responsive to a human user input and the beneficiary site, for example. Implementation output data 1023 from such a component in primary system 1000 or network 1080 may be routed to component 1075, for example.

Alternatively or additionally, one or more instances of component 1074 may perform operation 1105 via implementation as logic for receiving search engine site data gathered through a process running on a platform of the search engine site, and indicative of communication between the search engine site and the computing device responsive to a human user input, for example. Implementation output data 1024 from such a component in primary system 1000 or network 1080 may be routed (directly or indirectly) to component 1075, for example.

At some time after such data is received as described above to one or more of whichever components 1071-1074 may have been included in implementation 1060, one or more instances of component 1075 may act upon it. In some variants, one or more of optional components 1071-1074 may be omitted or ignored, for example, even in a context in which an included one or more of components 1071-1074 can respectively detect one or more of items 1110, 1140, 1160, 1170. Component 1075 may respond by performing operation 1180, for example, if configured as logic for determining a correlation between (a) the communication between the content site and the computing device responsive to a human user input; and (b) the communication between the computing device responsive to a human user input and the beneficiary site. Output 1020 from flow 1100 may (optionally) include other implementation output data 1021-1025 as described herein. Such output 1020 may, for example, be processed as described herein, recorded into available portions of storage device(s) 1091, or routed (directly or indirectly) through linkage 1005. Each portion of implementation 1060 may likewise include one or more instances of software, hardware, or the like implementing logic that may be expressed in several respective forms as described herein or otherwise understood by those skilled in the art.

Referring again now to FIG. 5, also in reference to the context of FIG. 26, some instance of flow 500 may likewise be implemented entirely within primary system 1000 in some variants. Operation 510 may be implemented by configuring component 1076 as logic for receiving data indicative of a person accessing at least one of a first network-available electronic content having a first-electronic-content portion or a second network-available electronic content having a second-electronic-content portion, for example, such as by including special-purpose instruction sequences or special-purpose-circuit designs for this function. Output data 1026 from such a component in primary system 1000 or network 1080 may be recorded into available portions of storage device(s) 1091 or sent to component 1078, for example. Component 1077 may perform operation 540 via implementation as logic for receiving data indicative of an involvement between the person and a third-party, for example. Implementation output data 1027 from such a component in primary system 1000 or network 1080 may be recorded into available portions of storage device(s) 1091 or sent to component 1078, for example. Component 1077 may perform operation 560 via implementation as logic for facilitating delivery of a benefit to an owner of the first-electronic content or an owner of the second electronic content in response to an assessed influence by the first-electronic-content portion and/or the second-electronic-content portion on the involvement between the person and the third-party. Output 1030 from flow 500 may likewise include other data 1028, 1029 as described herein. Each portion of implementation 1060 may likewise include one or more instances of software, circuitry, or the like implementing logic that may be expressed in several respective forms as described herein or otherwise understood by those skilled in the art.

In some embodiments, output device 1045 may indicate an occurrence of flow 1100 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also indicate one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 1021-1029 are unavailable or unimportant, or in which a recipient may understand or access portions of data 1021-1029 without receiving a preemptive explanation of how it was obtained. By distilling output 1020 at an "upstream" stage (which may comprise integrated circuit 1048, for example, in some arrangements), downstream-stage media (such as other elements of network 1080, for example) may indicate occurrences of various methods described herein more effectively. Variants of flow 1100, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 1040 may interact with one or more primary system users via input and output devices 1043, 1045 so as to manifest an implementation in primary system 1000 via an interaction with server 1084, for example, running a secondary implementation of flow 1100. Such local implementations may comprise a visual display supporting a local internet service to the remote server, for example. Such a remote server may control or otherwise enable one or more instances of hardware or software operating the secondary implementation outside a system, network, or physical proximity of primary system 1000. For a building implementing primary system 1000, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 1000 running an implementation of flow 1100 may be a remote activation of a special-purpose computer program resident on server 1084 via an internet browser session interaction through linkage 1005, mediated by input device 1043 and output device 1045.

In some variants, some or all of components 1071-1079 may be borne in various data-handling elements—e.g., in one or more instances of storage devices 1091, in memories 1092 or volatile media, passing through linkage 1005 with network 1080 or other conduits 1090, in one or more registers or data-holding devices 1094, or the like. For example, such processing or configuration may occur in response to user data or the like received at input device 1043 or may be presented at output device 1045. Instances of input devices 1043 may (optionally) include one or more instances of cameras or other optical devices, hand-held systems or other portable systems, keypads, sensors, or the like as described herein. Output device(s) 1045 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 1043, or the like.

A device-detectable implementation of variants described herein with reference to flow 1100, for example, may be divided into several components 1071-1079 carried by one or more instances of active modules such as signal repeaters 1081, communication satellites 1083, servers 1084, processors 1085, routers 1087, or the like. For example, in some embodiments, component 1072 may be borne by an "upstream" module (e.g., repeater 1081 or the like) while or after component 1071 is borne in a "downstream" module (e.g., another instance of repeater 1081, communication satellite 1083, server 1084, or the like). Such downstream modules may "accept" such bits or other portions of implementation 1060 or implementation 1070 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 1020 may result from more than one component of implementations 1060, 1070 or more than one operation of flow 1100, for example.

In some embodiments, such integrated circuits 1048 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 26, for example, instances of the one or more input devices 1043 may include a microphone or the like operable to provide auditory samples in data 1021-1029. Some form or portion of such output may be provided remotely, for example, to one or more instances of neural networks or other configurations of remote processors 1085 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 26, for example, instances of lenses 1049 or other input devices 1043 may include optical sensors or the like operable to provide one or more of geometric, hue, or optical intensity information in data 1021-1029. Some form or portion of such output may be provided locally, for example, to one or more instances of optical character recognition software, pattern recognition processing resources, or other configurations of integrated circuits 1048 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

Figure 43:
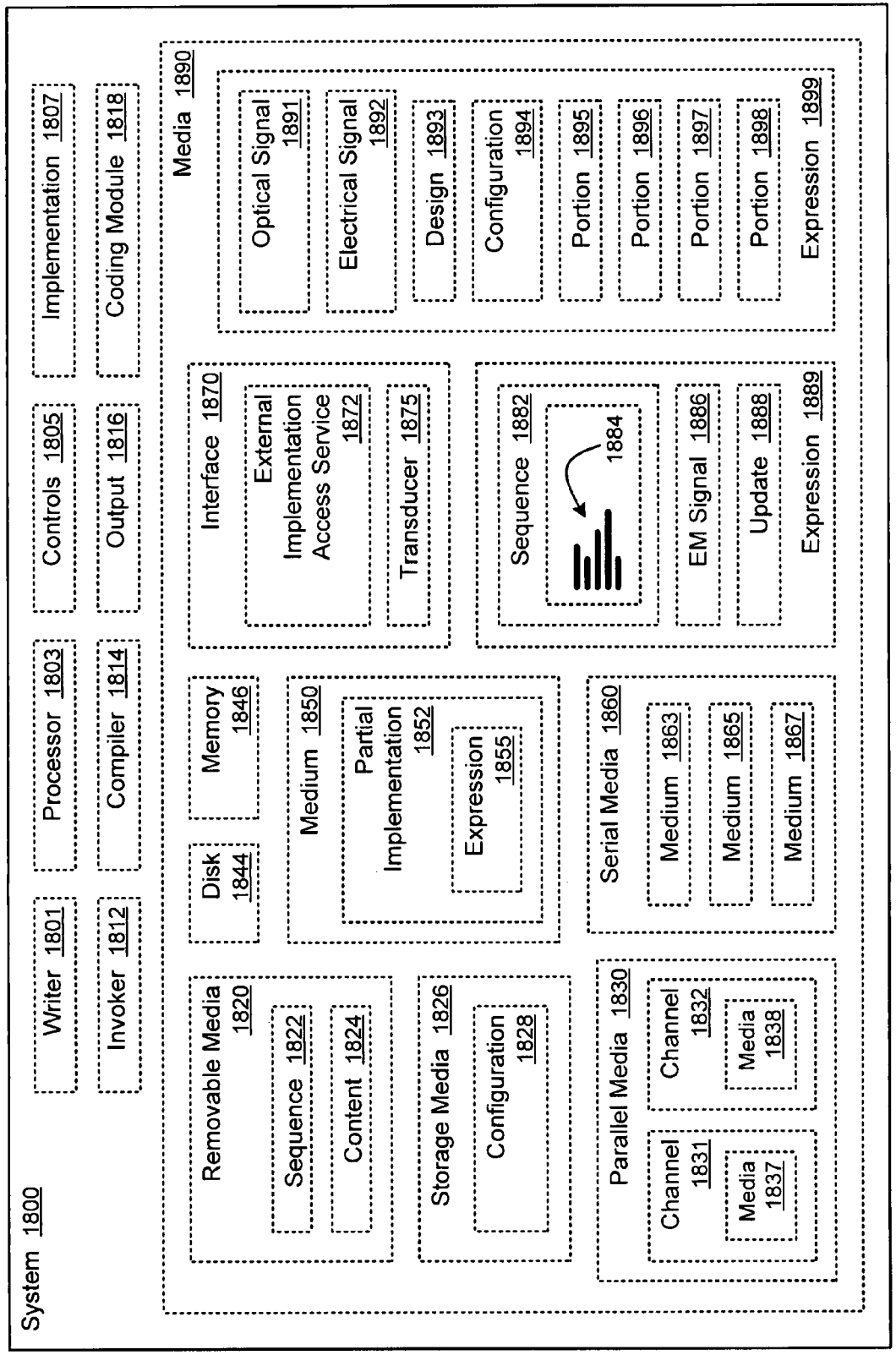
FIG. 43 illustrates another system that may serve as a context for introducing one or more processes, systems or other articles described herein.

In some embodiments, one or more instances of integrated circuits or other processors may be configured to perform linguistic pattern recognition. In FIG. 43, for example, instances of input devices 1043 may include keys, pointing devices, microphones, sensors, reference data, or the like operable to provide spoken, written, or other symbolic expressions in data 1021-1029. Some form or portion of such output may be provided locally, for example, to one or more instances of translation utilities, compilers, or other configurations of integrated circuits 1048 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, antennas 1058 or receivers 1059 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 1021-1029 may be sent from server 1084 through respective channels at various times, one portion passing through repeater 1081 and another through router 1087. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or another output 1020, 1030 of interest. Such distributed media may be implemented as an expedient or efficient mode of bearing such portions of output data to a common destination such as interface 1040 or holding device 1094. Alternatively or additionally, some such data may be transported by moving a medium (carried on storage device 1091, for example) so that only a small portion (a purchase or other access authorization, for example, or a contingent or supplemental module) is transferred via linkage 1005.

In some embodiments, one or more instances of signal repeaters 1081 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 1083 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

In some variants, processor 1085 or any components 1071-1079 of implementations 1060, 1070 may (optionally) be configured to perform flow variants as described herein with reference to any of FIGS. 6-22. An occurrence of such a variant can be expressed as a computation, a transition, or as any other items of data 1021-1029 described herein, for example. Such output 1020, 1030 can be generated, for example, by depicted components of primary system 1000 or network 1080 including one or more features as described with reference to any of FIGS. 1-4, 23, 24, or 41.

FIG. 28 illustrates an alternative embodiment of the exemplary operational flow 1100 of FIG. 27. The receiving content site data operation 1110 may include at least one additional operation. The at least one additional operation may include an operation 1112, an operation 1114, an operation 1116, and/or an operation 1118. At the operation 1112, the receiving content site data operation includes receiving content site data gathered through a process running on a platform of a content site. The content site data is indicative of communication between the content site and a computing device responsive to a human user input. The process includes a process that is at least one of bundled with, integrated into, and/or registered with the platform of the content site. At the operation 1114, the receiving content site data operation includes receiving content site data gathered through a process running on a platform of a content site. The content site data is indicative of communication between the content site and the computing device responsive to a human user input. At the operation 1116, the receiving content site data operation includes receiving content site data gathered through a process running on a platform of a content site. The content site data is indicative of communication between the content site and a computing device responsive to a human user input. The content site is operable to provide content deliverable to the person. The deliverable content including at least one of a: document; review; critique; comment; rating; aggregations of reviews, comments, and/or critiques; consumer-generated-media; blog; newsgroup; message board; and/or discussion forum. At the operation 1118, the receiving content site data operation includes receiving content site data gathered through a process running on a platform of a content site. The content data is indicative of communication between the content site and a computing device responsive to a human user input, and related to digital work deliverable to the person.

FIG. 29 illustrates another alternative embodiment of the exemplary operational flow 1100 of FIG. 27. The receiving content site data operation 1110 may include at least one additional operation. The at least one additional operation may include an operation 1122, an operation 1124, and/or an operation 1126. At the operation 1122, the receiving content site data operation includes receiving content site data gathered through a process running on a platform of a content site. The content site data is indicative of communication between the content site and a computing device responsive to a human user input, and related to at least one of a publicly available electronic content, a limited publicly available electronic content, and/or a privately available electronic content that is deliverable to the person. At the operation 1124, the receiving content site data operation includes receiving content site data gathered through a process running on a platform of a content site. The content site data is indicative of communication between the content site and a computing device responsive to a human user input, and related to an electronic content deliverable to the person that includes at least one of an electronic document, an electronic work, an electronically-stored information, a Web document an email, and/or an instant message. In another embodiment, the Web document includes a Web site content, a Web page, a Weblog, and/or a blog. At the operation 1126, the receiving content site data operation includes receiving content site data gathered through a process running on a platform of a content site. The content site data indicative of communication between the content site and a computing device responsive to a human user input, and related to an electronic content deliverable to the person that includes at least one of a human perceivable content, a textual content, a visual content, an audio content, and/or a graphical content.

FIG. 30 illustrates a further alternative embodiment of the exemplary operational flow 1100 of FIG. 27. The receiving content site data operation 1110 may include at least one additional operation. The at least one additional operation may include an operation 1128, and/or an operation 1132. At the operation 1128, the receiving content site data operation includes receiving content site data gathered through a process running on a platform of a content site. The content site data indicative of communication between the content site and a computing device responsive to a human user input. The content site data is related to at least one of a transaction, history, search string, search result, and/or computing-device action associated with the computing device responsive to a human user input. At the operation 1132, the receiving content site data operation includes receiving content site data gathered through a process running on a platform of a content site, indicative of communication between the content site and a computing device responsive to a human user input. The content site data is further indicative of at least one of a program resident on the computing device, a process registered with an operating system of the computing device, a cookie present in computing device, data indicative of an affinity of the human user, and/or an information descriptive of an aspect of the computing device.

FIG. 31 illustrates a further alternative embodiment of the exemplary operational flow 1100 of FIG. 27. The receiving computing device data operation 1140 may include at least one additional operation. The at least one additional operation may include an operation 1142, and/or an operation 1144. At the operation 1142, the receiving computing device data operation includes receiving computing device data gathered through a process running on a platform of the computing device. The computing device data indicative of communication between the computing device responsive to a human user input and at least one of the content site, a search engine site, and/or a beneficiary site. The computing device data further indicative of at least one of a program resident on the computing device, a process registered with an operating system of the computing device, a cookie present in computing device, data indicative of an affinity of the human user, and/or an information descriptive of an aspect of the computing device. At the operation 1144, the receiving computing device data operation includes receiving computing device data gathered through a process running on a platform of the computing device. The computing device data indicative of communication between the computing device responsive to a human user input and at least one of the content site, a search engine site, and/or a beneficiary site. The computing device data further indicative of at least one of a program resident on the computing device, a process registered with an operating system of the computing device, a cookie present in computing device, data indicative of an affinity of the human user, and/or an information descriptive of an aspect of the computing device as provided by a process running on a platform of the computing device.

FIG. 32 illustrates an alternative embodiment of the exemplary operational flow 1100 of FIG. 27. The receiving computing device data operation 1140 may include at least one additional operation. The at least one additional operation may include an operation 1146, and/or an operation 1148. At the operation 1146, the receiving computing device data operation includes receiving computing device data gathered through a process running on a platform of the computing device, and indicative of communication between the computing device responsive to a human user input and at least one of the content site, a search engine site, and/or a beneficiary site. The communication includes communication related to the computing device responsive to a human user input receiving a digital work deliverable to the person. At the operation 1148, the receiving computing device data operation includes receiving computing device data gathered through a process running on a platform of the computing device. The computing device data indicative of communication between the computing device responsive to a human user input and at least one of the content site, a search engine site, and/or a beneficiary site. The communication includes communication related to the computing device responsive to a human user input receiving at least one of a document; review; critique; comment; rating; aggregations of reviews, comments, and/or critiques; a consumer-generated-media; blog; newsgroup; message board; and/or discussion forum deliverable to the person.

FIG. 33 illustrates another alternative embodiment of the exemplary operational flow 1100 of FIG. 27. The receiving computing device data operation 1140 may include at least one additional operation. The at least one additional operation may include an operation 1152, and/or an operation 1154. At the operation 1152, the receiving computing device data operation includes receiving computing device data gathered through a process running on a platform of the computing device. The computing device data indicative of communication between the computing device responsive to a human user input and at least one of the content site, a search engine site, and/or a beneficiary site. The communication includes communication related to the computing device and responsive to a transaction, history, search string, search result, and/or computing-device action associated with the computing device. In an alternative embodiment, the communication related to the computing device includes communication related to the computing device receiving at least one of an electronic content deliverable to the person, which includes at least one of an electronic document, an electronic work, an electronically-stored information, a Web document, an email, and/or an instant message. At the operation 1154, the receiving computing device data operation includes receiving computing device data gathered through a process running on a platform of the computing device. The computing device data indicative of communication between the computing device responsive to a human user input and at least one of the content site, a search engine site, and/or a beneficiary site. The communication includes communication related to the computing device receiving at least one of an electronic content deliverable to the person, a human perceivable content, a textual content, a visual content, an audio content, and/or a graphical content.

FIG. 34 illustrates an alternative embodiment of the exemplary operational flow 1100 of FIG. 27. The receiving computing device data operation 1140 may include at least one additional operation, such as the operation 1156. At the operation 1156, the receiving computing device data operation includes receiving computing device data gathered through a process running on a platform of the computing device. The computing device data indicative of communication between the computing device responsive to a human user input and at least one of the content site, a search engine site, and/or a beneficiary site. The communication includes communication related to the computing device receiving at least one of a transaction, history, search string, search result, and/or computing-device action associated with computing device.

FIG. 35 illustrates another alternative embodiment of the exemplary operational flow 1100 of FIG. 27. The receiving search engine site data operation 1160 may include at least one additional operation. The at least one additional operation may include an operation 1162, and/or an operation 1164. At the operation 1162, the receiving search engine site data operation includes receiving search engine site data gathered through a process running on a platform of the search engine site. The search engine site data indicative of communication between the search engine site and the computing device responsive to a human user input. The communication includes communication related to at least one of a transaction, history, search string, search result, and/or an action associated with the computing device. At the operation 1164, the receiving search engine site data operation includes receiving search engine site data gathered through a process running on a platform of the search engine site. The search engine site data indicative of communication between the search engine site and the computing device responsive to a human user input. The communication includes communication related to at least one of a program resident on the computing device, a process registered with an operating system of the computing device, a cookie present in computing device, data indicative of an affinity of the human user, and/or an information descriptive of an aspect of the computing device.

FIG. 36 illustrates a further alternative embodiment of the exemplary operational flow 1100 of FIG. 27. The receiving search engine site data operation 1160 may include at least one additional operation. The at least one additional operation may include an operation 1166. At the operation 1166, the receiving search engine site data operation includes receiving search engine site data gathered through a process running on a platform of the search engine site. The search engine site data indicative of communication between the search engine site and the computing device responsive to a human user input. The communication includes communication related to at least one of a program resident on the computing device, a process registered with an operating system of the computing device, a cookie present in computing device, data indicative of an affinity of the human user, and/or an information descriptive of an aspect of the computing device provided by a process running on a platform of the computing device.

FIG. 37 illustrates an alternative embodiment of the exemplary operational flow 1100 of FIG. 27. The receiving beneficiary site data operation 1170 may include at least one additional operation. The at least one additional operation may include an operation 1172, and/or an operation 1174. At the operation 1172, the receiving beneficiary site data operation includes receiving beneficiary site data gathered through a process running on a platform of the beneficiary site. The beneficiary site data indicative of at least one of communication associated with a purchase, communication associated with a vote, communication associated with a fund raising, and/or communication associated with a transaction between the computing device responsive to a human user input and the beneficiary site. At the operation 1174, the receiving beneficiary site data operation includes receiving beneficiary site data gathered through a process running on a platform of the beneficiary site. The beneficiary site data indicative of communication between the computing device responsive to a human user input and the beneficiary site. The communication between the computing device and the beneficiary site is initiated by a human action unrestricted by an electronic content of the content site. For example, the communication between the computing device and the beneficiary site is not responsive to or initiated by a clickthrough or other executable link provided by the content site.

FIG. 38 illustrates another alternative embodiment of the exemplary operational flow 1100 of FIG. 27. The influence evaluation operation 1180 may include at least one additional operation. The at least one additional operation may include an operation 1182, an operation 1184, and/or an operation 1186. At the operation 1182, the influence evaluation operation includes at least one of estimating, approximating, and/or inferring a correlation between (a) the communication between the content site and a computing device responsive to a human user input and (b) the communication between the computing device responsive to a human user input and the beneficiary site. At the operation 1184, the influence evaluation operation includes predicting a future behavior of a person in response to a determined correlation between (a) the communication between the content site and a computing device responsive to a human user input and (b) the communication between the computing device responsive to a human user input and the beneficiary site. In an embodiment, the person includes the human user, a plurality of persons in an affinity group that includes the human user, and/or a hypothetical human. At the operation 1186, the influence evaluation operation includes determining at least one of a linear correlation, a relationship, a non-linear correlation, a fuzzy correlation, and/or a fuzzy relationship between (a) the communication between the content site and a computing device responsive to a human user input and (b) the communication between the computing device responsive to a human user input and the beneficiary site.

FIG. 39 illustrates a further alternative embodiment of the exemplary operational flow 1100 of FIG. 27. The exemplary operational flow 1100 may include at least one additional operation 1190. The at least one additional operation may include an operation 1192, an operation 1194, and/or an operation 1196. The operation 1192 assists delivery of a compensation to the holder of the content site in response to the determined degree of correlation. In an alternative embodiment, the compensation to the holder may be determined in response to the determined degree of correlation. In an embodiment, the holder of the content site may include at least one of an owner, developer, operator, proprietor, blogger, and/or designated recipient of any benefit. The operation 1194 maintains informational data corresponding to the determined correlation. The operation 1196 provides access to an informational data corresponding to the determined correlation.

FIG. 40 illustrates an exemplary 1300 computing device 1300 operable to communicate over a network. The computing device includes a communications monitoring module 1310 and an evaluation module 1312. The communications monitoring module is operable to receive at least one of content site data, computing device data, search engine site data, or beneficiary site data. The content site data gathered through a process running on a platform of a content site, and indicative of communication between the content site and a computing device responsive to a human user input. The computing device data gathered through a process running on a platform of the computing device, and indicative of communication between the computing device responsive to a human user input and at least one of the content site, a search engine site, and/or a beneficiary site. The search engine site data gathered through a process running on a platform of the search engine site, and indicative of communication between the search engine site and the computing device responsive to a human user input. The beneficiary site data gathered through a process running on a platform of the beneficiary site, and indicative of communication between the computing device responsive to a human input and the beneficiary site. The evaluation module 1312 is operable to determine a correlation of (a) the communication between the content site and a computing device responsive to a human user input; and (b) the communication between the computing device responsive to a human user input and the beneficiary site.

In an alternative embodiment, the computing device 1300 further a computer-readable media configurable by data outputted by at least one of the communications monitoring module and/or the evaluation module. The computer-readable media is illustrated as a storage media 1350. In another embodiment, the computing device further includes a retention module 1314 operable to maintain informational data corresponding to the determined correlation. In a further embodiment, the computing device includes an output module 1316 operable to provide access to informational data corresponding to the determined correlation. In another embodiment, the computing device further includes a computing device responsive to human input, and operable to display human perceivable content and communicate with a network. In yet another embodiment, the computing device further includes a computing device operable to provide electronic content via a network. In a further embodiment, the computing device further includes a network intermediary device operable to communicate with a network. In another embodiment, the computing device further includes a computing device under a control of the third-party.

FIG. 41 illustrates an exemplary computer program product 1400. The computer program product includes a signal bearing medium 1410 bearing program instructions 1420 operable to perform an influence evaluation process in a computing device. The process of the program instructions includes receiving at least one of content site data, computing device data, search engine site data, or beneficiary site data. The content site data gathered through a process running on a platform of a content site, and indicative of communication between the content site and a computing device responsive to a human user input. The computing device data gathered through a process running on a platform of the computing device, and indicative of communication between the computing device responsive to a human user input and at least one of the content site, a search engine site, and/or a beneficiary site. The search engine site data gathered through a process running on a platform of the search engine site, and indicative of communication between the search engine site and the computing device responsive to a human user input. The beneficiary site data gathered through a process running on a platform of the beneficiary site, and indicative of communication between the computing device responsive to a human input and the beneficiary site. The process of the program instructions 1420 also includes assessing an influence of the content site on an involvement between the computing device responsive to a human user input and the beneficiary site. In an alternative embodiment, the process of the program instructions 1420 further includes receiving data indicative of an affinity of a human user of the computing device 1422. In another embodiment, the process of the program instructions further includes outputting the influence assessment in a form usable by a process facilitating delivery of a benefit to an owner of the content site 1424. In further embodiment, the process of the program instructions further includes maintaining informational data corresponding to the assessment of influence 1426. In yet another embodiment, the process of the program instructions further includes providing access to maintained informational data corresponding to the assessment of influence 1428.

In another embodiment, the computer-readable signal-bearing medium 1410 includes a computer storage medium 1432. In a further embodiment, the computer-readable signal-bearing medium includes a communication medium 1434.

FIG. 42 illustrates an exemplary device 1500. The device includes means 1510 for receiving at least one of content site data, computing device data, search engine site data, or beneficiary site data. The content site data gathered through a process running on a platform of a content site, and indicative of communication between the content site and a computing device responsive to a human user input. The computing device data gathered through a process running on a platform of the computing device, and indicative of communication between the computing device responsive to a human user input and at least one of the content site, a search engine site, and/or a beneficiary site. The search engine site data gathered through a process running on a platform of the search engine site, and indicative of communication between the search engine site and the computing device responsive to a human user input. The beneficiary site data gathered through a process running on a platform of the beneficiary site, and indicative of communication between the computing device responsive to a human input and the beneficiary site.

The device 1510 also includes means 1512 for assessing an influence of the content site on an involvement between the computing device responsive to a human user input and the beneficiary site. In an alternative embodiment, the device further includes means 1522 for receiving data indicative of an affinity of a human user of the computing device. In another embodiment, the device further includes means 1524 for outputting the influence assessment in a form usable by a process facilitating delivery of a benefit to an owner of the content site.

With reference now to FIG. 43, shown is an example of another system that may serve as a context for introducing one or more processes, systems or other articles described herein. As shown system 1800 comprises one or more instances of writers 1801, processors 1803, controls 1805, software or other implementations 1807, invokers 1812, compilers 1814, outputs 1816, coding modules 1818, or the like with one or more media 1890 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 1818 may be configured with circuitry for applying, imposing, or otherwise using a syntactic or other encoding constraint in forming, extracting, or otherwise handling respective portions of the device-detectable implementation or output. In encoding a software module or other message content, for example, compiler 1814 or coding module 1818 may implement one or more such constraints pursuant to public key or other encryption, applying error correction modes, certifying or otherwise annotating the message content, or implementing other security practices described herein or known by those skilled in the art. Alternatively or additionally, another instance of coding module 1818 may be configured to receive data (via receiver 1059, e.g.) and decode or otherwise distill the received data using one or more such encoding constraints. Compiler 1814 may, in some variants, convert one or more of components 1071-1079 from a corresponding source code form before the component(s) are transmitted across linkage 1005.

System 1800 may be implemented, for example, as one or more instances of stand-alone workstations, servers, vehicles, portable devices, removable media 1820, as components of primary system 1000 or network 1080 (of FIG. 26), or the like. Alternatively or additionally, media 1890 may include one or more instances of signal repeaters 1081, communication satellites 1083, servers 1084, processors 1085, routers 1087, portions of primary system 1000 as shown, or the like.

Media 1890 may include one or more instances of removable media 1820, tapes or other storage media 1826; parallel (transmission) media 1830; disks 1844; memories 1846; other data-handling media 1850; serial media 1860; interfaces 1870; or expressions 1889, 1899. Removable media 1820 can bear one or more device-detectable instances of instruction sequences 1822 or other implementations of flow 1100 or flow 500, for example. Alternatively or additionally, in some embodiments, removable media 1820 can bear alphanumeric data, audio data, image data, structure-descriptive values, or other content 1824 in a context that indicates an occurrence of flow 1100 or flow 500. In some circumstances, transmission media may bear respective portions of implementations as described herein serially or otherwise non-simultaneously. In some variants in which two portions 1897, 1898 constitute a partial or complete software implementation or product of a novel method described herein, portion 1897 may follow portion 1898 successively through serial media 1863, 1865, 1867 (with transmission of portion 1897 partly overlapping in time with transmission of portion 1898 passing through medium 1863, for example).

As shown, parallel channels 1831, 1832 are respectively implemented at least in media 1837, 1838 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 1865) operable for transmitting content of the device-detectable implementation as described herein between two taps or other terminals (e.g., as media 1863, 1867 comprising a source and destination).

In another such configuration, one or more media 1837 of channel 1831 may bear portion 1897 before, while or after one or more other media 1838 of parallel channel 1832 bear portion 1898. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like.

In a variant in which a channel through medium 1850 bears an expression 1855 partially implementing an operational flow described herein, the remainder of the implementation may be borne (earlier or later, in some instances) by the same medium 1850 or by one or more other portions of media 1890 as shown. In some embodiments, moreover, one or more controls 1805 may configure at least some media 1890 by triggering transmissions as described above or transmissions of one or more outputs 1816 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 1890 constructed and arranged to receive a special-purpose sequence 1882 of two or more device-detectable instructions 1884 for implementing a flow as described herein or to receive an output of executing such instructions. Physical media 1890 may (optionally) be configured by writer 1801, transmitter 1052, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 1882 of instructions 1884, patches or other implementation updates 1888, configurations 1894, special-purpose circuit designs 1893, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 1886, laser or other optical signals 1891, electrical signals 1892, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 1828 of nonvolatile storage media 1826 or as external implementation access services 1872.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 1045 may present one or more results of computing device data gathered through a process running on a platform of the computing device, and indicative of communication between the computing device responsive to a human user input and at least one of the content site, a search engine site, and/or a beneficiary site in response to interface(s) 1040 receiving one or more invocations or outputs of an implementation of this function via linkage 1005. Such an "invocation" may, in some embodiments, comprise one or more instances of requests, hardware or software activations, user actions, or other determinants as described herein. Alternatively or additionally, in some embodiments, one or more input devices 1043 may later receive one or more invocations or results of search engine site data gathered through a process running on a platform of the search engine site, and indicative of communication between the search engine site and the computing device responsive to a human user input. In contexts like these, processor 1085 or other components of network 1080 may likewise constitute a secondary implementation having access to a primary instance of interface 1040 implementing methods like flow 1100 as described herein.

Serial media 1860 comprises a communication channel of two or more media configured to bear a transition or other output increment successively. In some embodiments, for example, serial media 1860 may include a communication line or wireless medium (e.g., as medium 1865) between two signal-bearing conduits (e.g., terminals or antennas as media 1863, 1867). Alternatively or additionally, one or more lenses 1049 or other light-transmissive media may comprise a serial medium between a light-transmissive medium and a sensor or other light receiver 1059 or transmitter 1052. In some embodiments, such "light-transmissive" media may (optionally) comprise metamaterials or other media operable for bearing one or more instances of microwave signals, radio-wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 1800 may likewise include one or more instances of media for handling implementations or their outputs: satellite dishes or other reflectors 1057, antennas 1058 or other transducers 1875, arrays of two or more such devices configured to detect or redirect one or more incoming signals, caching elements or other data-holding elements (e.g., disks 1844, memories 1846, or other media 1890), integrated circuits 1048, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 1895, 1896 of an expression 1899 of implementation 1807 may be sent through respective channels at various times. Invoker 1812 may request or otherwise attempt to activate a computer program or streaming media overseas via a telephone cable or other channel 1831. Meanwhile, output 1816 may attempt to trigger a session or other partial implementation 1852, success in which may be indicated by receiving expression 1855 into a visual display or other medium 1850. Such a program or other implementation may be made complete, for example, once both of these attempts succeed.

In some embodiments, transducer(s) 1875 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals, (or vice versa).

Figure 44:
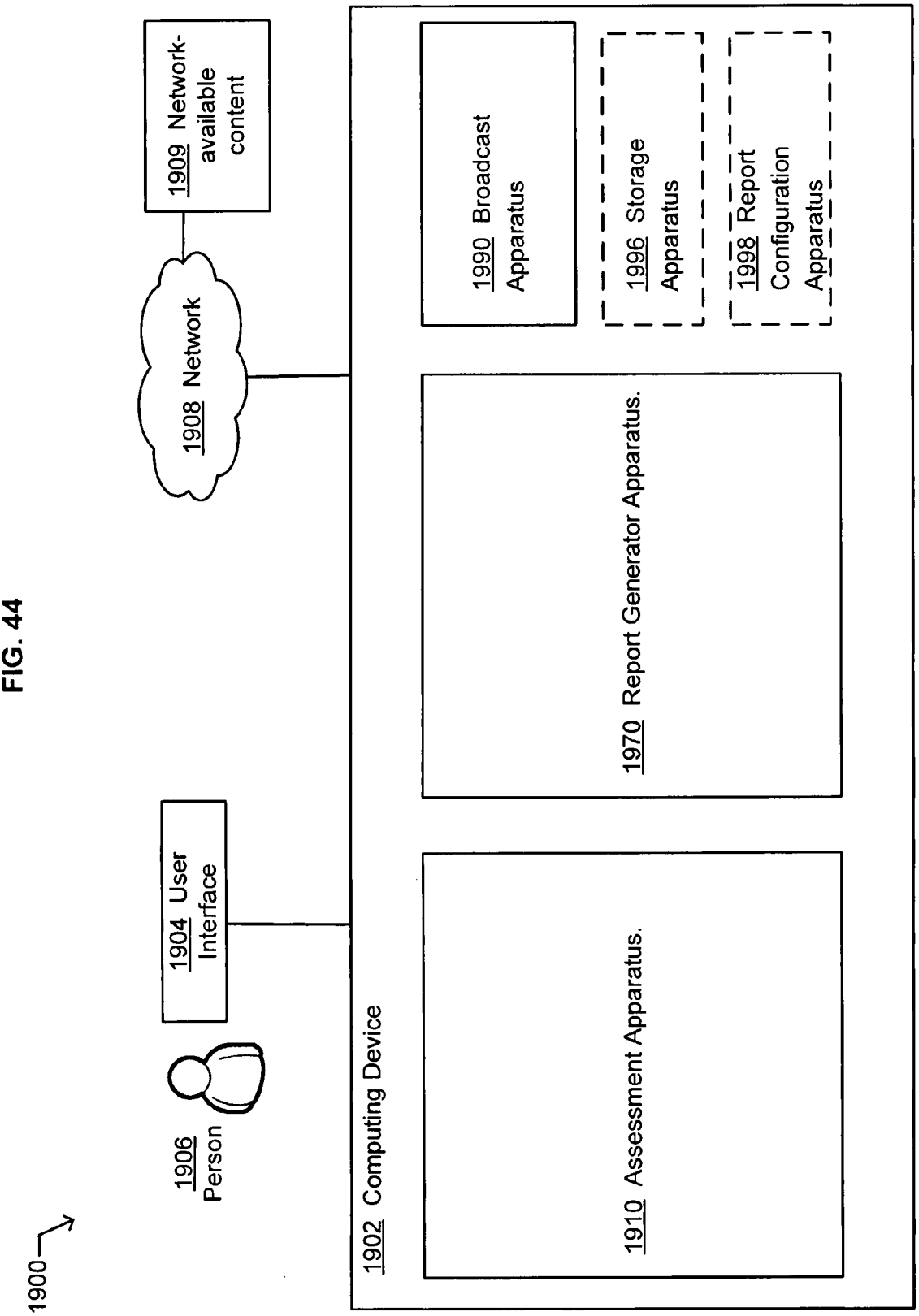
FIG. 44 illustrates a system.

FIG. 44 illustrates a system 1900. The system includes a computing device 1902. In an embodiment, the computing device includes a user side computing device. In another embodiment, the computing device may include another computing device, such as a content server computing device, a search engine site, network-intermediary device, a page tag information processor, or other computing device. The computing device contains an assessment apparatus 1910, a report generator apparatus 1970, and a broadcast apparatus 1990. In some embodiments, the broadcast apparatus may be structurally distinct from the assessment apparatus and/or the report generator apparatus. A person 1906 via a user interface 1904 may use the computing device 1902 to access network available content 1909 via a network 1908.

In an alternative embodiment, the computing device 1902 may include at least one additional apparatus. The at least one additional apparatus may include a storage apparatus 1996, and/or a report configuration apparatus 1998. The assessment apparatus 1910 may include one or more sub-apparatus (not shown). The report generator apparatus 1970 may include one or more sub-apparatus (not shown). The broadcast apparatus 1990 may include one or more sub-apparatus (not shown). In an embodiment, one of more of these apparatus may be implemented in hardware, software, and/or firmware.

FIG. 45 illustrates an example operational flow 2000 for reporting influence. After a start operation, the operational flow proceeds to an evaluation operation 2010. The evaluation operation assesses a behavioral influence with respect to possible matters of interest to other parties, including a third-party, by network-available content on a person accessing the network-available content. In an embodiment, the accessing of the network-available content may occur close in time to a downloading of the network-available content. In another embodiment, the accessing of the network available content may be deferred in time after a downloading of the network-available content. For example, the network-available content may be received on a first day and accessed by the person on a second day. A report preparation operation 2070 generates a user influence report responsive to the assessed behavioral influence. At least one characteristic of the user influence report differentiates between (i) a behavioral influence on the person resulting from the person activating a link included in the network-available content to another network-available content owned by the third-party, and (ii) another behavioral influence on the person. For example, in an embodiment, the user influence report may indicate that a behavioral influence resulted in the person clicking on a link included in the network-available content, such as the person clicking on a link to amazon.com included in a book review. In the same example embodiment, the user influence report may also indicate that the person's influenced behavior included looking using a search engine to find other reviews of the same book, and accessing those reviews at identified journalistic websites and blogs before clicking on the link to amazon.com. A broadcast operation 2090 transmits information derived from the user influence report. The operational flow then proceeds to an end operation.

FIG. 45 and several following figures may include various examples of operational flows, discussions, and explanations with respect to the above-described system environment of FIG. 44, and/or with respect to other examples and contexts. However, it should be understood that the operational flows may be executed in a number of other environment and contexts, and/or in modified versions of FIG. 44. Also, although the various operational flows are illustrated in a sequence(s), it should be understood that the various operations may be performed in other orders than those which are illustrated, and/or may be performed concurrently.

The evaluation operation 2010 may be performed by the assessment apparatus 1910 of the computing device 1902 of FIG. 44. The reporting operation 2070 may be performed by the report generator apparatus 1970. The broadcast operation 2090 may be performed by the broadcast apparatus 1990.

FIG. 46 illustrates an alternative embodiment of the operational flow 2000 described in FIG. 45. The evaluation operation 2010 may include at least one addition embodiment. The at least one additional embodiment may include an operation 2012, an operation 2018, and/or an operation 2022. The operation 2012 uses a computing device facilitating the person accessing the network-available content to assess a behavioral influence by the network-available content on a person accessing the network-available content with respect to possible matters of interest to other parties including a third-party. The computing device may include the thin computing device 20 described in conjunction with FIG. 1 and/or the computing device 110 described in conjunction with FIG. 2. The operation 2018 uses a content server that is facilitating the person accessing the network-available content to assess a behavioral influence by network-available content on a person accessing the network-available content. The content server may include the server device 201 described in conjunction with FIG. 3. The operation 2018 may be performed in the content-server based report generator. The operation 2022 uses a search engine site facilitating the person accessing a network-available content to generate a user influence report assessing a behavioral influence by the network-available content on the person accessing the network-available content. The search engine site may include the search engine site 350 described in conjunction with FIG. 4. The operation 2022 may be performed in the search engine site based assessment apparatus 1910. The operation 2012 may include at least one additional embodiment, such as an operation 2014, and/or an operation 2016. The operation 2014 uses a client-side computing device that is facilitating the person accessing the network-available content to assess a behavioral influence by the network-available content on a person accessing the network-available content with respect to possible matters of interest to other parties including a third-party. The operation 2016 uses a user-side computing device to facilitate the person accessing the network-available content to assess a behavioral influence by the network-available content on a person accessing the network-available content with respect to possible matters of interest to other parties including a third-party.

FIG. 47 illustrates another embodiment of the operational flow 2000 described in FIG. 45. The evaluation operation 2010 may include at least one addition embodiment. The at least one additional embodiment may include an operation 2024, an operation 2026, an operation 2028, and/or an operation 2032. The operation 2024 uses a network intermediary device that is facilitating the person accessing the network-available content to assess a behavioral influence by network-available content on a person accessing the network-available content with respect to possible matters of interest to other parties including a third-party. The operation 2026 uses a page tag information processor to assess a behavioral influence by network-available content on a person accessing the network-available content with respect to possible matters of interest to other parties including a third-party. The operation 2028 assesses a behavioral influence by network-available content on a person accessing the network-available content. The assessment of behavioral influence is responsive to data acquired by a computing device facilitating the person accessing the network available content with respect to possible matters of interest to other parties including a third-party. The operation 2032 assesses a behavioral influence by network-available content on a person accessing the network-available content with respect to possible matters of interest to other parties including a third-party. The assessment of behavioral influence is responsive to data acquired by at least two sources. The at least two sources include at least one of a computing device facilitating the person accessing the network available content, a content server facilitating the person accessing the network-available content, a search engine site facilitating the person accessing the network-available content, and/or a third-party site. For example, the at least two sources may include a computing device facilitating the person accessing the network available content and the content server facilitating the person accessing the network-available content. In a further example, the at least two sources may include two content servers facilitating the person accessing the network-available content.

FIG. 48 illustrates a further embodiment of the operational flow 2000 described in FIG. 45. The evaluation operation 2010 may include at least one addition embodiment. The at least one additional embodiment may include an operation 2034, an operation 2036, an operation 2038, an operation 2042, and/or an operation 2044. The operation 2034 (not shown) assesses a behavioral influence by network-available content on a person accessing the network-available content with respect to possible matters of interest to other parties including a third-party. The assessment of behavioral influence includes computing device data gathered using a process included in a platform of a computing device facilitating the person accessing the network-available content. The computing device data is indicative of communication between the computing device responsive to a human user input and at least one of a content site, a search engine site, and/or a beneficiary site. The operation 2036 assesses a behavioral influence with respect to possible matters of interest to other parties including a third-party by network-available content on a person accessing the network-available content. The assessment of behavioral influence is responsive at least in part to data collected using a process received from a search engine site and running on a computing device facilitating access the network-available content by the person. The operation 2038 assesses a behavioral influence with respect to possible matters of interest to other parties including a third-party by network-available content on a person accessing the network-available content. The network-available content includes a first content having a first-content portion and a second content having a second-content portion. For example, the first network available content may include the eContent 1 and the second network available content may include the eContent 2 described in conjunction with FIG. 4. The operation 2042 assesses a behavioral influence with respect to possible matters of interest to other parties including a third-party by network-available content on a person accessing the network-available content. The network-available content includes a first content having a first-content portion hosted by a first content server and a second content having a second-content portion hosted by a second server. For example, the first network available content may include the eContent 1 described in conjunction with FIG. 4, and the second network available content may include another eContent hosted by another content server that is not shown. The operation 2044 assesses a behavioral influence by static or a dynamic network-available content on a person accessing the network-available content with respect to possible matters of interest to other parties including a third-party.

FIG. 49 illustrates an alternative embodiment of the operational flow 2000 described in FIG. 45. The evaluation operation 2010 may include at least one addition embodiment. The at least one additional embodiment may include an operation 2046, an operation 2048, an operation 2052, an operation 2054, and/or an operation 2056. The operation 2046 assesses a behavioral influence by the network-available content on a person exposed to the network-available content with respect to possible matters of interest to other parties, including a third-party. The operation 2048 assesses a behavioral influence with respect to possible matters of interest to other parties including a third-party by network-available content on a person accessing the network-available content. The possible matters of interest include at least one of sales, purchases, enrollment, membership, signing up for email lists, votes, and/or enrollment. The operation 2052 assesses a behavioral influence by downloaded network content presented to the person with respect to possible matters of interest to other parties including a third-party. The operation 2054 assesses a behavioral influence by a transformed network-available content on the person accessing the transformed network-available content with respect to possible matters of interest to other parties, including a third-party. The operation 2056 assesses a behavioral influence by pushed or a pulled network-available content on a person accessing the network-available content with respect to possible matters of interest to other parties including a third-party.

FIG. 50 illustrates a further embodiment of the operational flow 2000 described in FIG. 45. The report preparation operation 2070 may include at least one additional operation. The at least one additional operation may include an operation 2072, an operation 2074, an operation 2076, and/or an operation 2078. The operation 2072 generates a user influence report responsive to the assessed behavioral influence. A characteristic of the user influence report includes at least one of a single bit, a document, an XML document, a dynamic report, a two-way report, a one-time snapshot, behavioral log, summary log, behavioral comparison, a historical comparison and/or activity history. At the operation 2074, the activating a link included in the network-available content to another network-available content owned by the third-party further includes activating a hyperlink included in the network-available content to another network-available content owned by the third-party. At the operation 2076, the activating a link included in the network-available content to another network-available content owned by the third-party further includes activating an address included in the network-available content that points to another network-available content owned by the third-party. At the operation 2078, the another behavioral influence on the person further includes a behavioral influence on the person corresponding to at least one of a behavior influence on the person with respect to the network-available content, with respect to a subsequently accessed network-available content, with respect to a subsequent search, and/or with respect to the third-party.

FIG. 51 illustrates another embodiment of the operational flow 2000 described in FIG. 45. The report preparation operation 2070 may include at least one additional operation. The at least one additional operation may include an operation 2082, an operation 2084, and/or an operation 2086. At the operation 2082, the another behavioral influence on the person further includes a behavioral influence on the person corresponding to at least one of a behavior influence on the person buying, joining, downloading, uploading, and/or voting with respect to a matter of interest to the third-party. At the operation 2084, the another behavioral influence on the person further includes a behavioral influence on the person corresponding to at least one of the person's inputs, keystrokes, navigation commands, mouse movements, caching, sessions, and/or visits. At the operation 2086, the another behavioral influence on the person further includes a behavioral influence on the person corresponding to at least one of the person's activity associated with, incidental to, and/or responsive to mouse movements, scrolling movements, purchases, operations, visited Websites, visited blogs, page views, page visits, viewing time, repeat visits, page tags, printing a content, click stream, search strings, local search strings, interactions, scrolling, menu activity, corresponding/related to browsing the Internet, cut and paste, print history, browsing history, email, and/or cookies received.

FIG. 52 illustrates an alternative embodiment of the operational flow 2000 described in FIG. 45. The broadcast operation 2090 may include at least one additional operation. The at least one additional operation may include an operation 2092, and/or an operation 2094. The operation 2092 transmits information derived from the user influence report in a manner receivable by a site operable to facilitate delivery to an owner of the network-available content on behalf of the third-party. The operation 2094 transmits the user influence report.

The operational flow 2000 may include at least one additional operation 2095. The at least one additional operation may include an operation 2096, and/or an operation 2098. The operation 2096 saves the user influence report. The operation 2098 configures the user influence report to be useful to an entity distributing a benefit to an owner of a network-available content on behalf of the third-party.

FIG. 53 illustrates an operational flow 2100 of reporting influence on a person. After a start operation, the operational flow includes an evaluation operation 2110. The evaluation operation assesses a behavioral influence with respect to possible matters of interest to other parties by network-available content on a person accessing the network-available content. An analysis operation 2120 generates a user influence report responsive to the assessed behavioral influence. A characteristic of the user influence report includes reporting the assessed behavior influence without reporting any behavioral influence indicated by the person activating a link to a network-available content owned by a third-party/beneficiary. A retention operation 2130 saves data indicative of the user influence report. The operational flow then moves to an end operation.

FIG. 54 illustrates an operational flow 2150 for reporting an influence of electronic content. After a start operation, the operational flow moves to an evaluation operation 2160. The evaluation operation assesses a behavioral influence with respect to possible matters of interest to a third-party by the electronic content on a person accessing the electronic content. A characteristic of the assessment of a behavioral influence includes assessing the behavior influence independent of any behavior influence evidenced by the person activating a link to an electronic content owned by the third-party and included in the electronic content. A data reception operation 2170 receives data indicative of a matter of interest to the third party. For example, the third-party/beneficiary of FIG. 4 may be interesting in knowing whether there exists electronic content accessible over the Internet directed to a product they sell, and whether that electronic content is steering people toward the product and/or their Web site, illustrated as third-party/beneficiary site 330. Continuing with this example, the data reception operation may in this example receive data indicating that the manufacturer is interested in electronic content related to their product. In an instance, a new car manufacturer may be introducing a new model car, and want to receive an assessment of behavioral influence on the person using the client/user machine 310 of FIG. 4 with respect to their new car. The data reception operation would receive data indicating that manufacturer X is interested in electronic content pertaining to their new model car Y. A dissemination operation 2180 transmits information derived from the assessment of behavioral influence. In an alternative embodiment, the dissemination operation may include at least one additional operation, illustrated as an operation 2182. The operation 2182 transmits information derived from the assessment of behavioral influence via a network. The user influence report is receivable by a site operable to facilitate delivery of a benefit on behalf of the third-party to an owner of the electronic content. The operational flow then proceeds to an end operation. Also, although the various-operational flows are illustrated in a sequence(s), it should be understood that the various operations may be performed in other orders than those which are illustrated, or may be performed concurrently.

Figure 55:
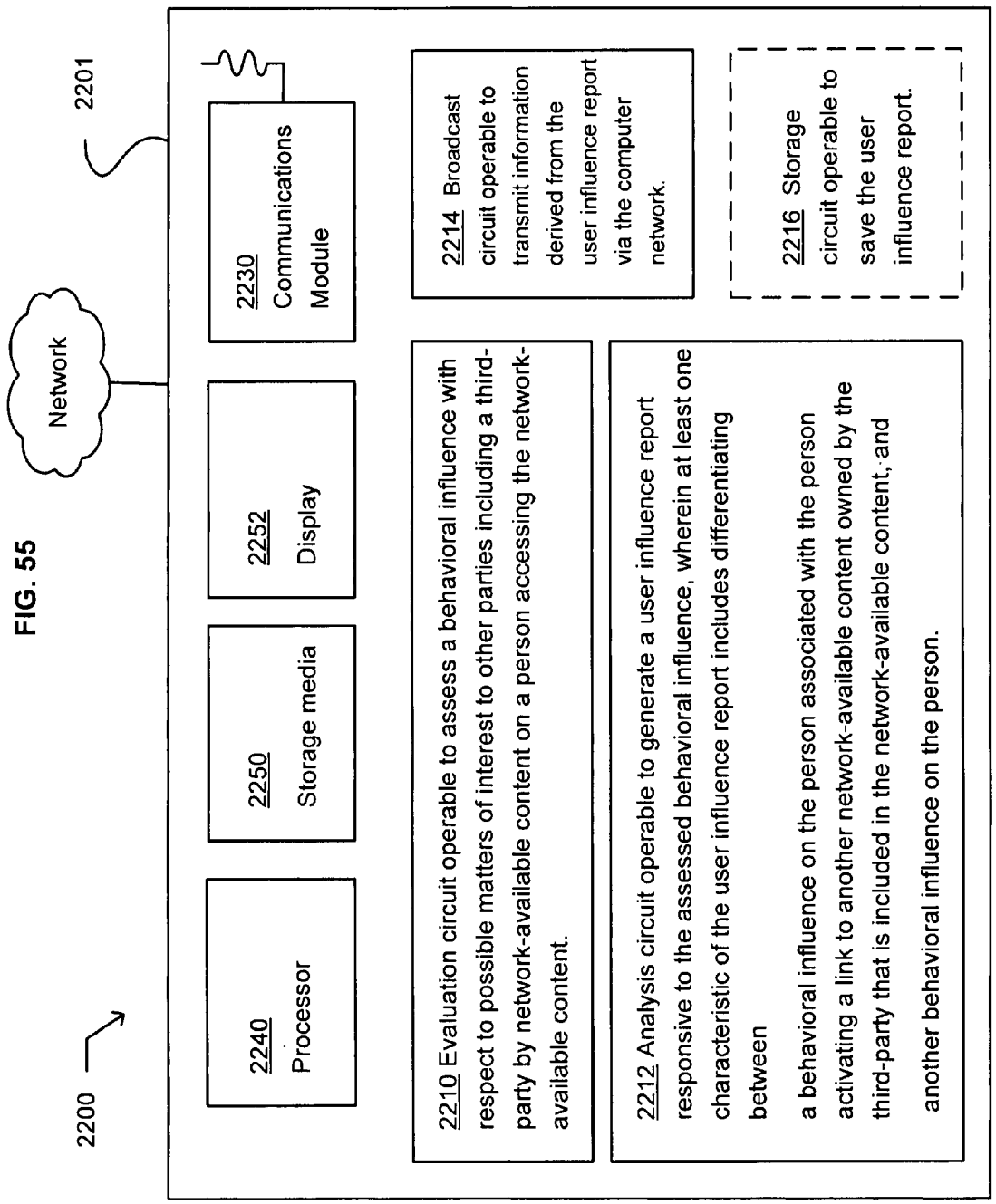
FIG. 55 illustrates a system.

FIG. 55 illustrates a system 2200. The system includes a computing device 2201 couplable with a computer network. The system includes an evaluation circuit 2210, an analysis circuit 2122, and a broadcast circuit 2214. The system may include a storage circuit 2216. These circuits may be structurally incorporated with the computing device. Alternatively, one or more of these circuits may be structurally distinct from the computing device. In such embodiment, the one or more of these circuits may be implemented, for example, in an external device (not shown).

The evaluation circuit 2210 is operable to assess a behavioral influence with respect to possible matters of interest to other parties, including a third-party, by network-available content on a person accessing the network-available content. The analysis circuit 2122 is operable to generate a user influence report responsive to the assessed behavioral influence. A characteristic of the user influence report includes differentiating between (i) a behavioral influence on the person associated with the person activating a link to another network-available content owned by the third-party that is included in the network-available content, and (ii) another behavioral influence on the person. The broadcast circuit 2214 is operable to transmit information derived from the user influence report via the computer network. The storage circuit 2216 is operable to save the user influence report. For example, the user influence report may be saved in a storage media 2250 of the computing device.

FIG. 56 illustrates an example computer program product 2300. The computer program product includes a computer-readable signal-bearing medium 2310 bearing program instructions 2325. The program instructions are operable to perform a process in a computing device. The process includes assess a behavioral influence with respect to possible matters of interest to other parties including a third-party by network-available content on a person accessing the network-available content. The process also includes generate a user influence report responsive to the assessed behavioral influence. A characteristic of the user influence report includes differentiating between (i) a behavioral influence on the person resulting from the person activating a link to another network-available content owned by the third-party that is included in the network-available content, and (ii) another behavioral influence on the person. The process further includes provide information derived from the user influence report. The process also includes save data indicative of the user influence report.

In an alternative embodiment, the computer-readable signal-bearing medium 2310 includes a computer storage medium 2312. In another embodiment, the computer-readable signal-bearing medium includes a communication medium 2314.

FIG. 57 illustrates an example apparatus 2320. The apparatus includes means 2330 for assessing a behavioral influence with respect to possible matters of interest to other parties including a third-party by network-available content on a person accessing the network-available content. The apparatus also includes means 2335 for generating a user influence report responsive to the assessed behavioral influence. A characteristic of the user influence report includes differentiating between (i) a behavioral influence on the person resulting from the person activating a link included in the network-available content to another network-available content owned by the third-party that is included in the network-available content, and (ii) another behavioral influence on the person. The apparatus further includes means 2340 for transmitting information derived from the user influence report via a network. In an alternative embodiment, the apparatus may include means 2345 for saving the user influence report.

Figure 58:
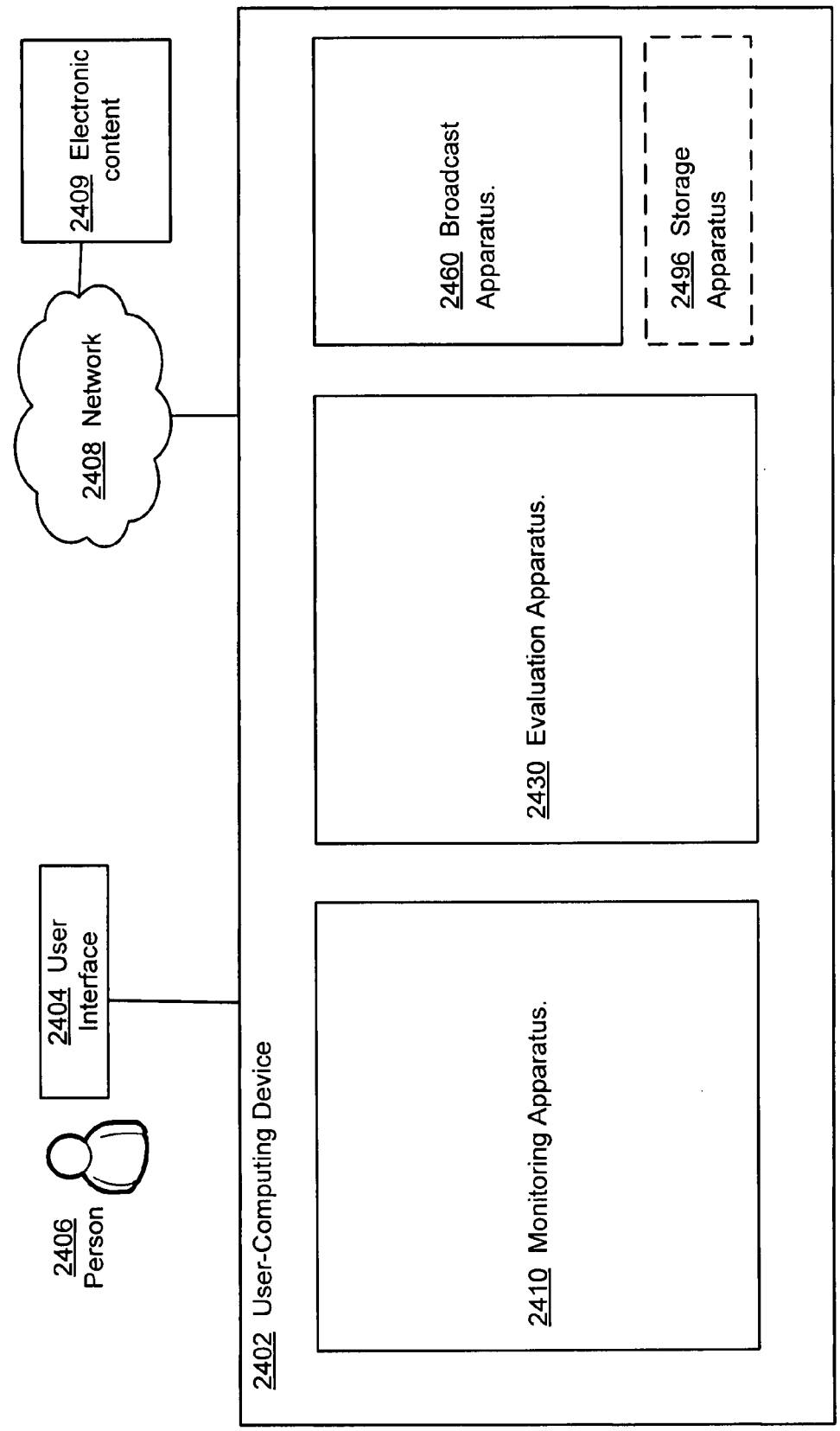
FIG. 58 illustrates an example system.

FIG. 58 illustrates an example system 2400. The system includes a computing device 2402. In an embodiment, the computing device includes a user-side computing device. In another embodiment, the computing device may include another computing device, such as a content server computing device, a search engine site, network-intermediary device, a page tag information processor, or other computing device. The computing device contains a monitoring apparatus 2410, an evaluation apparatus 2430, and a broadcast apparatus 2460. In some embodiments, the broadcast apparatus may be structurally distinct from the assessment apparatus and/or the report generator apparatus. A person 2406 via a user interface 2404 may use the user-computing device 2402 to access electronic content 2409 via a network 2408.

In an alternative embodiment, the user-computing device 2402 may include at least one additional apparatus. The at least one additional apparatus may include a storage apparatus 2496. The monitoring apparatus 2410 may include one or more sub-apparatus (not shown). The evaluation apparatus 2430 may include one or more sub-apparatus (not shown). The broadcast apparatus 2460 may include one or more sub-apparatus (not shown). In an embodiment, one of more of these apparatus may be implemented in hardware, software, and/or firmware.

Figure 59:
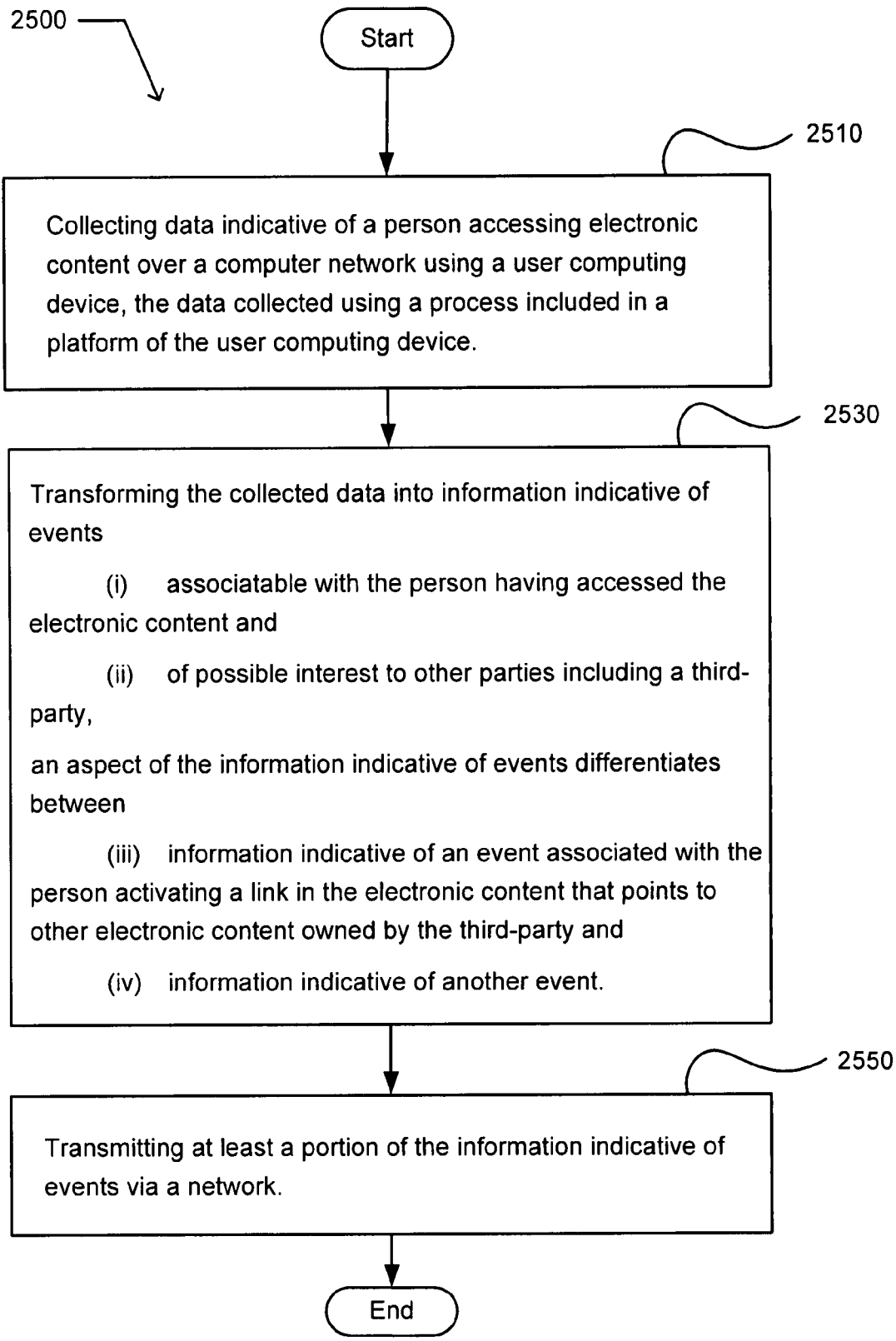
FIG. 59 illustrates an example operational flow for reporting a possible influential electronic content.

FIG. 59 and several following figures may include various examples of operational flows, discussions, and explanations with respect to the above-described system environment of FIG. 58, and/or with respect to other examples and contexts. However, it should be understood that the operational flows may be executed in a number of other environment and contexts, and/or in modified versions of FIG. 58. Also, although the various operational flows are illustrated in a sequence(s), it should be understood that the various operations may be performed in other orders than those which are illustrated, and/or may be performed concurrently.

FIG. 59 illustrates an example operational flow 2500 for reporting a possible influential electronic content. After a start operation, the operational flow moves to a monitoring operation 2510. The monitoring operation collects data indicative of a person accessing electronic content over a computer network using a user computing device. The data is collected using a process included in a platform of the user computing device. A deriving operation 2530 transforming the collected data into information indicative of events (i) associatable with the person having accessed the electronic content and (ii) of possible interest to other parties including a third-party. An aspect of the information indicative of events differentiates between (iii) information indicative of an event associated with the person activating a link in the electronic content that points to other electronic content owned by the third-party and (iv) information indicative of another event. A broadcast operation 2550 transmits at least a portion of the information indicative of events via a network. The operational flow then moves to an end operation.

In an embodiment, the operational flow 2500 may be implemented in the system environment illustrated in conjunction with FIG. 58. The monitoring operation 2510 may be performed by the monitoring apparatus 2410 of the computing device 2702 of FIG. 58. The deriving operation 2530 may be performed by the evaluation apparatus 2430. The broadcast operation 2550 may be performed by the broadcast apparatus 2460.

FIG. 60 illustrates an alternative embodiment of the operational flow 2500 of FIG. 59. The monitoring operation 2510 may include at least one additional operation. The at least one additional operation may include an operation 2512, an operation 2514, an operation 2516, and/or an operation 2518. The operation 2512 collects data indicative of a person accessing electronic content over a computer network using a user computing device. The data is collected using a process incorporated into a platform of the user computing device. The operation 2514 collects data indicative of a person accessing electronic content over a computer network using a user computing device. The data is collected using at least one of a kernel mode, user mode, application, and/or program process included in a platform of the user computing device. The operation 2516 collects data indicative of a person accessing electronic content over a computer network using a user computing device. The data is collected using a process that is at least one of bundled with, integrated into, registered with and/or added on to a platform of the user computing device. The operation 2518 collects data indicative of a person accessing electronic content over a computer network using a user computing device, the data collected using a process included in a platform of the user computing device. The platform including at least one of a Windows based platform of the Windows family, a Unix based platform of the Unix family, or a Mac OS based platform of the Mac OS family. The platform may include a Windows based platform of the Windows family, a Unix based platform of the Unix family, or a Mac OS based platform of the Mac OS family. For example, a Windows family may include one or more of a Windows OS for a desktop, such as Vista, a Windows OS for a mobile device, such as Mobile 5, and/or a Microsoft Windows OS for a gaming device, such as Xbox 360 OS. In an another example, a Mac OS family may include one or more of Mac OS for a desktop or a MacBook, such as Mac OS X, an OS for a mobile music device, such as Mac OS X version for an iPod, and/or a Mac OS for mobile device, such as Mac OS X version for iPhone. A platform may span at least two machines. In an embodiment, the platform of the user computing device may include a common OS across at least two user computing devices. The at least two user computing devices may or may not be able to talk with each other. For example, the data may be collected across at least two devices having a Mac OS based platform, such as MacBook, iMac desktop, an iPhone, and/or an iPod.

Figure 61:
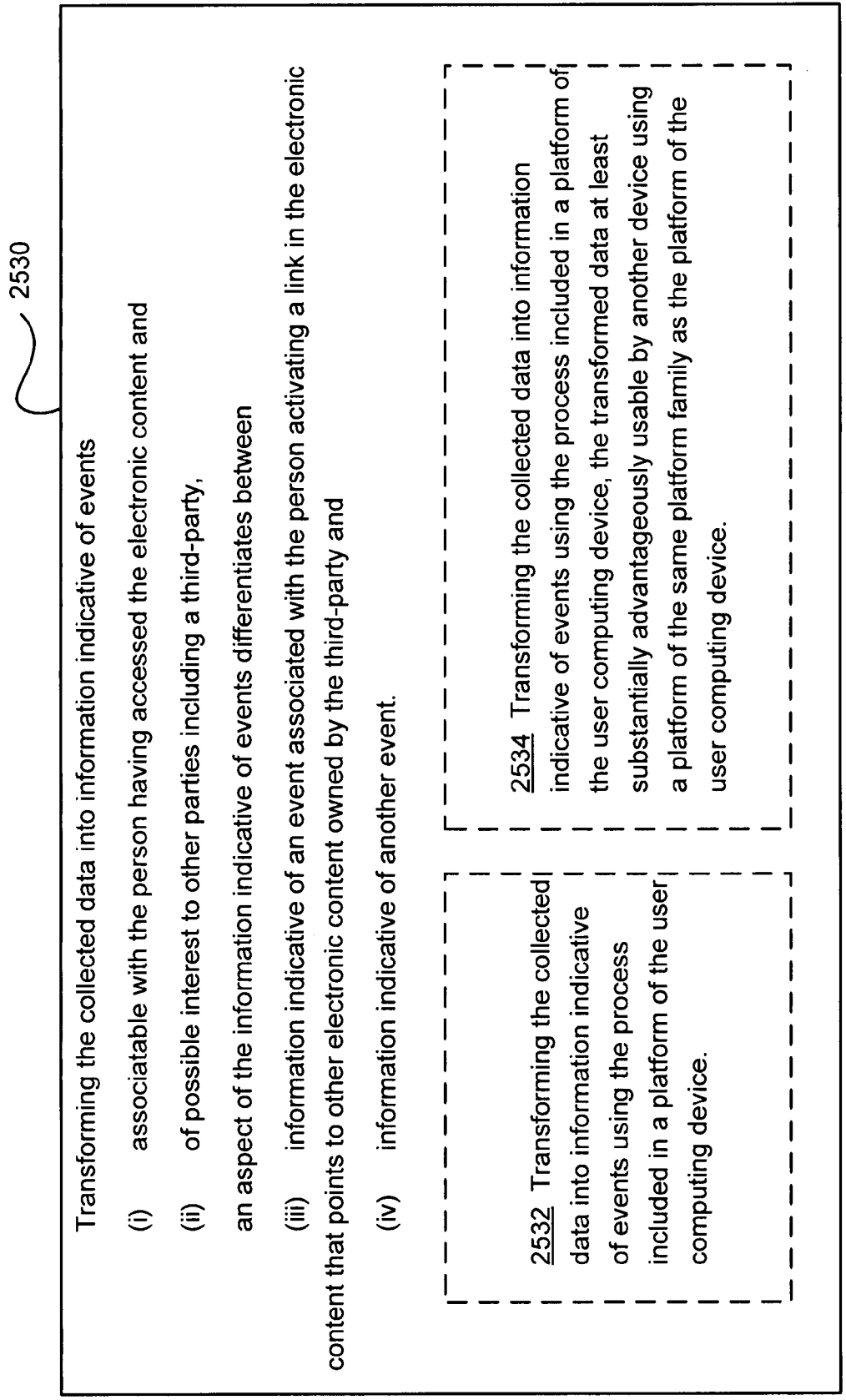
FIG. 61 illustrates another embodiment of the operational flow of FIG. 59.

FIG. 61 illustrates another embodiment of the operational flow 2500 of FIG. 59. The deriving operation 2530 may include at least one additional operation. The at least one additional operation may include an operation 2532 and/or an operation 2534. At the operation 2532, the transforming the collected data into information indicative of events further includes transforming the collected data into information indicative of events using the process included in a platform of the user computing device. At the operation 2534, the transforming the collected data into information indicative of events further includes transforming the collected data into information indicative of events using the process included in a platform of the user computing device. The transformed data being at least substantially advantageously usable by another device using a platform of the same platform family as the platform of the user computing device.

Figure 62:
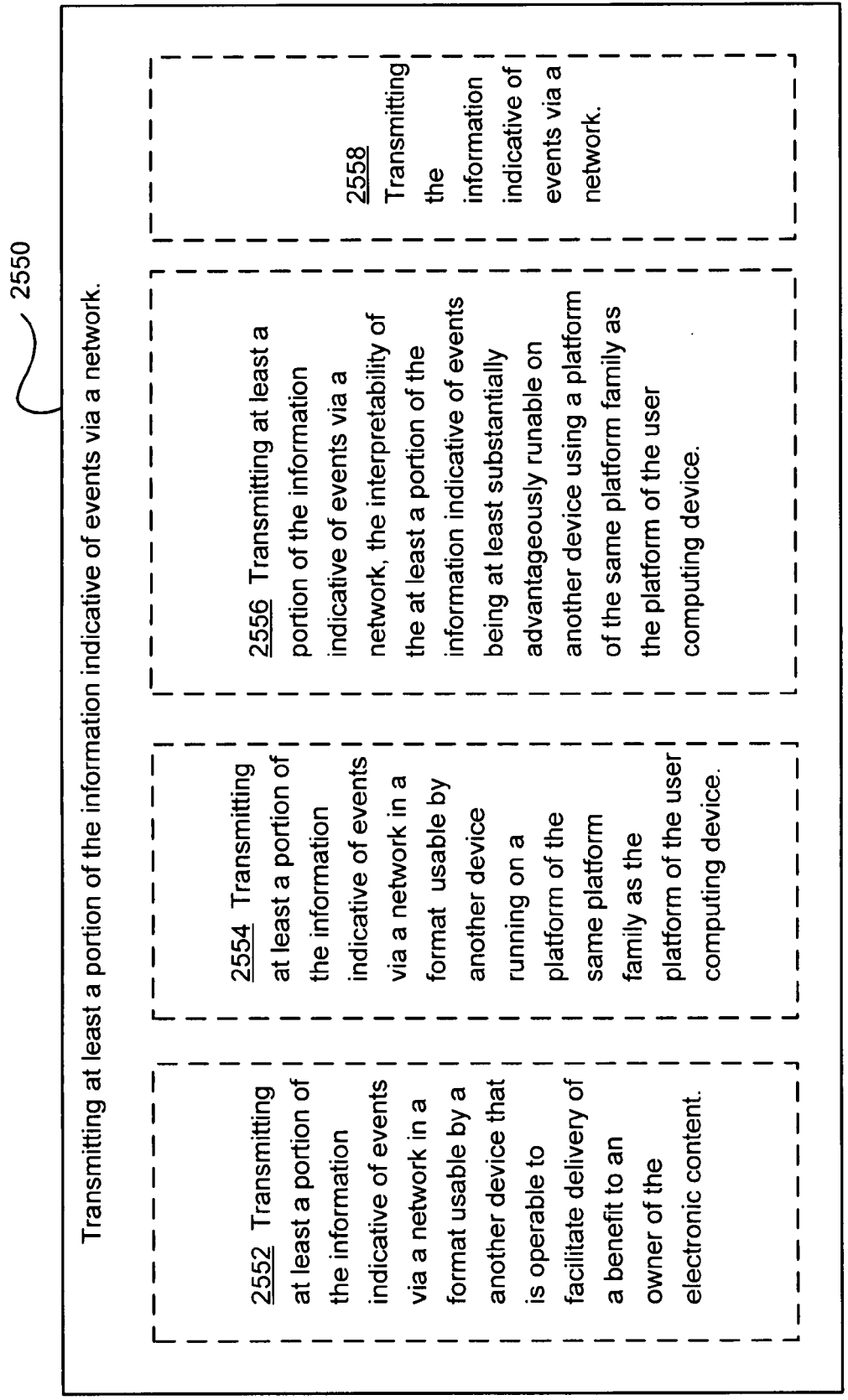
FIG. 62 illustrates a further embodiment of the operational flow of FIG. 55.

FIG. 62 illustrates a further embodiment of the operational flow 2500 of FIG. 55. The broadcast operation 2550 may include at least one additional operation. The at least one additional operation may include an operation 2552, an operation 2554, an operation 2556, and/or an operation 2558. The operation 2552 transmits at least a portion of the information indicative of events via a network in a format usable by another device that is operable to facilitate delivery of a benefit to an owner of the electronic content. The operation 2554 transmitting at least a portion of the information indicative of events via a network in a format usable by another device running on a platform of the same platform family as the platform of the user computing device. The operation 2556 transmits at least a portion of the information indicative of events via a network. The interpretability of the at least a portion of the information indicative of events being at least substantially advantageously runable on another device using a platform of the same platform family as the platform of the user computing device. The operation 2558 transmits the information indicative of events via a network.

FIG. 63 illustrates an operational flow 2600 for reporting influence on a person. After a start operation, the operational flow moves to a monitoring operation 2610. The monitoring operation collects data indicative of the person accessing electronic content over a computer network using the user computing device. A deriving operation 2630 generates a user influence report by transforming the collected data into information indicative of events associatable with the person accessing the electronic content over a computer network using the user computing device. A broadcasting operation 2650 transmits data indicative of the user influence report via a network. The user influence report is receivable by a site coupled to the network and operable to facilitate delivery of a benefit to an owner of the electronic content. The operational flow then moves to an end operation.

FIG. 64 illustrates an alternative embodiment of the operational flow 2600 of FIG. 63. The monitoring operation 2610 may include at least one additional operation. The at least one additional operation may include an operation 2612, an operation 2614, an operation 2616, and/or an operation 2617. The operation 2612 collects at least one of raw data, aggregated data, and/or anonymized data indicative of the person accessing electronic content over a computer network using the user computing device. The operation 2614 collects data associated with, incidental to, and/or responsive to the person accessing electronic content over a computer network using the user computing device. The operation 2616 collects data indicative of at least one of user inputs, keystrokes, navigation commands, document navigation, screen navigation commands, mouse movements, cut and/or paste, scrolling, cut and paste, print history, caching, sessions, menu activity, visibility tag state, event timeline, logging application usage, documents opened, and/or user initiated computing device interaction. For example, the collect data indicative of keystrokes may include logging all keystrokes along with an indication of the window in which they are typed. By way of further example, the log application usage may include logging events performed, and may additionally include organizing a listing of the logged events. Additionally, log application usage may include monitoring and logging all applications run. Further, collect data indicative of documents opened may include logging documents and/or files opened and/or viewed. The operation 2617 (not shown) collects data indicative of at least one of a user physiological state, tracked user gaze, user dwell time, user pupil dilation, user respiration, and/or user pulse rate.

FIG. 65 illustrates another embodiment of the operational flow 2600 of FIG. 63. The monitoring operation 2610 may include at least one additional operation. The at least one additional operation may include an operation 2618, an operation 2619, an operation 2622, and/or an operation 2624. The operation 2618 collects data indicative of at least one of user activity, Website activity email activity, setting a bookmark, purchases, operations, Websites visited, blogs visited, page views, page visits, viewing time, repeat visits, page tags, printing, click stream, search strings, local search strings, interactions, browsing history, email sent and/or received, and/or cookies received. For example, the collect data indicative of Website activity may include logging websites visited by at least one browser. The operation 2619 (not shown) collects data indicative of at least one of Window navigation, tab navigation; window state, tap state, preference changes, and/or state changes. The operation 2622 collects data indicative of the person at least one of browsing, page viewing, downloading, listening, reading, sending email, receiving email, encountering the electronic content, forwarding the electronic content, and/or navigating the electronic content. The operation 2624 collects data indicative of the person accessing the electronic content over a computer network using the user computing device, wherein the electronic content includes a first electronic content having a first-content portion and a second electronic content having a second-content portion. In a further embodiment, the electronic content includes a first electronic content having a first-content portion potentially relevant to a third-party and a second electronic content having a second-content portion potentially relevant to the third-party.

FIG. 66 illustrates a further embodiment of the operational flow 2600 of FIG. 63. The deriving operation 2630 may include at least one additional embodiment. The at least one additional embodiment may include an operation 2632, an operation 2634, and/or an operation 2636. The operation 2632 generates a user influence report by transforming the collected data into information by at least one of mining, filtering, recursive model, interpreting, refining, combining, evaluating one instance of the collected data in view of another instance of the collected data, converting key strokes into URL's, and/or converting URL's into websites. The operation 2634 generates a user influence report by transforming the collected data into information indicative of at least one of action, behavior, affiliation, and/or outcome associatable with the person accessing the electronic content over a computer network using the user computing device. The operation 2636 generates a user influence report by transforming the collected data into information indicative of at least one of action, behavior, affiliation, relevancy to a third-party, and/or outcome associatable with the person accessing the electronic content over a computer network using the user computing device.

FIG. 67 illustrates an alternative embodiment of the operational flow 2600 of FIG. 63. The deriving operation 2630 may include at least one additional embodiment. The at least one additional embodiment may include an operation 2638, an operation, 2640, and/or an operation 2642. The operation 2638 generates a user influence report by transforming the collected data into information indicative of at least one of an involvement between the person and a subject of interest to a third-party associatable with the person accessing the electronic content over a computer network using the user computing device. For example, an involvement may include at least one of a purchase, a donation, a membership, and/or an inquiry. The operation 2640 generates a user influence report by transforming the collected data into information indicative of events (i) associatable with the person accessing the electronic content over a computer network using the user computing device and (ii) of possible interest to other parties including a third-party. The operation 2642 generates a user influence report by transforming the collected data into information indicative of events associatable with the person accessing the electronic content over a computer network using the user computing device and having at least significantly reduced presence of information useable in positively identifying the person.

FIG. 68 illustrates another alternative embodiment of the operational flow 2600 of FIG. 59. The broadcast operation 2650 may include at least one additional embodiment, such as an operation 2652. The operation 2652 transmits data indicative of the user influence report via a network, the user influence report being receivable by a site operable to determine a correlation between (i) events associatable with the person using a user computing device to access electronic content; and (ii) an involvement between the person and a subject of interest to a third-party.

FIG. 69 illustrates an example system 2700 in which embodiments may be implemented. The system includes a computing device 2705 couplable with a computer network. The system also includes a monitor circuit 2710, an evaluation circuit 2715, and a broadcast circuit 2720. An alternative embodiment may include a storage circuit 2725. These circuits may be structurally incorporated with the computing device. Alternatively, one or more of these circuits may be structurally distinct from the computing device. In such embodiment, the one or more of these circuits may be implemented, for example, in an external device (not shown).

The monitor circuit 2710 is operable to collect data indicative of a person accessing electronic content over a computer network using a user computing device. The data is collected using a process included in a platform of the user computing device. The evaluation circuit 2715 is operable to transform the collected data into information indicative of events (i) associatable with the person having accessed the electronic content and (ii) of possible interest to other parties including a third-party. An aspect of the information indicative of events differentiates between (iii) information indicative of an event associated with the person activating a link in the electronic content that points to other electronic content owned by the third-party and (iv) information indicative of another event. The broadcast circuit 2720 is operable to communicate data indicative of the information indicative of events to a recipient via the computer network. The storage circuit 2725 is operable to save the information indicative of events.

In an alternative embodiment, the broadcast circuit 2720 includes a broadcast circuit 2722 operable to communicate data indicative of the information indicative of events to a recipient via the computer network. The data indicative of the information indicative of events is receivable by a site operable to facilitate delivery of a benefit to an owner of at least one instance of the electronic content.

FIG. 70 illustrates an example computer program product 2800. The computer program product includes a computer-readable signal-bearing medium 2810 bearing program instructions 2820. The program instructions are operable to perform a process in a computing device. The process includes collect data using the computing device indicative of a person accessing electronic content over a computer network using the computing device. The process also includes generate a user influence report using the computing device by transforming the collected data into information indicative of events associatable with the person accessing the electronic content over the computer network using the computing device. The process further includes transmit data indicative of the user influence report to a recipient via the computer network. The process includes save data indicative of the user influence report.

In an alternative embodiment, the program instructions 2820 further include program instructions 2822 incorporated into a platform of the computing device and operable to perform a process in the computing device. In another embodiment, the program instructions further include program instructions 2824 received from a search engine provider and operable to perform a process in the computing device. In a further embodiment, the computer-readable signal-bearing medium includes a computer storage medium 2832. In another embodiment, the computer-readable signal-bearing medium includes a communication medium 2834.

Figure 71:
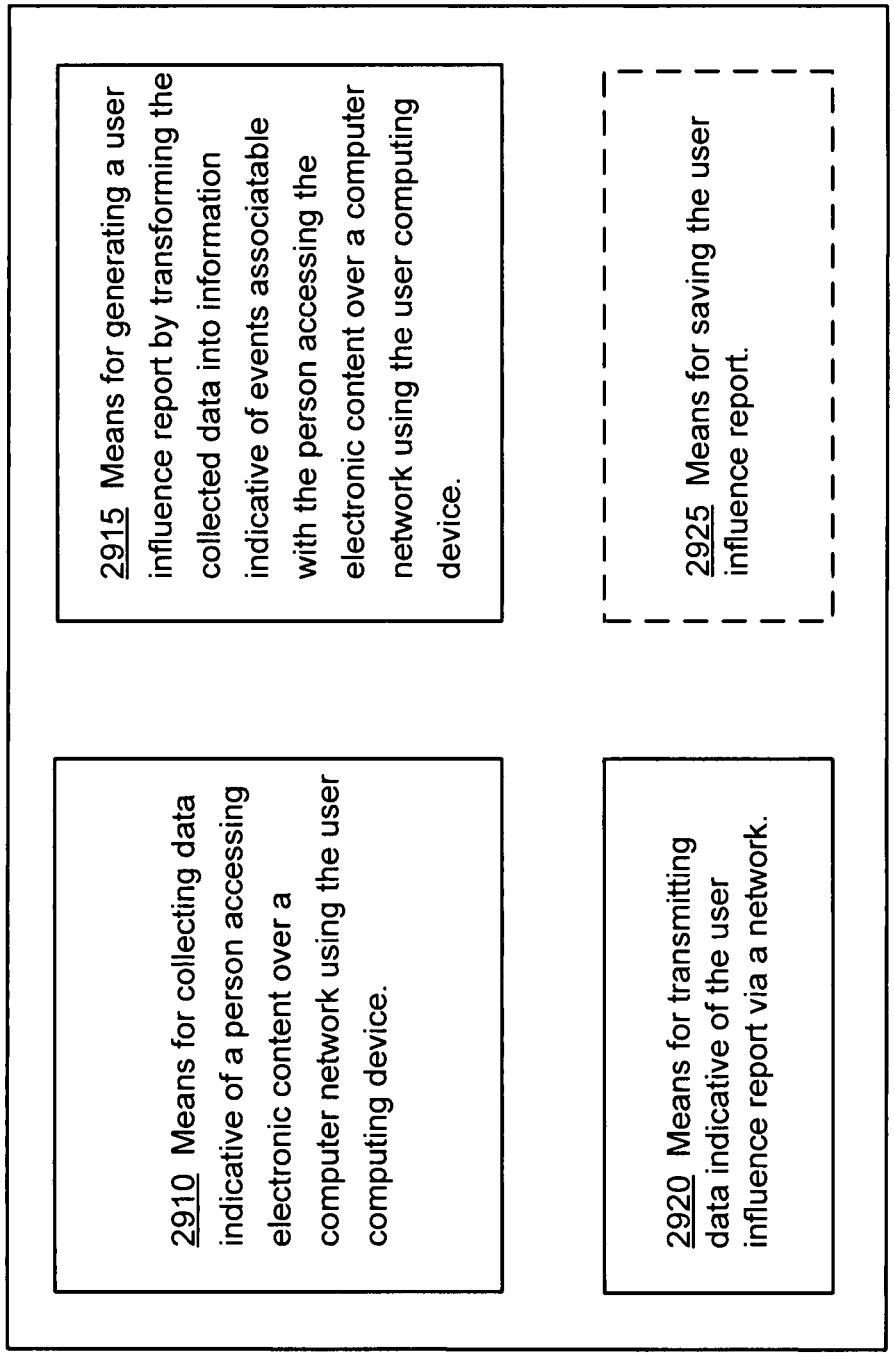
FIG. 71 illustrates an influence reporting apparatus.

FIG. 71 illustrates an influence reporting apparatus 2900. The apparatus includes means 2910 for collecting data indicative of a person accessing electronic content over a computer network using the user computing device. The apparatus also includes means 2915 for generating a user influence report by transforming the collected data into information indicative of events associatable with the person accessing the electronic content over a computer network using the user computing device. The apparatus also includes means 2920 for transmitting data indicative of the user influence report via a network. In an alternative embodiment, the apparatus includes means 2920 for saving the user influence report.

Figure 72:
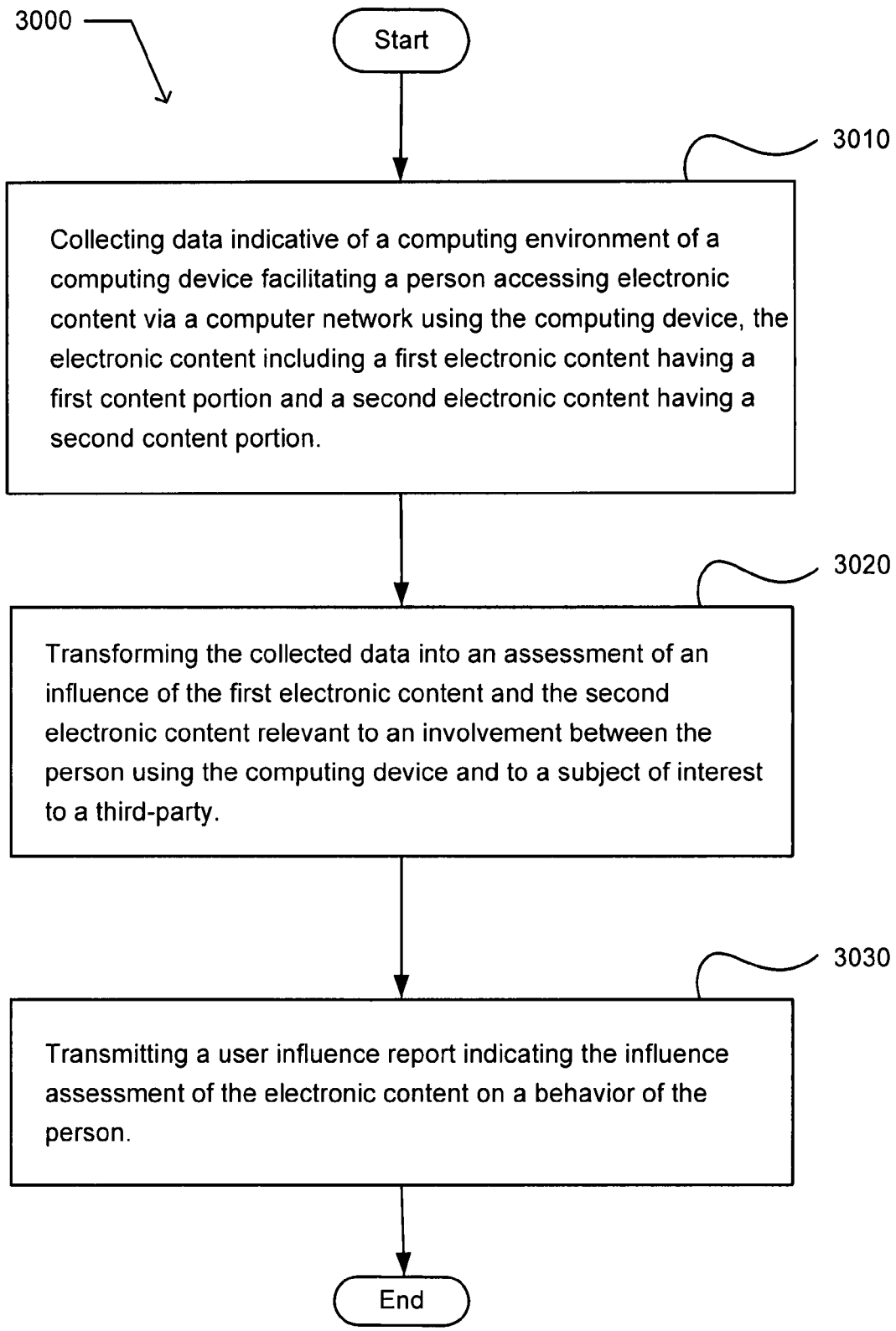
FIG. 72 illustrates an example operational flow for assessing an influence of an electronic content on a person.

FIG. 72 illustrates an example operational flow 3000 for assessing an influence of an electronic content on a person. After a start operation, the operational flow moves to a monitoring operation 3010. The monitoring operation collects data indicative of a computing environment of a computing device facilitating a person accessing electronic content via a computer network using the computing device. The electronic content including a first electronic content having a first content portion and a second electronic content having a second content portion.

In an embodiment, the computing environment includes a particular configuration of hardware and/or software of the computing device. For example, the computing environment may include a state of the hardware and/or software of the computing device, or a series of states of the hardware and/or software. A state of a software of the computing device may include a URL of a Website electronic content displayed by a browser of the computing device, key words in the Website content, navigation commands implemented with respect to the Website, a Website owner, elapsed time in the state, and/or identification of a prior and/or subsequent Website content displayed. In another embodiment, the computing environment refers to a hardware platform and an operating system running in the computing device. In a further embodiment, a computing environment is used to express a type of configuration, such as a networking environment, database environment, transaction processing environment, batch environment, interactive environment, and so on.

The operational flow 3000 includes an evaluation operation 3020 transforming the collected data into an assessment of an influence of the first electronic content and the second electronic content relevant to an involvement between the person using the computing device and to a subject of interest to a third-party. The operational flow also includes a broadcast operation 3030 transmitting a user influence report indicating the influence assessment of the electronic content on a behavior of the person. The operational flow then moves to an end operation.

Figure 73:
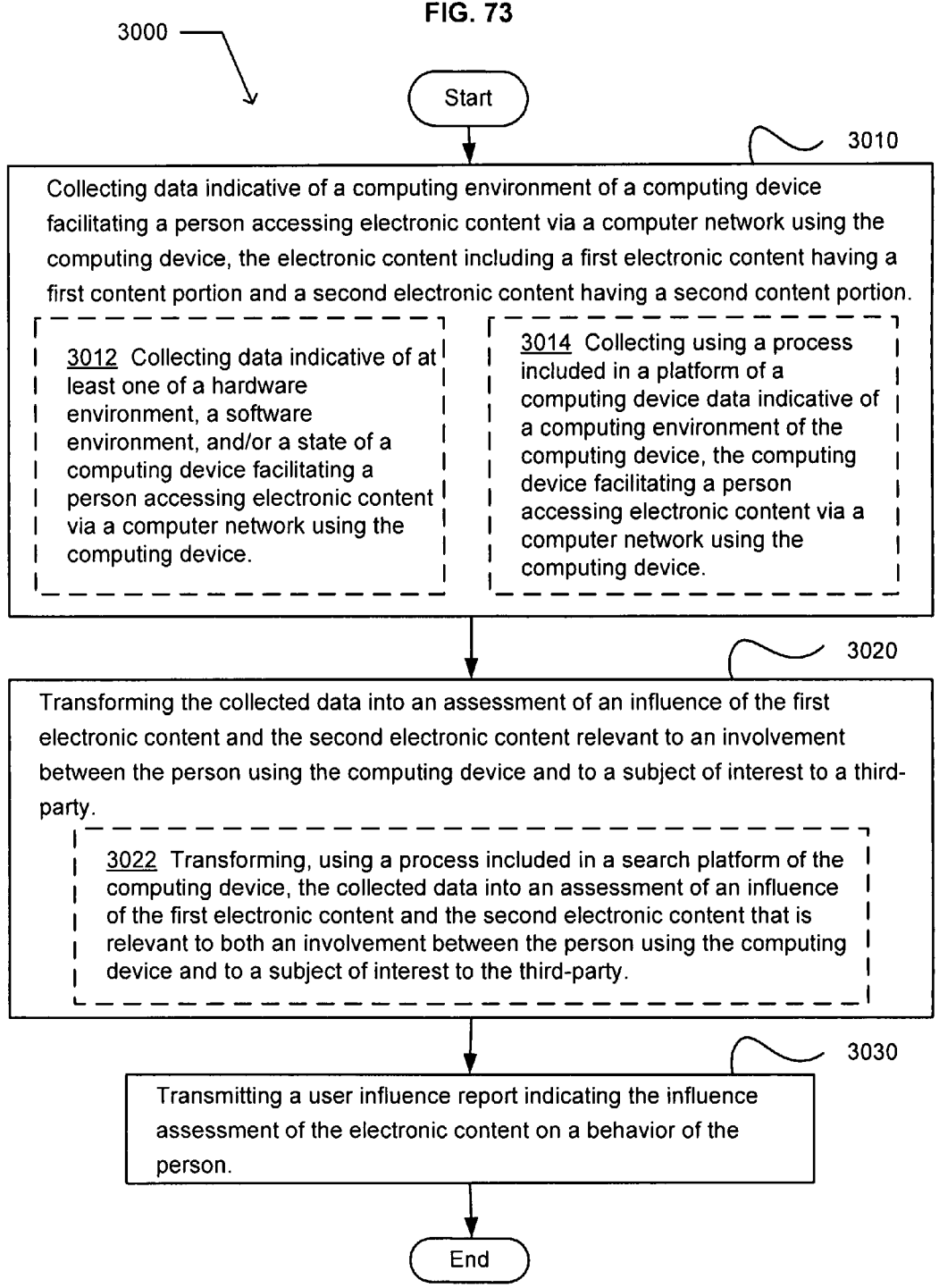
FIG. 73 illustrates an alternative embodiment of the operational flow of FIG. 68.

FIG. 73 illustrates an alternative embodiment of the operational flow 3000 of FIG. 68. The monitoring operation 3010 may include at least one additional operation. The at least one additional operation may include an operation 3012, and/or an operation 3014. The operation 3012 collects data indicative of at least one of a hardware environment, a software environment, and/or a state of a computing device facilitating a person accessing electronic content via a computer network using the computing device. The operation 3014 collects using a process included in a platform of a computing device data indicative of a computing environment of the computing device, the computing device facilitating a person accessing electronic content via a computer network using the computing device. The evaluation operation 3020 may include at least one additional operation, such as an operation 3022. The operation 3022 assesses using a process included in a search platform of the computing device an influence of the first electronic content and the second electronic content on an involvement between the person using the computing device and a subject of interest to the third-party.

Figure 74:
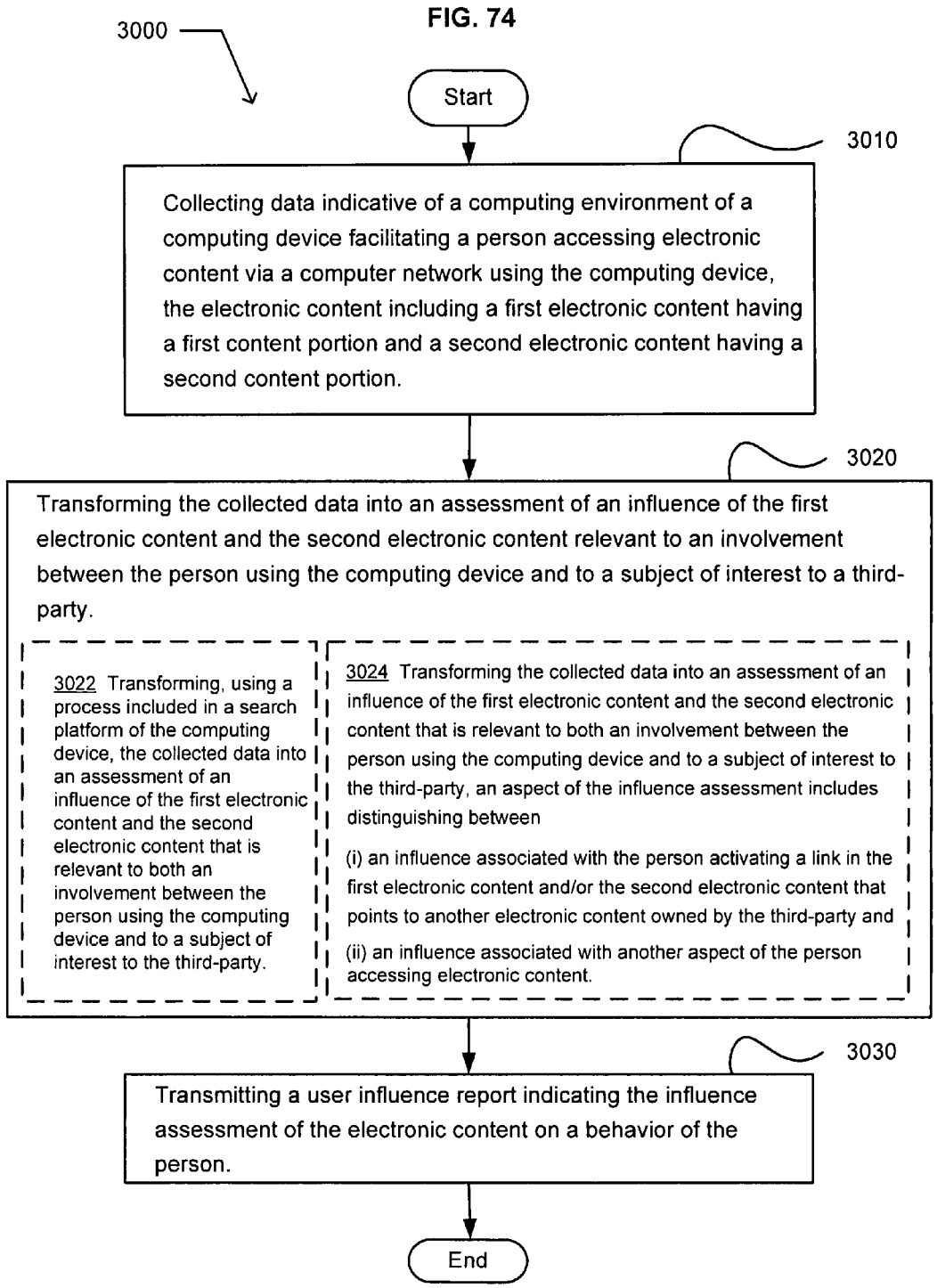
FIG. 74 illustrates another alternative embodiment of the operational flow of FIG. 68.

FIG. 74 illustrates another alternative embodiment of the operational flow 3000 of FIG. 68. The evaluation operation 3020 may include at least one additional operation. The at least one additional operation may include an operation 3022, and/or an operation 3024. The operation 3022 transforms, using a process included in a search platform of the computing device, the collected data into an assessment of an influence of the first electronic content and the second electronic content that is relevant to both an involvement between the person using the computing device and to a subject of interest to the third-party. The operation 3024 transforms the collected data into an assessment of an influence of the first electronic content and the second electronic content that is relevant to both an involvement between the person using the computing device and to a subject of interest to the third-party. An aspect of the influence assessment includes distinguishing between (i) an influence associated with the person activating a link in the first electronic content and/or the second electronic content that points to another electronic content owned by the third-party and (ii) an influence associated with another aspect of the person accessing electronic content.

Figure 75:
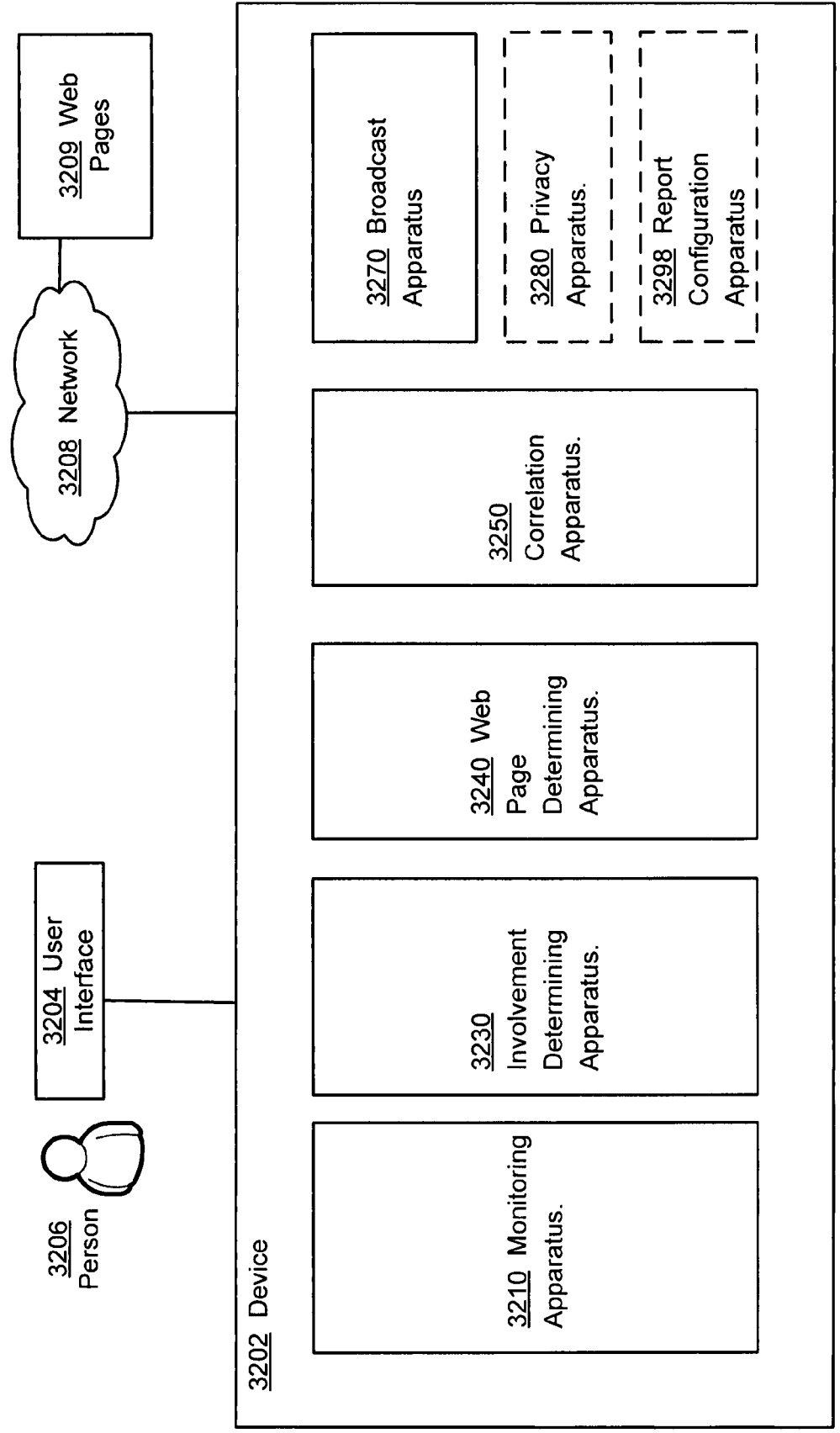
FIG. 75 illustrates an example system.

FIG. 75 illustrates an example system 3200. The system includes a computing device 3202. In an embodiment, the computing device includes a user side computing device. In another embodiment, the computing device may include another computing device, such as a content server computing device, a search engine site, network-intermediary device, a page tag information processor, or other computing device. The computing device contains a monitoring apparatus 3210, an involvement determining apparatus 3230, a Web page determining apparatus 3240, a correlation apparatus 3250, and a broadcast apparatus 3270. In some embodiments, the broadcast apparatus may be structurally distinct from the monitoring apparatus and/or the correlation apparatus. A person 3206 via a user interface 3204 may use the computing device 3202 to access Web pages 3209 via a network 3208.

In an alternative embodiment, the computing device 3202 may include at least one additional apparatus. The at least one additional apparatus may include a privacy apparatus 3280, and/or a report configuration apparatus 3298. The monitoring apparatus 3210 may include one or more sub-apparatus (not shown). The involvement determining apparatus 3230 may include one or more sub-apparatus (not shown). The Web page determining apparatus 3240 may include one or more sub-apparatus (not shown). The correlation apparatus 3250 may include one or more sub-apparatus (not shown). The broadcast apparatus 3270 may include one or more sub-apparatus (not shown). In an embodiment, one of more of these apparatus may be implemented in hardware, software, and/or firmware.

FIG. 76 illustrates an example operational flow 3300 for influence reporting. After a start operation, the operation moves to an accumulation operation 3310. The accumulation operation collects data indicative of a computing device environment of a user-side computing device facilitating a person accessing Web pages and facilitating the person communicating with a third-party via a computer network. In an embodiment, a Web page includes a document connected to the World Wide Web and viewable by person connected to the Internet who has a web browser. A first processing operation 3330 transforms the collected data to indicate an involvement between the third-party and the person. A second processing operation 3340 transforms the collected data to indicate the Web pages accessed by the person. An evaluation operation 3350 correlates the indicated involvement between the third-party and the person with the indicated Web pages accessed by the person. A broadcast operation 3370 outputs from the user-side computing device data indicative of the correlation. In an alternative embodiment, the broadcast operation may push from the user-side computing device data indicative of the correlation. In another embodiment, the broadcast operation may respond to a pull by outputting from the user-side computing device data indicative of the correlation. In a further embodiment, the broadcast operation reports the correlation to a networked recipient.

FIG. 76 and several following figures may include various examples of operational flows, discussions, and explanations with respect to the above-described system environment of FIG. 75, and/or with respect to other examples and contexts. However, it should be understood that the operational flows may be executed in a number of other environment and contexts, and/or in modified versions of FIG. 75. Also, although the various operational flows are illustrated in a sequence(s), it should be understood that the various operations may be performed in other orders than those which are illustrated, and/or may be performed concurrently.

In an embodiment, the accumulation operation 2010 may be performed by the monitoring apparatus 3210 of the computing device 3202 of FIG. 44. The first processing operation 3330 may be performed by the involvement determining apparatus 3230. The second processing operation 3340 may be performed by the Web page determination apparatus 3240. The broadcast operation 3370 may be performed by the broadcast apparatus 3270.

FIG. 77 illustrates an alternative embodiment of the operational flow 3300 of FIG. 76. The accumulation operation 3310 may include at least one additional operation. The at least one additional operation may include an operation 3312, an operation 3314, an operation 3316, and/or an operation 3318. The operation 3312 collects data indicative of at least one of a hardware environment, a software environment, and/or a state of a computing device environment of a user-side computing device facilitating a person accessing Web pages and facilitating the person communicating with a third-party via a computer network. The operation 3314 collects data indicative of a computing device environment of a user-side computing device facilitating a person accessing Web pages and facilitating the person communicating with a third-party via a computer network. The data is collected using a process included in a platform of the user-side computing device. The operation 3316 collects data indicative of a computing device environment of a user-side computing device facilitating a person accessing Web pages and facilitating the person communicating with a third-party via a computer network. The data is collected using a process running on a platform of the user-side computing device and associated with a search engine site. For example, a search engine site, such as Google, Yahoo, or Live Search, may provide an application runnable on a platform of the user-side computing device that performs the operational flow 3300 and transmits the data indicative of the correlation to the search engine site at the operation 3370, or to another designated site. The operation 3318 collects data indicative of a computing device environment of a user-side computing device facilitating a person accessing Web pages and facilitating the person communicating with a third-party via a computer network. The Web pages include a first electronic content and a second electronic content.

Figure 78:
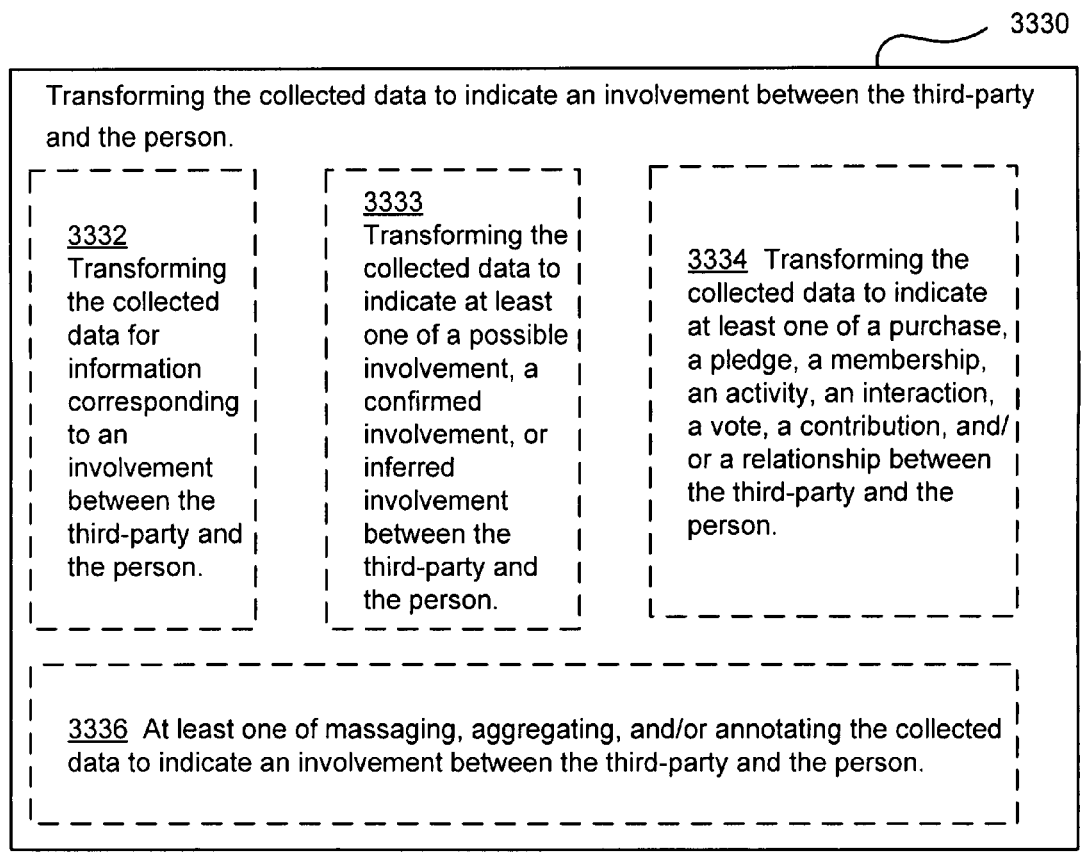
FIG. 78 illustrates another alternative embodiment of the operational flow of FIG. 76.

FIG. 78 illustrates another alternative embodiment of the operational flow 3300 of FIG. 76. The first processing operation 3330 may include at least one additional operation. The at least one additional operation may include an operation 3332, an operation 3333, an operation 3333, and/or an operation 3336. The operation 3332 transforms the collected data for information corresponding to an involvement between the third-party and the person. The operation 3333 transforms the collected data to indicate at least one of a possible involvement, a confirmed involvement, or inferred involvement between the third-party and the person. The operation 3334 transforming the collected data to indicate at least one of a purchase, a pledge, a membership, an activity, an interaction, a vote, a contribution, and/or a relationship between the third-party and the person. The operation 3336 at least one of massages, aggregates, and/or annotates the collected data to indicate an involvement between the third-party and the person.

Figure 79:
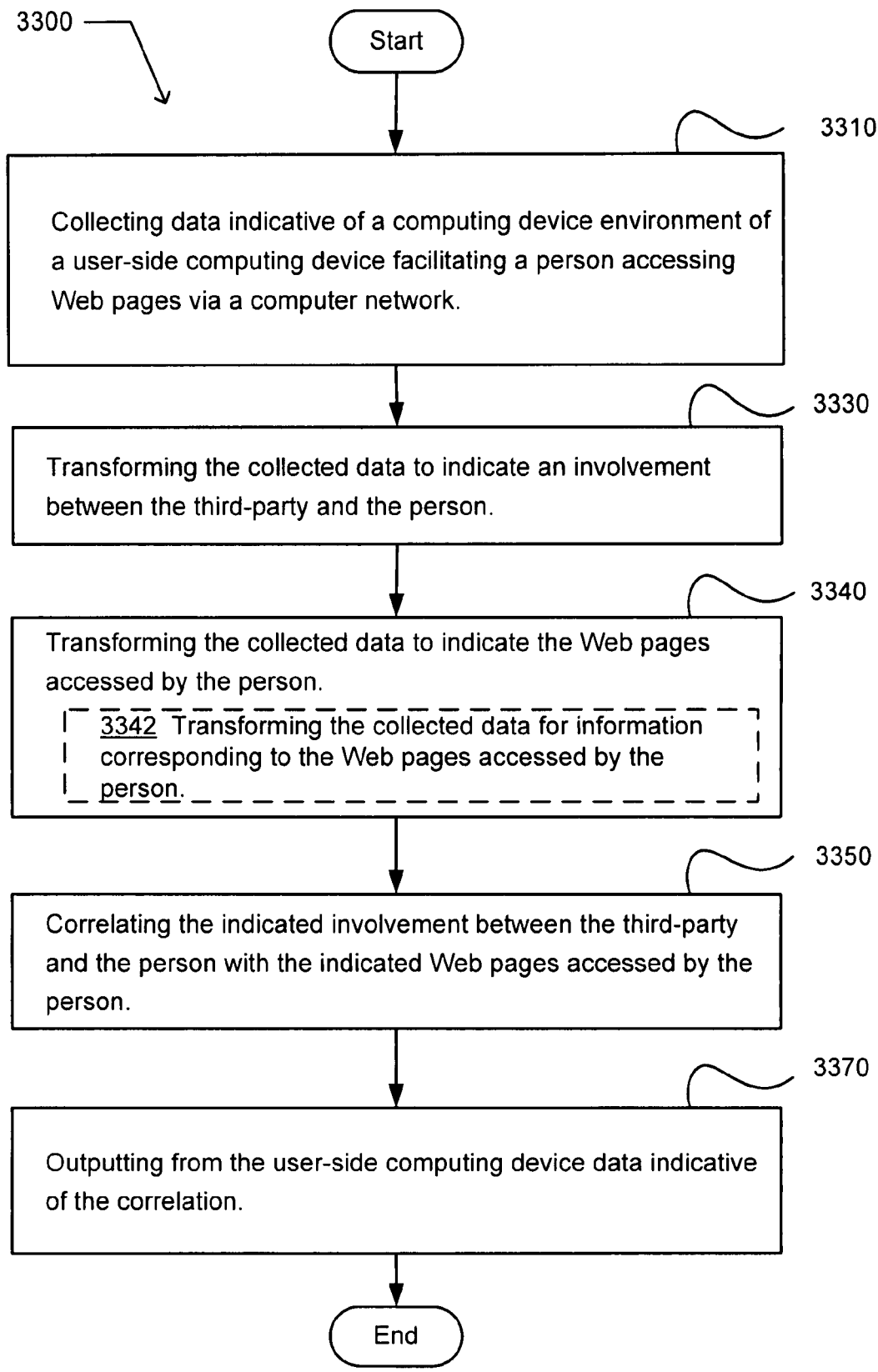
FIG. 79 illustrates a further alternative embodiment of the operational flow of FIG. 76.

FIG. 79 illustrates a further alternative embodiment of the operational flow 3300 of FIG. 76. The second processing operation 3340 may include at least one additional operation, such as the operation 3342. The operation 3342 transforms the collected data for information corresponding to the Web pages accessed by the person.

Figure 80:
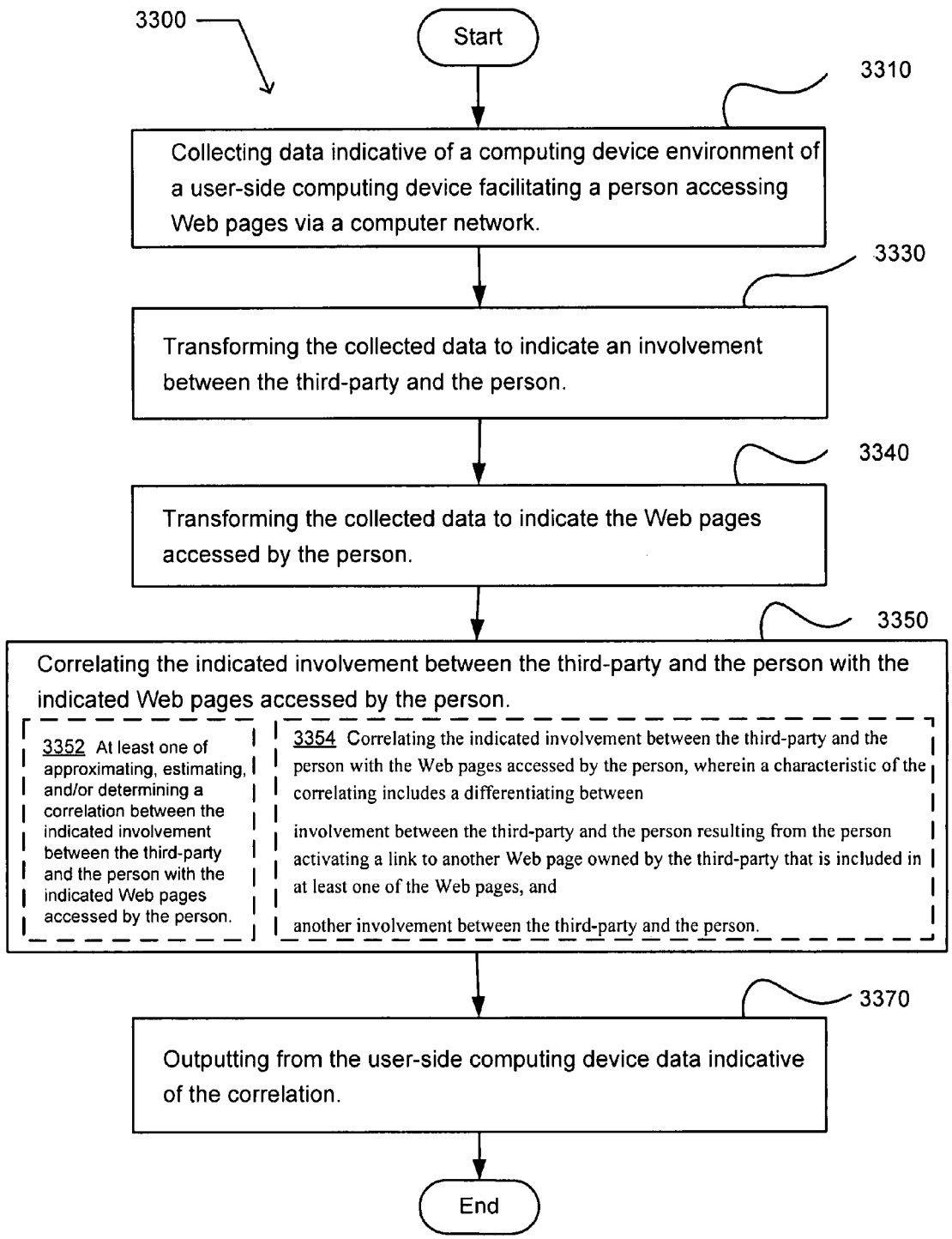
FIG. 80 illustrates an alternative embodiment of the operational flow of FIG. 76.

FIG. 80 illustrates an alternative embodiment of the operational flow 3300 of FIG. 76. The evaluation operation 3350 may include at least one additional operation. The at least one additional operation may include an operation 3352, and/or an operation 3354. The operation 3352 at least one of approximates, estimates, and/or determines a correlation of the indicated involvement between the third-party and the person with the indicated Web pages accessed by the person. The operation 3354 correlating the indicated involvement between the third-party and the person with the Web pages accessed by the person. A characteristic of the correlating includes a differentiating between (i) an involvement between the third-party and the person resulting from the person activating a link to another Web page owned by the third-party that is included in at least one of the Web pages, and (ii) another involvement between the third-party and the person.

Figure 81:
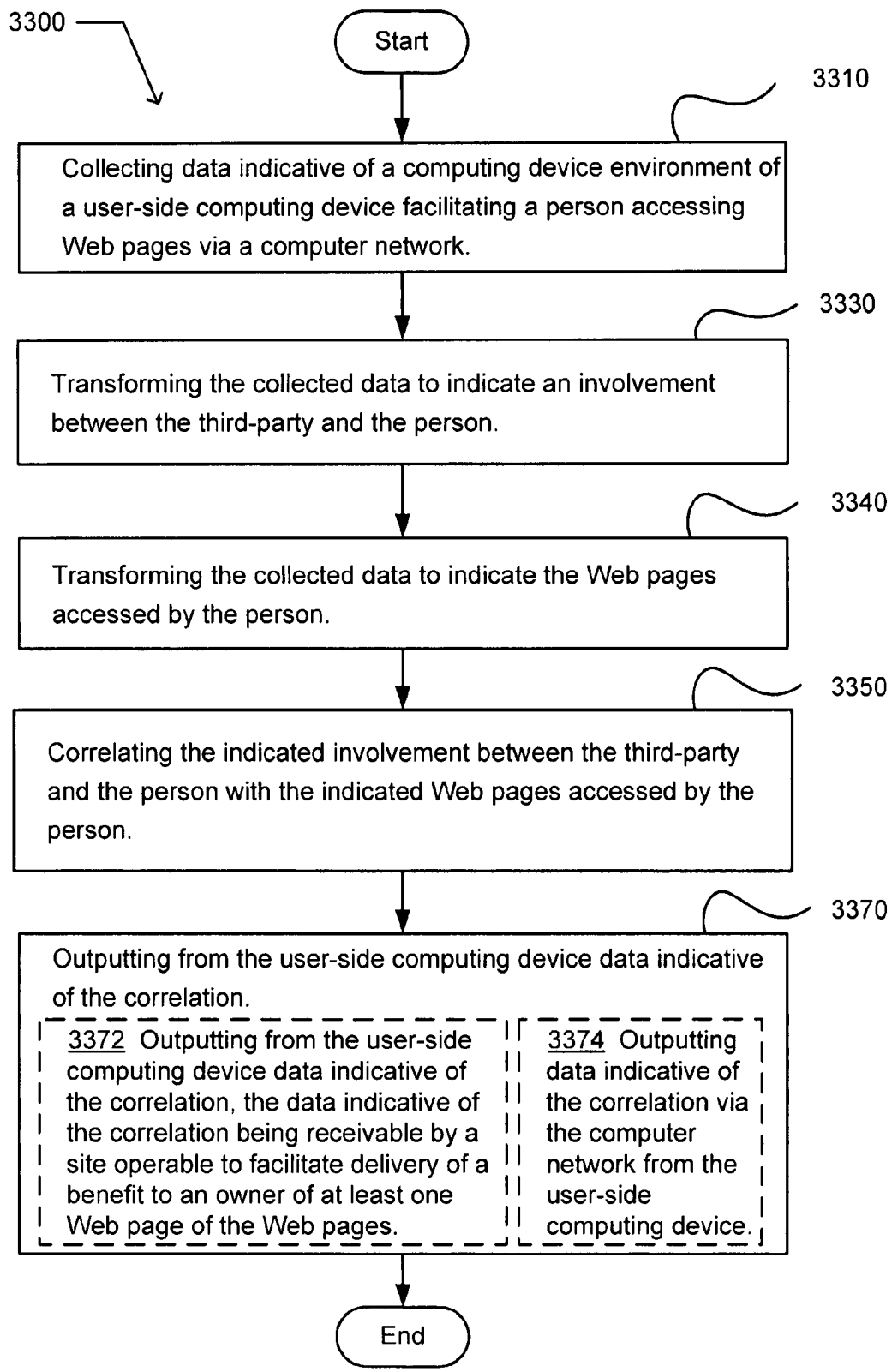
FIG. 81 illustrates another alternative embodiment of the operational flow of FIG. 71.

FIG. 81 illustrates another alternative embodiment of the operational flow 3300 of FIG. 71. The broadcast operation 3370 may include at least one additional operation. The at least one additional operation may include an operation 3372, and/or an operation 3374. The operation 3372 outputs from the user-side computing device data indicative of the correlation. The data indicative of the correlation is receivable by a site operable to facilitate delivery of a benefit to an owner of at least one Web page of the Web pages. The operation 3374 outputs data indicative of the correlation via the computer network from the user-side computing device.

Figure 82:
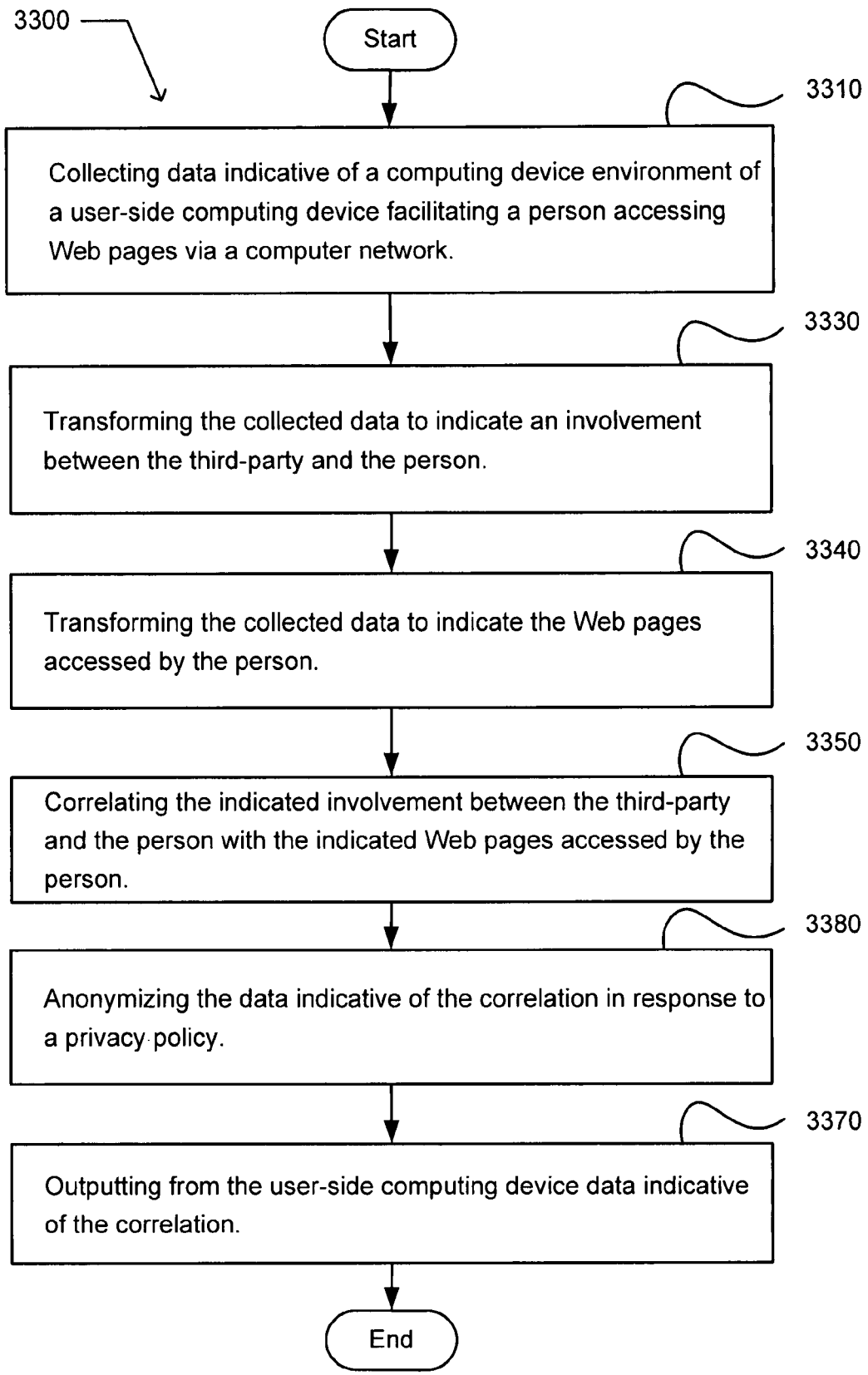
FIG. 82 illustrates a further alternative embodiment of the operational flow of FIG. 71.

FIG. 82 illustrates a further alternative embodiment of the operational flow 3300 of FIG. 71. The operational flow may include at least one additional operation, such as a confidentiality operation 3380. The confidentiality operation anonymizes the data indicative of the correlation in response to a privacy policy. In an embodiment, the confidentiality operation may be performed by the privacy apparatus 3280.

Figure 83:
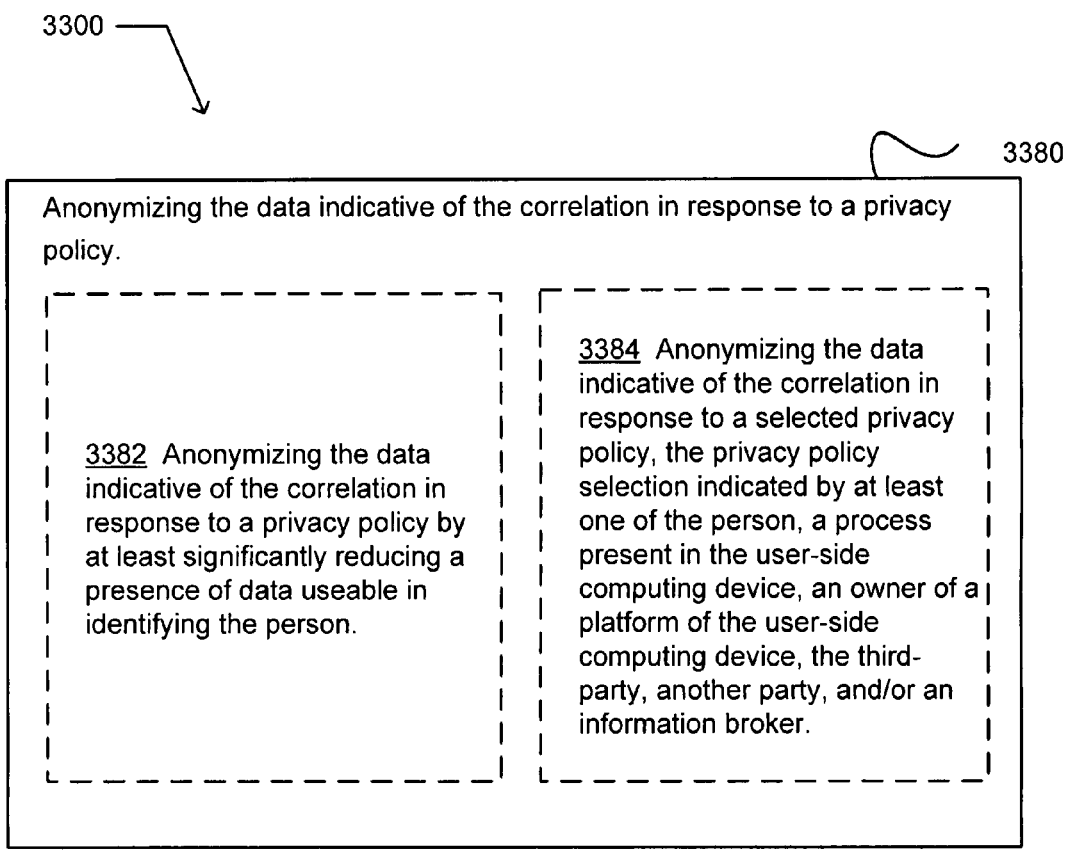
FIG. 83 illustrates an alternative embodiment of the operational flow of FIG. 71.

FIG. 83 illustrates an alternative embodiment of the operational flow 3300 of FIG. 71. The confidentiality operation 3380 may include at least one additional operation. The at least one additional operation may include an operation 3382, and/or an operation 3384. The operation 3382 anonymizes the data indicative of the correlation in response to a privacy policy by at least significantly reducing a presence of data useable in identifying the person. In an embodiment, the reducing a presence of data useable in identifying the person includes reducing a presence of an attribute of the person, such as for example by reducing a presence of passwords, credit card data, and/or personal information. The operation 3384 anonymizes the data indicative of the correlation in response to a selected privacy policy. The privacy policy selection is indicated by at least one of the person, a process present in the user-side computing device, an owner of a platform of the user-side computing device, the third-party, another party, and/or an information broker.

Figure 84:
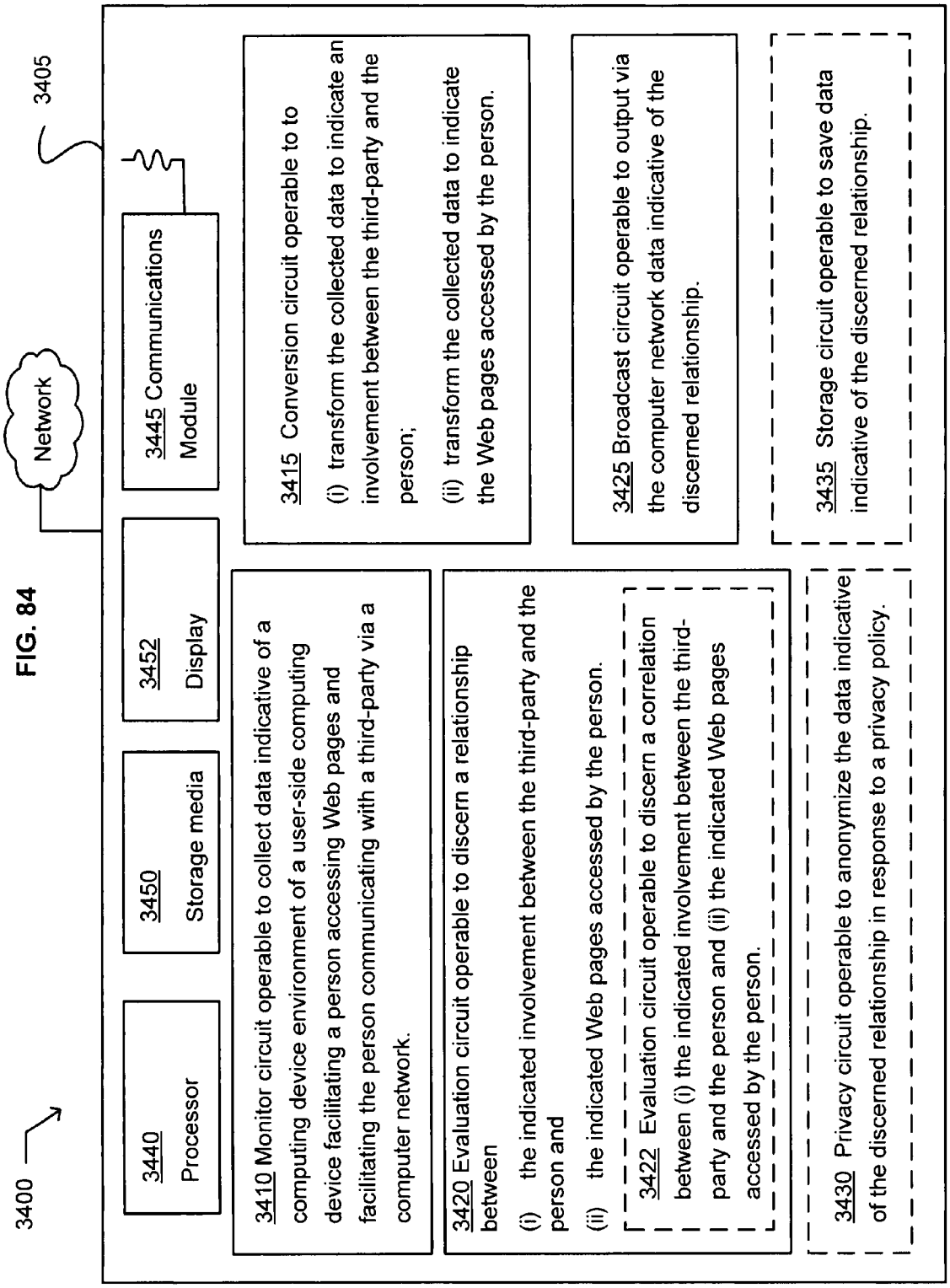
FIG. 84 illustrates an example system.

FIG. 84 illustrates an example system 3400. The system includes a computing device 3405 couplable with a computer network. The system also includes a monitor circuit 3410, a conversion circuit 3415, an evaluation circuit 3420, and a broadcast circuit 3425. In an alternative embodiment, the system includes a privacy circuit 3430, and/or a storage circuit 3435. These circuits may be structurally incorporated with the computing device. Alternatively, one or more of these circuits may be structurally distinct from the computing device. In such embodiment, the one or more of these circuits may be implemented, for example, in an external device (not shown).

The monitor circuit 3410 is operable to collect data indicative of a computing device environment of a user-side computing device facilitating a person accessing Web pages and facilitating the person communicating with a third-party via a computer network. In another embodiment, the user-side computing device may include the system 3400. The conversion circuit 3415 is operable to (i) transform the collected data to indicate an involvement between the third-party and the person, and to (ii) transform the collected data to indicate the Web pages accessed by the person. The evaluation circuit 3420 is operable to discern a relationship between (i) the indicated involvement between the third-party and the person and (ii) the indicated Web pages accessed by the person. In an alternative embodiment, the evaluation circuit includes an evaluation circuit 3422 operable to discern a correlation between (i) the indicated involvement between the third-party and the person and (ii) the indicated Web pages accessed by the person. In another alternative embodiment, the evaluation circuit includes an evaluation circuit (not shown) operable to provide a probability of a relationship between (i) the indicated involvement between the third-party and the person and (ii) the indicated Web pages accessed by the person. The broadcast circuit 3425 is operable to output via the computer network data indicative of the discerned relationship. The privacy circuit 3430 is operable to anonymize the data indicative of the discerned relationship in response to a privacy policy. The storage circuit 3435 is operable to save data indicative of the discerned relationship.

FIG. 85 illustrates an example computer program product 3500. The computer program product includes a computer-readable signal-bearing medium 3510 bearing program instructions 3520. The program instructions include program instructions operable to perform a process in a user-side computing device. The process includes collect data indicative of a computing device environment of the user-side computing device facilitating a person accessing Web pages and facilitating the person communicating with a third-party via a computer network. The process also includes transform the collected data to indicate an involvement between the third-party and the person. The process additionally includes transform the collected data to indicate the Web pages accessed by the person. The process further includes examine the transformed collected data for a relationship between (i) the indicated involvement between the third-party and the person; and (ii) the Web pages accessed by the person. The process further includes output data corresponding to the examined relationship between the indicated involvement and the Web pages accessed by the person.

In an alternative embodiment, the program instructions 3520 further include program instructions 3522 incorporated into a platform of the user-side computing device and operable to perform a process in the computing device. In another embodiment, the program instructions further include program instructions 3524 operable to collaborate with a search engine and operable to perform a process in the user-side computing device. In a further embodiment, the program instructions operable to perform a process in a computing device further include anonymize 3526 in response to a confidentiality policy the relationship between the indicated involvement and the Web pages accessed by the person. In an alternative embodiment, the computer-readable signal-bearing medium includes a computer storage medium 3532. In a further embodiment, the computer-readable signal-bearing medium includes a communication medium 3534.

Figure 86:
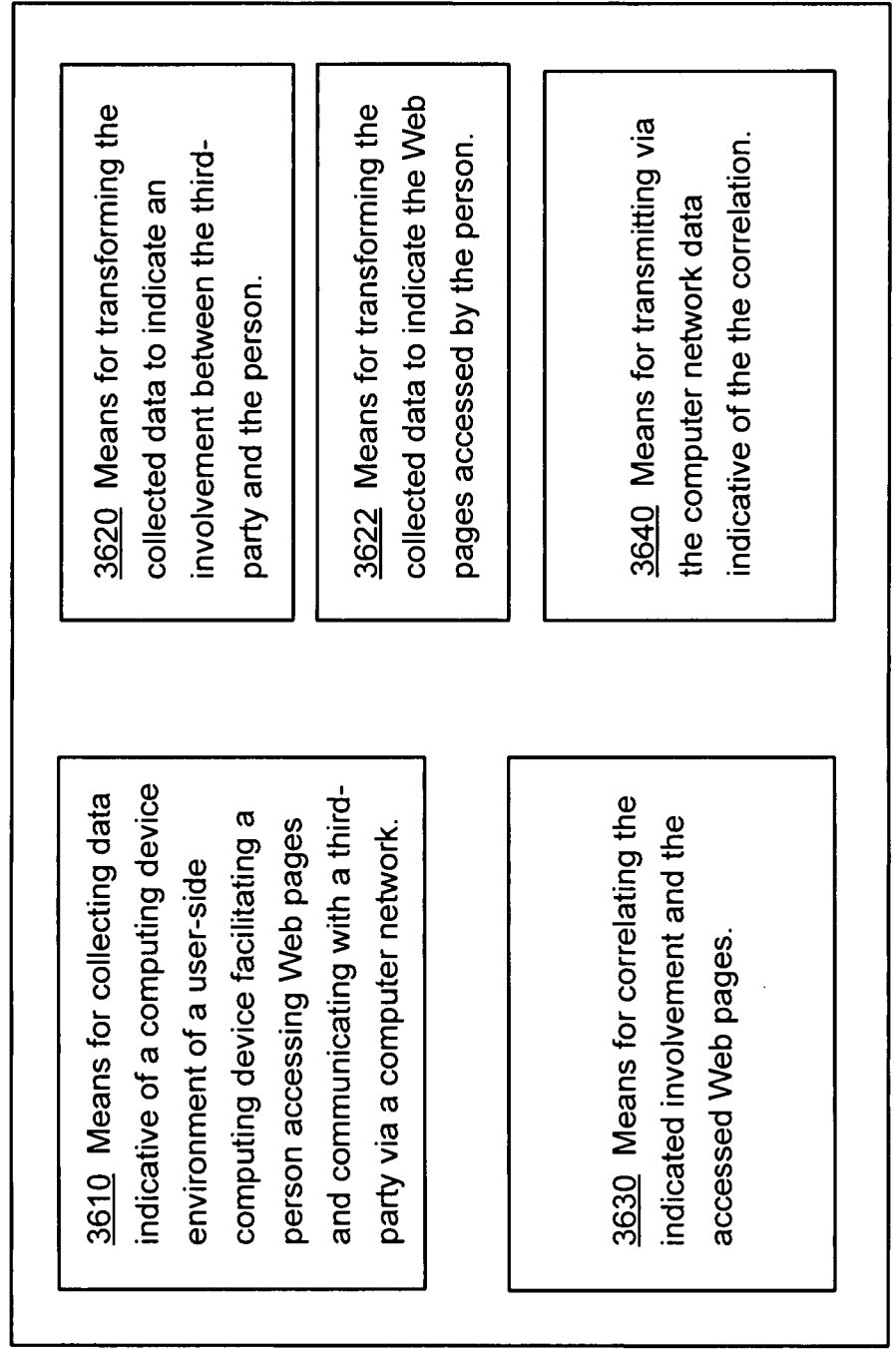
FIG. 86 illustrates an example of an apparatus.

FIG. 86 illustrates an example of an apparatus. The apparatus includes means 3610 for collecting data indicative of a computing device environment of a user-side computing device facilitating a person accessing Web pages and communicating with a third-party via a computer network. The apparatus also includes means 3620 for transforming the collected data to indicate an involvement between the third-party and the person. The apparatus further includes means 3622 for transforming the collected data to indicate the Web pages accessed by the person. The apparatus includes means 3630 for correlating the indicated involvement and the accessed Web pages. The apparatus also includes means 3640 for transmitting via the computer network data indicative of the correlation.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of reporting possible influential electronic content, the method comprising:
    collecting data indicative of a person accessing electronic content, the electronic content owned by an owner, over a computer network using a user computing device, the data collected using a process included in a platform of the user computing device;
    transforming the collected data into information indicative of events
        (i) associatable with the person having accessed the electronic content and
        (ii) of possible interest to other parties including a third-party, wherein an aspect of the information indicative of events differentiates between
        (a) information indicative of an event associated with the person activating a link in the electronic content that points to other electronic content owned by the third-party and
        (b) information indicative of another event;
    transmitting at least a portion of the information indicative of events via a network; and
    facilitating delivery of a benefit to the owner of the electronic content in response to the transmitted at least a portion of the information,
    wherein at least one of the collecting, transforming, transmitting, or facilitating is at least partially implemented using one or more processing devices.

2. The method of claim 1, wherein collecting data indicative of a person accessing electronic content, the electronic content owned by an owner, over a computer network using a user computing device, the data collected using a process included in a platform of the user computing device comprises:
    collecting data indicative of a person accessing electronic content, the electronic content including at least one of a first electronic content owned by a first owner or a second electronic content owned by a second owner, over a computer network using a user computing device.

3. The method of claim 1, wherein collecting data indicative of a person accessing electronic content, the electronic content owned by an owner, over a computer network using a user computing device, the data collected using a process included in a platform of the user computing device comprises:
    collecting data indicative of a person accessing electronic content over a computer network using a user computing device, the data collected using a process that is at least one of bundled with, integrated into, registered with or added on to a platform of the user computing device.

4. The method of claim 1, wherein transforming the collected data into information indicative of events comprises:
    transforming the collected data into information indicative of events using the process included in a platform of the user computing device.

5. The method of claim 1, wherein transforming the collected data into information indicative of events comprises:
assessing an influence of the electronic content on the events of possible interest to other parties including a third-party, the assessed influence being included in the information indicative of events.

6. The method of claim 1, wherein transmitting at least a portion of the information indicative of events via a network comprises:
transmitting at least a portion of the information indicative of events via a network in a format usable by another device that is operable to facilitate delivery of a benefit to an owner of the electronic content.

7. The method of claim 1, wherein transmitting at least a portion of the information indicative of events via a network comprises:
transmitting at least a portion of the information indicative of events via a network in a format usable by another device that is operable to facilitate delivery of a benefit to an owner of the electronic content, the benefit responsive at least to an assessed influence included in the at least a portion of the information indicative of events.

8. The method of claim 1, wherein transmitting at least a portion of the information indicative of events via a network comprises:
transmitting at least a portion of the information indicative of events via a network in a format usable by another device that is operable to facilitate delivery of a benefit, the benefit deliverable to at least one of a first owner of a first electronic content or a second owner of a second electronic content accessed by the person, the benefit responsive at least to an assessed influence of the electronic content on the events of possible interest to other parties including a third party, the assessed influence included in the at least a portion of the information indicative of events.

9. The method of claim 1, wherein transmitting at least a portion of the information indicative of events via a network comprises:
transmitting the information indicative of events via a network.

10. The method of claim 1, wherein collecting data indicative of a person accessing electronic content, the electronic content owned by an owner, over a computer network using a user computing device, the data collected using a process included in a platform of the user computing device comprises:
collecting data indicative of a person accessing at least one review of a book over a computer network using a user computing device, the at least one review of a book being located on a blog site, the at least one review of a book being independently authored by at least one user of the blog site, the at least one user of the blog site having no affiliation with the third-party.

11. The method of claim 10, wherein transforming the collected data into information indicative of events (i) associatable with the person having accessed the electronic content and (ii) of possible interest to other parties including a third party comprises:
transforming the collected data into information indicative of events (i) associatable with the person having accessed the at least one review of a book and (ii) of possible interest to other parties including an online seller of books.

12. The method of claim 11, wherein the aspect of the information indicative of events differentiates between (a) information indicative of an event associated with the person activating a link in the electronic content that points to other electronic content owned by the third-party and (b) information indicative of another event comprises:
the aspect of the information indicative of events differentiates between (a) information indicative of an event associated with the person activating a link in the at least one review of a book that points to a page owned by the online seller of books, the page owned by the online seller of books offering the book for sale by the online seller of books and (b) information indicative of the person using a search engine to find at least a second review of the book.

13. The method of claim 1, wherein transforming the collected data into information indicative of events (i) associatable with the person having accessed the electronic content and (ii) of possible interest to other parties including a third-party, wherein an aspect of the information indicative of events differentiates between (a) information indicative of an event associated with the person activating a link in the electronic content that points to other electronic content owned by the third-party and (b) information indicative of another event comprises:
transforming the collected data into information indicative of events using a kernel mode process included in a platform of the user computing device.

14. The method of claim 1, wherein transforming the collected data into information indicative of events (i) associatable with the person having accessed the electronic content and (ii) of possible interest to other parties including a third-party, wherein an aspect of the information indicative of events differentiates between (a) information indicative of an event associated with the person activating a link in the electronic content that points to other electronic content owned by the third-party and (b) information indicative of another event comprises:
transforming the collected data into information indicative of events using the process included in a platform spanning at least two user computing devices.

15. The method of claim 1, wherein transforming the collected data into information indicative of events (i) associatable with the person having accessed the electronic content and (ii) of possible interest to other parties including a third-party, wherein an aspect of the information indicative of events differentiates between (a) information indicative of an event associated with the person activating a link in the electronic content that points to other electronic content owned by the third-party and (b) information indicative of another event comprises:
transforming data collected from at least two devices including the same OS platform, wherein the at least two devices comprise at least a desktop computer and a mobile device.

16. The method of claim 1, wherein transforming the collected data into information indicative of events (i) associatable with the person having accessed the electronic content and (ii) of possible interest to other parties including a third-party, wherein an aspect of the information indicative of events differentiates between (a) information indicative of an event associated with the person activating a link in the electronic content that points to other electronic content owned by the third-party and (b) information indicative of another event comprises:
transmitting at least a portion of the information indicative of events via a network in a format usable by another device that is operable to facilitate delivery of a benefit to an author of the electronic content, wherein the author of the electronic content has no predetermined compensation arrangement with the owner of the electronic content.

17. The method of claim 1, wherein collecting data indicative of a person accessing electronic content, the electronic content owned by an owner, over a computer network using a user computing device, the data collected using a process included in a platform of the user computing device comprises:
  collecting data indicative of a person accessing electronic content over a computer network using a user computing device, the data collected using a process included in a platform of the user computing device, wherein the electronic content is not an advertisement.

18. A system comprising:
  a computing device couplable with a computer network;
  a monitor circuit operable to collect data indicative of a person accessing electronic content, the electronic content owned by an owner, over a computer network using a user computing device, the data collected using a process included in a platform of the user computing device;
  an evaluation circuit operable to transform the collected data into information indicative of events
    (i) associatable with the person having accessed the electronic content and
    (ii) of possible interest to other parties including a third-party, an aspect of the information indicative of events differentiates between
    (iii) information indicative of an event associated with the person activating a link in the electronic content that points to other electronic content owned by the third-party and
    (iv) information indicative of another event;
  a broadcast circuit operable to communicate data indicative of the information indicative of events to a recipient via the computer network; and
  a benefit delivery circuit operable to facilitate delivery of a benefit to the owner of the electronic content in response to the communicated data.

19. The system of claim 18, wherein the monitor circuit operable to collect data indicative of a person accessing electronic content, the electronic content owned by an owner, over a computer network using a user computing device, the data collected using a process included in a platform of the user computing device and the broadcast circuit operable to communicate data indicative of the information indicative of events to a recipient via the computer network comprise:
  a monitor circuit operable to collect data indicative of a person accessing electronic content, the electronic content including at least one of a first electronic content owned by a first owner or a second electronic content owned by a second owner, over a computer network using a user computing device, the data collected using a process included in a platform of the user computing device and a broadcast circuit operable to communicate data indicative of the information indicative of events to a recipient via the computer network, the data indicative of the information indicative of events operable to facilitate delivery of a benefit to at least one of a first owner of a first electronic content or a second owner of a second electronic content accessed by the person.

20. The system of claim 18, further comprising:
  a storage circuit operable to save the information indicative of events.

21. An influence assessment method, the method comprising:
  collecting data indicative of a computing environment of a computing device facilitating a person accessing electronic content via a computer network using the computing device, the electronic content including at least one of a first electronic content having a first content portion or a second electronic content having a second content portion;
  transforming the collected data into an assessment of an influence of at least one of the first electronic content or the second electronic content relevant to an involvement associated with the person using the computing device and to a subject of interest to a third-party;
  transmitting a user influence report indicating the influence assessment of the electronic content on a behavior of the person; and
  facilitating delivery of a benefit based at least partially on at least a portion of the transmitted user influence report,
  wherein at least one of the collecting, transforming, transmitting, or facilitating is at least partially implemented using one or more processing devices.

22. The method of claim 21, wherein collecting data indicative of a computing environment of a computing device facilitating a person accessing electronic content via a computer network using the computing device, the electronic content including at least one of a first electronic content having a first content portion or a second electronic content having a second content portion comprises:
  collecting data indicative of at least one of a hardware environment, a software environment, or a state of a computing device facilitating a person accessing electronic content via a computer network using the computing device.

23. The method of claim 21, wherein collecting data indicative of a computing environment of a computing device facilitating a person accessing electronic content via a computer network using the computing device, the electronic content including at least one of a first electronic content having a first content portion or a second electronic content having a second content portion comprises:
  collecting using a process included in a platform of a computing device data indicative of a computing environment of the computing device, the computing device facilitating a person accessing electronic content via a computer network using the computing device.

24. The method of claim 21, wherein transforming the collected data into an assessment of an influence of at least one of the first electronic content or the second electronic content relevant to an involvement associated with the person using the computing device and to a subject of interest to the third-party comprises:
  transforming, using a process included in a search platform of the computing device, the collected data into an assessment of an influence of at least one of the first electronic content or the second electronic content that is relevant to both an involvement associated with the person using the computing device and to a subject of interest to the third-party.

25. The method of claim 21, wherein transforming the collected data into an assessment of an influence of at least one of the first electronic content or the second electronic content relevant to an involvement associated with the person using the computing device and to a subject of interest to the third-party comprises:
  transforming the collected data into an assessment of an influence of at least one of the first electronic content or the second electronic content that is relevant to both an involvement associated with the person using the computing device and to a subject of interest to the third-party, wherein an aspect of the influence assessment includes distinguishing between
  (i) an influence associated with the person activating a link in at least one of the first electronic content or the second electronic content that points to another electronic content owned by the third-party and
  (ii) an influence associated with another aspect of the person accessing electronic content.

26. The method of claim 21, wherein transforming the collected data into an assessment of an influence of at least one of the first electronic content or the second electronic content relevant to an involvement associated with the person using the computing device and to a subject of interest to a third-party comprises:
  transforming the collected data into an assessment of an influence of at least one of the first electronic content or the second electronic content relevant to an involvement associated with the person using the computing device and to a subject of interest to a third-party by identifying at least some image, text, or sound data of at least one of the first electronic content or the second electronic content, evaluating whether the at least some image, text, or sound data relates with at least one predetermined image, text, or sound identifier, and, if the at least some image, text, or sound data relates with at least one predetermined image, text, or sound identifier, providing at least one indication of image, text, or sound pattern recognition involving the at least some image, text, or sound data and the at least one predetermined image, text, or sound identifier.

27. The method of claim 21, wherein transforming the collected data into an assessment of an influence of at least one of the first electronic content or the second electronic content relevant to an involvement associated with the person using the computing device and to a subject of interest to a third-party comprises:
  transforming the collected data into an assessment of an influence of at least one of the first electronic content or the second electronic content relevant to an involvement associated with the person using the computing device and to a subject of interest to a third-party by identifying at least one of some image, text, or sound data of the first electronic content or at least some image, text, or sound data of the second electronic content, evaluating whether the at least some image, text, or sound data of the first electronic content or the at least some image, text, or sound data of the second electronic content relate with at least one common predetermined subject, and, if the at least some image, text, or sound data of the first electronic content or the at least some image, text, or sound data of the second electronic content relate with at least one common predetermined subject, providing at least one indication of image, text, or sound recognition involving the at least one of the at least some image, text, or sound data of the first electronic content or the at least some image, text, or sound data of the second electronic content and the at least one common predetermined subject.

28. The method of claim 21, wherein transforming the collected data into an assessment of an influence of at least one of the first electronic content or the second electronic content relevant to an involvement associated with the person using the computing device and to a subject of interest to a third-party comprises:
  transforming the collected data into an assessment of an influence of at least one of the first electronic content or the second electronic content relevant to an involvement associated with the person using the computing device and to a subject of interest to a third-party by identifying at least one of at least some image, text, or sound data of the first electronic content or at least some image, text, or sound data of the second electronic content, evaluating whether the at least one of at least some image, text, or sound data of the first electronic content or the at least some image, text, or sound data of the second electronic content relate with at least one common predetermined subject, and, if the at least one of at least some image, text, or sound data of the first electronic content or the at least some image, text, or sound data of the second electronic content relate with at least one common predetermined subject and with consideration of one or more access times of at least one of the first electronic content or the second electronic content, providing at least one indication of image, text, or sound recognition involving the at least one of at least some image, text, or sound data of the first electronic content or the at least some image, text, or sound data of the second electronic content and the at least one common predetermined subject.

* * * * *

UNITED STATES PATENT AND TRADEMARK OFFICE
CERTIFICATE OF CORRECTION

PATENT NO.         : 8,793,155 B2                                         Page 1 of 1
APPLICATION NO.    : 11/906537
DATED              : July 29, 2014
INVENTOR(S)        : Flake et al.

It is certified that error appears in the above-identified patent and that said Letters Patent is hereby corrected as shown below:

In the Claims

In Column 65, Claim 18, Lines 27-28 please delete text "third-party, an aspect of the information indicative of events" and replace with --third-party, wherein an aspect of the information indicative of events--

In Column 65, Claim 18, Line 30 please delete text "(iii) information indicative of an event associated with" and replace with --(a) information indicative of an event associated within--

In Column 65, Claim 18, Line 35 please delete text "(iv) information indicative of another event;" and replace with --(b) information indicative of another event;--

Signed and Sealed this
Sixth Day of January, 2015

Michelle K. Lee
*Deputy Director of the United States Patent and Trademark Office*